(12) United States Patent
Gulati

(10) Patent No.: US 12,170,653 B2
(45) Date of Patent: *Dec. 17, 2024

(54) DEVICE PROGRAMMING WITH SYSTEM GENERATION

(71) Applicant: Data I/O Corporation, Redmond, WA (US)

(72) Inventor: Rajeev Gulati, Sammamish, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,907

(22) Filed: Nov. 21, 2023

(65) Prior Publication Data

US 2024/0089242 A1 Mar. 14, 2024

Related U.S. Application Data

(63) Continuation of application No. 18/115,698, filed on Feb. 28, 2023, now Pat. No. 11,824,847, which is a
(Continued)

(51) Int. Cl.
*H04L 9/40* (2022.01)
*G06F 21/10* (2013.01)
(Continued)

(52) U.S. Cl.
CPC .............. *H04L 63/08* (2013.01); *G06F 21/10* (2013.01); *G06F 21/572* (2013.01); *G06F 21/73* (2013.01);
(Continued)

(58) Field of Classification Search
CPC ........ G06F 21/10; G06F 21/572; G06F 21/73; G06F 2221/034; G06F 2221/2107;
(Continued)

(56) References Cited

U.S. PATENT DOCUMENTS 8,843,764 B2 9/2014 Hussain
9,081,747 B1* 7/2015 Tabieros ............... G06F 9/4411
(Continued)

FOREIGN PATENT DOCUMENTS

CN 101149773 A 3/2008
CN 105074682 A 11/2015
(Continued)

OTHER PUBLICATIONS

Taiwan Patent Office, Application No. 109125987, Office Action dated Jan. 10, 2024.
(Continued)

*Primary Examiner* — Gary S Gracia
(74) *Attorney, Agent, or Firm* — Shield Intellectual Property PC

(57) ABSTRACT

A secure programming system and method for provisioning and programming a target payload into a programmable device mounted in a programmer. The programmable device can be authenticated before programming to verify the device is a valid device produced by a silicon vendor. The authentication process can include a challenge-response validation. The target payload can be programmed into the programmable device and linked with an authorized manufacturer. The programmable device can be verified after programming the target payload by verifying the silicon vendor and the authorized manufacturer. The secure programming system can provision different content into different programmable devices simultaneously to create multiple final device types in a single pass.

20 Claims, 22 Drawing Sheets

Related U.S. Application Data continuation of application No. 17/361,174, filed on Jun. 28, 2021, now Pat. No. 11,595,371, which is a continuation of application No. 16/528,456, filed on Jul. 31, 2019, now Pat. No. 11,050,605, which is a continuation-in-part of application No. 16/167,513, filed on Oct. 22, 2018, now Pat. No. 10,587,451, which is a continuation of application No. 15/925,611, filed on Mar. 19, 2018, now Pat. No. 10,110,411, which is a continuation of application No. 15/640,438, filed on Jun. 30, 2017, now Pat. No. 9,923,755.

(60) Provisional application No. 62/369,304, filed on Aug. 1, 2016.

(51) Int. Cl.
  *G06F 21/57* (2013.01)
  *G06F 21/73* (2013.01)
  *G09C 1/00* (2006.01)
  *H04L 9/32* (2006.01)

(52) U.S. Cl.
  CPC .............. *G09C 1/00* (2013.01); *H04L 9/3268* (2013.01); *G06F 21/109* (2023.08); *G06F 2221/034* (2013.01); *G06F 2221/2107* (2013.01); *H04L 63/0442* (2013.01); *H04L 63/0823* (2013.01); *H04L 63/126* (2013.01)

(58) Field of Classification Search
  CPC ... G09C 1/00; H04L 63/0442; H04L 63/0823; H04L 63/126; H04L 9/3268; H04L 63/08
  See application file for complete search history.

(56) References Cited

U.S. PATENT DOCUMENTS

| | | | | |
|---|---|---|---|---|
| 9,226,145 | B1* | 12/2015 | Loman | H04W 12/35 |
| 9,923,755 | B2* | 3/2018 | Gulati | G09C 1/00 |
| 10,069,633 | B2* | 9/2018 | Gulati | G06F 21/572 |
| 10,129,035 | B2* | 11/2018 | Gulati | H04L 9/3268 |
| 10,268,844 | B2* | 4/2019 | Gulati | H04W 12/069 |
| 10,303,891 | B2* | 5/2019 | Ekle | G06F 21/6209 |
| 10,496,811 | B2* | 12/2019 | Gulati | H04L 9/0877 |
| 11,050,605 | B2* | 6/2021 | Gulati | H04L 9/0897 |
| 2005/0132357 | A1* | 6/2005 | Shell | G06F 21/51 |
| | | | | 717/174 |
| 2008/0069363 | A1* | 3/2008 | Catherman | H04L 9/3236 |
| | | | | 380/282 |
| 2009/0217054 | A1* | 8/2009 | Haider | H04L 9/3247 |
| | | | | 713/189 |
| 2011/0035587 | A1* | 2/2011 | DeVore | H04L 63/0428 |
| | | | | 713/165 |
| 2011/0063093 | A1* | 3/2011 | Fung | G06Q 50/04 |
| | | | | 340/10.52 |
| 2012/0079279 | A1* | 3/2012 | Leclercq | H04L 9/3263 |
| | | | | 380/282 |
| 2012/0102334 | A1* | 4/2012 | O'Loughlin | H04L 9/3252 |
| | | | | 713/189 |
| 2013/0019105 | A1* | 1/2013 | Hussain | G06F 21/31 |
| | | | | 713/189 |
| 2013/0024603 | A1* | 1/2013 | Steffey | G06F 8/654 |
| | | | | 711/E12.008 |
| 2014/0359303 | A1* | 12/2014 | Berke | G06F 21/572 |
| | | | | 713/189 |
| 2015/0082392 | A1* | 3/2015 | Gregg | H04L 63/0853 |
| | | | | 726/4 |
| 2015/0086019 | A1* | 3/2015 | Tamminen | H04L 9/3234 |
| | | | | 380/278 |
| 2015/0100786 | A1* | 4/2015 | Xiao | G06F 21/33 |
| | | | | 713/168 |
| 2015/0242615 | A1* | 8/2015 | Newell | G06F 21/76 |
| | | | | 726/30 |
| 2015/0244711 | A1* | 8/2015 | Venkataraman | H04L 63/0815 |
| | | | | 713/168 |
| 2016/0259312 | A1* | 9/2016 | Caley | G06F 8/63 |
| 2017/0048070 | A1* | 2/2017 | Gulati | H04L 9/0861 |
| 2018/0034682 | A1* | 2/2018 | Gulati | G09C 1/00 |
| 2018/0041341 | A1* | 2/2018 | Gulati | H04L 9/0894 |
| 2018/0212814 | A1 | 7/2018 | Gulati | |
| 2018/0285602 | A1* | 10/2018 | Mersh | G06F 21/33 |
| 2019/0058625 | A1 | 2/2019 | Gulati | |
| 2019/0356529 | A1* | 11/2019 | Gulati | H04L 9/3242 |
| 2021/0328853 | A1 | 10/2021 | Gulati | |
| 2023/0208824 | A1 | 6/2023 | Gulati | |
| 2024/0097902 | A1* | 3/2024 | Boorstin | H04L 9/32 |

FOREIGN PATENT DOCUMENTS

| | | |
|---|---|---|
| EP | 2056231 A1 | 5/2009 |
| EP | 2387262 A1 | 11/2011 |
| KR | 20150040920 A | 4/2015 |
| TW | 201415286 A | 4/2014 |
| TW | 201807615 A | 3/2018 |

OTHER PUBLICATIONS

Chinese Patent Office, Application No. 201780053611.4, Office Action dated Dec. 13, 2022.
European Patent Office, Application No. 17837490.6, Extended European Search Report dated Feb. 20, 2020.
European Patent Office, Application No. 20188935.9, Extended European Search Report dated Oct. 9, 2020.
European Patent Office, Application No. 21194192.7, Extended European Search Report dated Mar. 22, 2022.
Japanese Patent Office, Application No. 2019-527767, Foreign Office Action dated Feb. 18, 2020.
Taiwan Patent Office, Application No. 106125851, Office Action dated May 10, 2021.
Taiwan Patent Office, Application No. 106125851, Office Action dated Nov. 30, 2021.
United States Patent and Trademark Office, U.S. Appl. No. 15/640,438, Notice of Allowance dated Oct. 25, 2017.
United States Patent and Trademark Office, U.S. Appl. No. 15/925,611, Notice of Allowance dated May 31, 2018.
United States Patent and Trademark Office, U.S. Appl. No. 16/167,513, Notice of Allowance dated Oct. 29, 2019.
United States Patent and Trademark Office, U.S. Appl. No. 16/528,456, Notice of Allowance dated Nov. 18, 2020.
United States Patent and Trademark Office, U.S. Appl. No. 17/361,174, Notice of Allowance dated Oct. 4, 2022.
United States Patent and Trademark Office, U.S. Appl. No. 18/115,698, Notice of Allowance dated Jun. 30, 2023.
World Intellectual Property Organization, Application No. PCT/US17/44768, International Search Report dated Nov. 2, 2017.

\* cited by examiner

DEVICE PROGRAMMING WITH SYSTEM GENERATION

CROSS REFERENCE TO RELATED APPLICATIONS AND PRIORITY CLAIM

This application claims priority as a Continuation of U.S. application Ser. No. 18/115,698 filed Feb. 28, 2023, which claims priority to Continuation of U.S. application Ser. No. 17/361,174, filed Jun. 28, 2021, now U.S. Pat. No. 11,595,371, issued on Feb. 28, 2023, which claims priority to Continuation of U.S. application Ser. No. 16/528,456, filed Jul. 31, 2019, now U.S. Pat. No. 11,050,605, issued on Jun. 29, 2021, which claims priority as a Continuation-In-Part of U.S. application Ser. No. 16/167,513, filed Oct. 22, 2018, now U.S. Pat. No. 10,587,451, issued on Mar. 10, 2020, which claims priority to U.S. application Ser. No. 15/925,611, filed Mar. 19, 2018, now U.S. Pat. No. 10,110,411, issued on Oct. 23, 2018, which claims priority to U.S. application Ser. No. 15/640,438, filed Jun. 30, 2017, now U.S. Pat. No. 9,923,755, issued Mar. 20, 2018, which claims priority of U.S. Provisional Application Ser. No. 62/369,304, filed Aug. 1, 2016, the entire contents of the foregoing are hereby incorporated by reference as if fully set forth herein, under 35 U.S.C. § 120.

This application is related to U.S. Provisional Application Ser. No. 62/371,184, entitled COUNTERFEIT PREVENTION, filed Aug. 4, 2016, U.S. Provisional Application Ser. No. 62/372,242, entitled EMBEDDING FOUNDATIONAL ROOT OF TRUST USING SECURITY ALGORITHMS, filed Aug. 8, 2016, and U.S. Provisional Application Ser. No. 62/401,953, entitled UNIFIED PROGRAMMING ENVIRONMENT FOR PROGRAMMABLE DEVICES, filed Sep. 30, 2016, each of which is owned by the Applicant and is hereby incorporated by reference as if fully set forth herein, under 35 U.S.C. § 120.

TECHNICAL FIELD

Embodiments relate generally to device programming systems, and, more specifically, to secure programming systems with system generation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable devices such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines. In addition, system level components, such as smart phones, circuit boards, Internet of Things (IoT) devices, media players, can also require specific security configuration support.

The systems and sub-assemblies that are manufactured or assembled in bulk on a manufacturing line are generally functionally identical. Such products share similar problems about functionality and operation. Issues manifesting in one device are typically found in all similarly manufactured devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
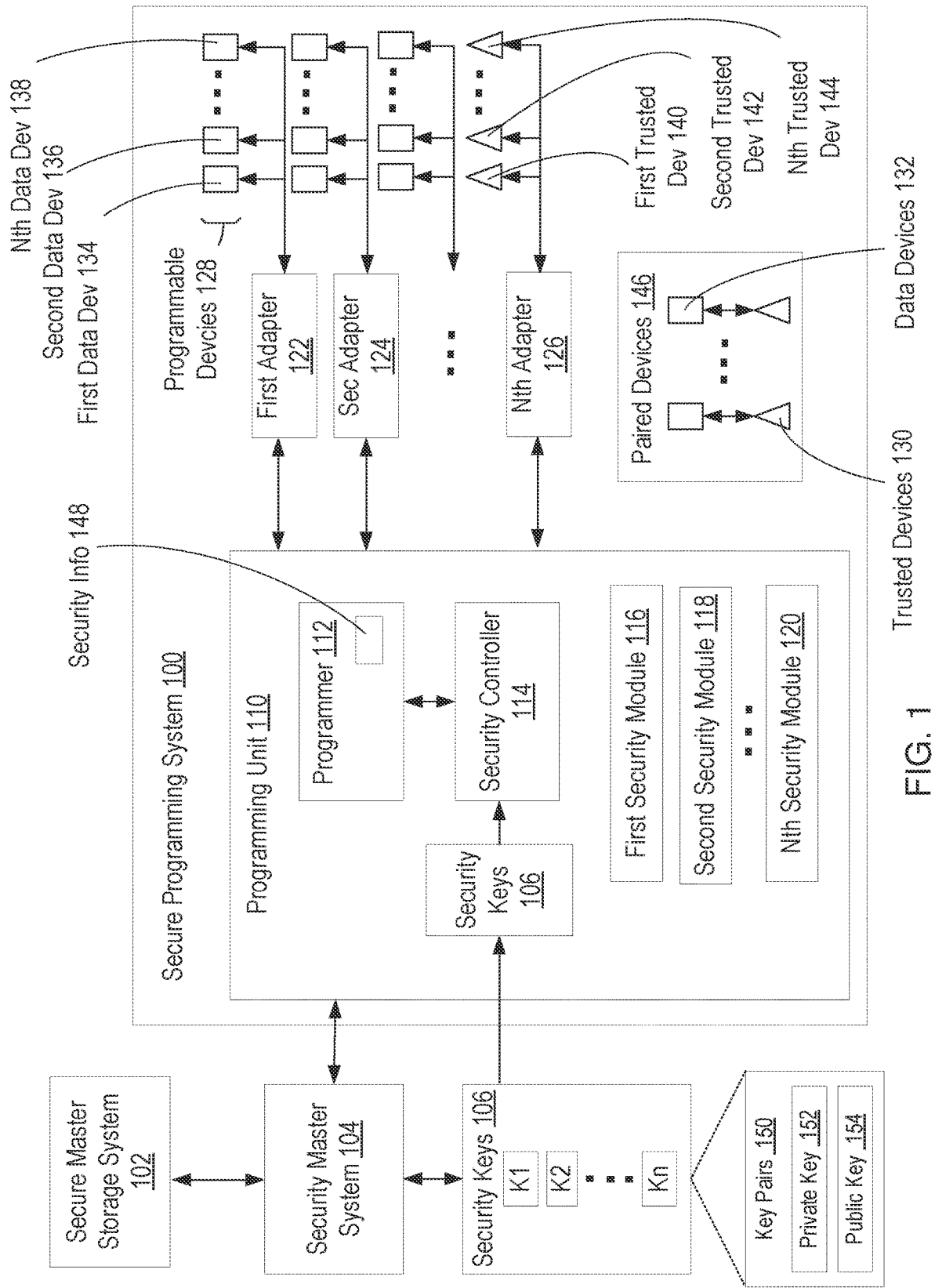
FIG. 1 depicts an illustrative view of a secure programming system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
4.0. Example Embodiments
5.0. Implementation Mechanism—Hardware Overview
6.0. Extensions and Alternatives

1.0. General Overview

Approaches, techniques, and mechanisms are disclosed for provisioning programmable devices in a secure manner. The secure programming system can individually encrypt a target payload of data and code and then program the information into each individual one of the programmable devices. The secure programming system can create a customized payload package that can only be decrypted by a system or device having the correct security keys.

The programmable devices can include memory chips, circuit boards, and complete electronic devices such as smart phones, media players, or other consumer and industrial electronic devices. The configuration of the security keys can control the operation of the programmable devices.

The secure programming system can securely configure individual devices including components, circuit boards, and complete products. By implementing security features at the individual component manufacturing time, operation can be controlled on a device by device basis. The secure content, codes, and keys can interoperate to provide a high degree of security and control.

According to one embodiment, by individually encrypting a target payload on one of the programmable devices, such as a circuit board, then the circuit board can be configured to only work with components that have registered security codes. This can be used to ensure that circuit boards can only be operated with certain category parts. This provides the manufacturer with a degree of control over the final use of the boards.

According to another embodiment, the programmable devices can validate a serial number or other parameter as a prerequisite for operation of the device. In yet another embodiment, the programmable device can provide code signing facilities to authenticate code before execution.

According to another embodiment, the programmable devices can be authenticated before programming and authenticated again after programming a target payload. This can include authenticating a silicon vendor device certificate and an original equipment manufacturer (OEM) device certificate. The programmable devices can include security information identifying the silicon vendor, the OEM, the factory used to program the devices, the programmer, and other identifying information that can be used to track and authenticate the production of the programmable devices.

In other aspects, the invention encompasses computer apparatuses and computer-readable media configured to carry out the foregoing techniques.

2.0. Structural Overview

Referring now to FIG. 1, therein is shown an illustrative view of various aspects of a secure programming system 100 in which the techniques described herein may be practiced, according to an embodiment. The secure programming system 100 can individually configure data devices and active, trusted device with cryptographic information to provide a secure programming and operation environment.

The secure programming system 100 comprises a programming unit 110 having a programmer 112, a security controller 114, security keys 106, adapters for coupling to programmable devices, a first security module 116, a second security module 118, and an nth security module 120. The secure programming system 100 can be coupled to a security master system 104 having a secure master storage system 102. The security master system 104 and the secure master storage system 102 can generate and securely storage the security keys 106 for encrypting and decrypting information. The security keys 106 can implement a variety of security paradigms. For example, the security keys 106 can include key pairs 150 having a private key 152 and a public key 154. The key pairs 150 can be used to implement a public key cryptography system where data encrypted by the public key 154 can be decrypted using the private key 152. The secure programming system 100 can include as many different key pairs 150 as necessary. The key pairs 150, the private key 152, and the public key 154 can be implemented for different devices or system elements including the secure programming system 100, the programming unit 110, the programmer 112, the security controller 114, the security modules, the programmable devices 128, the data devices 132, the trusted devices 130, or any other system element.

System 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can receive security information from the security master system 104, process the information, and transfer an individually configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126.

In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, or a similar device with active components, then the adapters can include mechanisms to communicate with the programmable devices 128. The adapters can include a cable link, a Universal Serial Bus link, a serial connection, a parallel connection, a wireless communication link, an electronic data bus interface, an optical interface, or any other communication mechanism.

The programmable devices 128 are devices that can be provisioned with secure information by the programming unit 110. For example, the programmable devices 128 can include data devices such as flash memory units, programmable read only memories, secure data storage devices, or other data storage devices.

Provisioning may include transferring data and/or code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit board, or similar devices.

The data devices 132 can include any number of devices, e.g., a first data device 134, a second data device 136, and a nth data device 138. The trusted devices 130 can include any number of trusted devices, e.g., a first trusted device 140, a second trusted device 142, and up to a nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security. Each of the programmable devices 128 can be personalized with individual security keys 106.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus, data from one of the paired devices 146 can be shared with another one of the paired devices 146. This can allow functionality such as sharing information, authenticating a bi-directional secure communication channel between two or more of the paired devices 146, identifying other related devices, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus, the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 are computing devices for processing security information. The security controller 114 can include specific cryptographic and computational hardware to facility the processing of the cryptographic information. For example, the security controller 114 can include a quantum computer, parallel computing circuitry, field programmable gate arrays (FPGA) configured to process security information, a co-processor, an array logic unit, a microprocessor, or a combination thereof.

The security controller 114 can be a secure device specially configured to prevent unauthorized access to security information at the input, intermediate, or final stages of processing the security information. The security controller 114 can provide a secure execution environment for secure code elements 314 to execute in. For example, the security controller 114 can be a hardware security module (HSM), a microprocessor, a trusted security module (TPM), a dedicated security unit, or a combination thereof. The security controller 114 can be part of the programming unit 110. For example, the security controller 114, such as a hardware security module, can be included within the programmer 112.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof. For example, the security modules can be hardware, software, or a combination thereof.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more the security keys 106. The security keys 106 can be calculated internal to the secure programming system 100, can be calculated externally and received by the secure programming system 100, or a combination thereof.

The security keys 106 can be used to encrypt and decrypt the security information. The security keys 106 can be used to implement different security methodologies and protocols. For example, the security keys 106 can be used to implement a public key encryption system. In another example, the security keys 106 can be used to implement a different security protocol or methodology. Although the security keys 106 can be described as used for a public key encryption system, it is understood that the security keys 106 can be used to implement different security paradigms.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
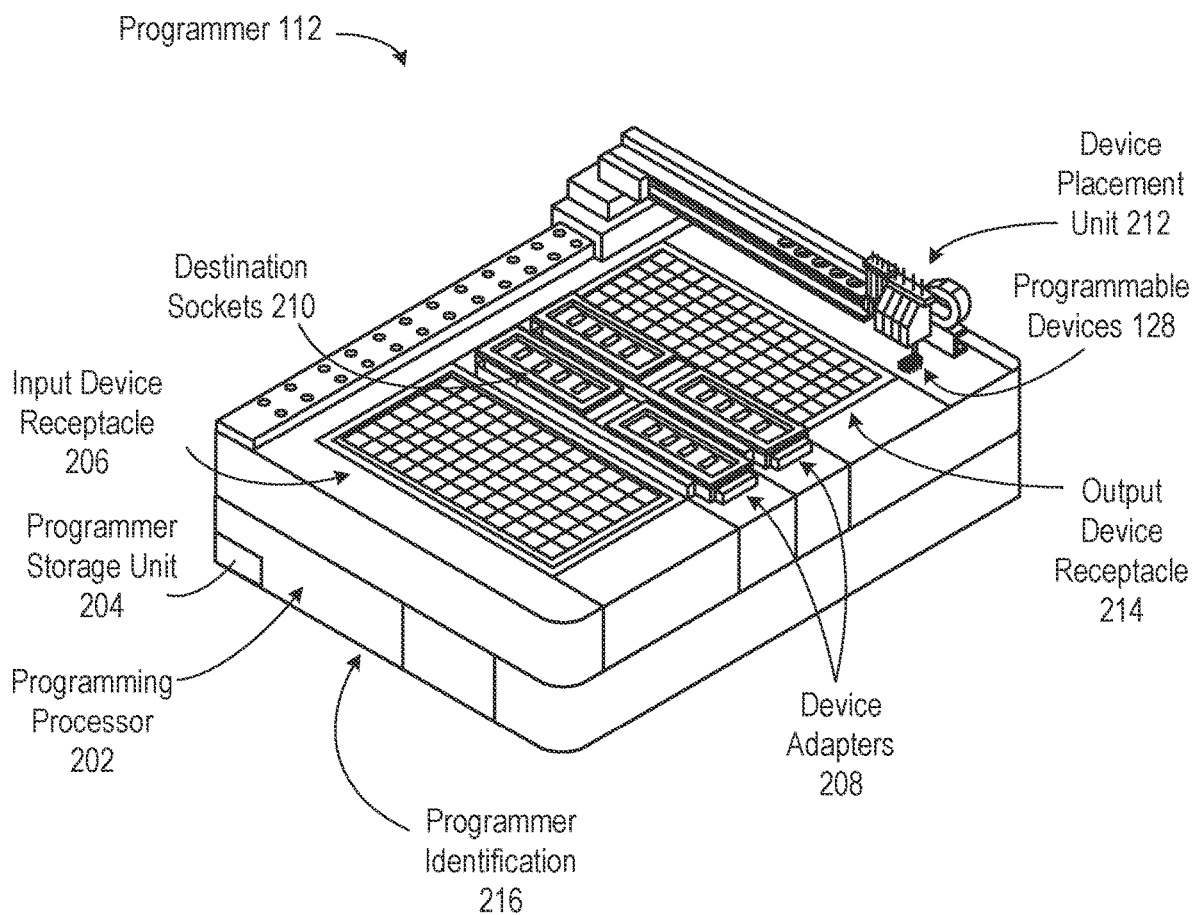
FIG. 2 depicts an example of the programmer.

Referring now to FIG. 2, therein is shown an example of the programmer 112. The programmer 112 is an electromechanical device for provisioning the programmable devices 128.

The programmer 112 can be used to access the programmable devices 128 and provision the programmable devices 128 with the content payload. The content payload can include data, code, security keys 106 of FIG. 1, the security information 148 of FIG. 1, and other related content.

The programmer 112 can have a variety of configurations. The programmer 112 can include a programming processor 202, an input device receptacle 206, device adapters 208, destination sockets 210, a device placement unit 212, and an output device receptacle 214. For example, the programmer 112 can be a programmer 112, a chip programmer, a device provisioning system, a circuit board programmer, or a similar provisioning system.

The programmer 112 can have a programmer identification 216. The programmer identification 216 is a unique value for identifying the programmer 112.

The programmer 112 can configure the programmable devices 128 by initializing and writing a data image into the programmable devices 128. The data image can be configured for the device type of the programmable devices 128. The programmer 112 can transfer the data to the programmable devices 128 using direct or indirect memory access.

The programmer 112 can receive a single payload image for the programmable devices 128 and store the image in a local programmer storage unit. The payload image can be processed into individual images targeted for each of the programmable devices 128. Configuring the programmable devices 128 can store memory structure, cryptographic data, and user data on the programmable devices 128. Configuring can include forming one-time structures such as partitions on the programmable devices 128.

The programmer 112 can include the programming processor 202. The programming processor 202 is a computing unit for controlling the programmer 112. The programming processor 202 can include a central processing unit (not shown), a programmer storage unit 204, a communication interface (not shown), and a software (not shown).

The programming processor 202 can have a variety of configurations. For example, the programming processor 202 can include the security controller or be coupled to the system controller. The programming processor 202 can be a single processor, a multiprocessor, a cloud computing element, or a combination thereof.

The programmer storage unit 204 is a device for storing and retrieving information. For example, the programmer storage unit 204 of the programmer 112 can be a disk drive, a solid-state memory, an optical storage device, or a combination thereof.

The programmer 112 can include the software for operating the programmer 112. The software is control information for executing on the programming processor 202. The software can be stored in the programmer storage unit 204 and executed on the programming processor 202.

The programmer 112 can include the input device receptacle 206. The input device receptacle 206 is a source of the programmable devices 128. For example, the input device receptacle 206 can be a tray that conforms to the Joint Electron Device Engineering Council (JEDEC) standards. The input device receptacle 206 can be used for holding unprogrammed devices.

The programmer 112 can include the output device receptacle 214. The output device receptacle 214 is a destination for the programmable devices 128 that have been provisioned. For example, the output device receptacle 214 can be an empty JEDEC tray for holding finished devices, a storage tube, a shipping package, or other similar structure.

The programmer 112 can include the device adapters 208. The device adapters 208 are mechanisms for coupling to the programmable devices 128.

The device adapters 208 can have a variety of configurations. For example, the device adapters 208 can include destination sockets 210 for mounting the programmable devices 128 such as chips. The sockets are mechanisms for holding and interfacing with the programmable devices 128. The device adapters 208 can be modular and removable from the programmer 112 to accommodate different socket configurations. The device adapters 208 can include a latch mechanism (not shown) for attaching to the programmer 112.

The destination sockets 210 can hold the programmable devices 128. The destination sockets 210 can be used to read or write new information to the programmable devices 128.

The programmer 112 can include the device placement unit 212. The device placement unit 212 is a mechanism for positioning the programmable devices 128 in one of the destination sockets 210.

The device placement unit 212 can be implemented in a variety of ways. For example, the device placement unit 212 can be a robotic arm, a pick and place mechanism, or a combination thereof. Although the device placement unit 212 can be described as a rail-based positioning system, it is understood that any system capable of positioning one of the programmable devices 128 in the destination sockets 210 can be used.

The device placement unit 212 can retrieve one or more of the programmable devices 128 that are blank from the input device receptacle 206. The device placement unit 212 can transfer the programmable devices 128 to the destination sockets 210 of the device adapters 208.

Once the programmable devices 128 are engaged and secured by the device adapters 208, the device programming process can begin. The programmer 112 can program a local copy of the information into the programmable devices 128 in one of the destination sockets 210. For example, the local copy of the programming information can be in a pre-programmed master device, from a file in local storage, or from a remote server.

Once programming is complete, the device placement unit 212 can transport the programmable devices 128 that have been programmed to the output device receptacle 214. The device placement unit 212 can transports any of the programmable devices 128 that have errors to a reject bin (not shown).

The programmer 112 can include a programmer identification 216. The programmer identification 216 is a unique value for the programmer 112. The programmer identification 216 can be used to identify the programmer 112. The programmer identification 216 can be incorporated into a device identification of each of the programmable devices 128 to indicate which programmer 112 was used to program the devices.

Figure 3:
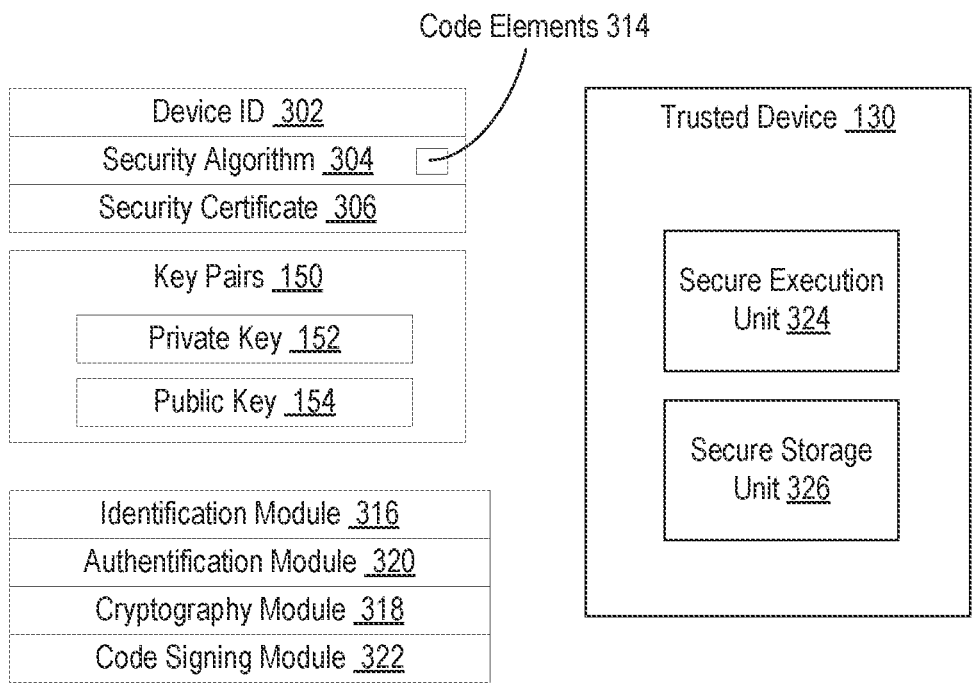
FIG. 3 depicts an example of a trusted device.

Referring now to FIG. 3, therein is shown an example of one of the trusted devices 130. The trusted devices 130 are components having the secure storage unit 326 and the secure execution unit 324. The trusted devices 130 are active components capable of executing secure code in the secure execution unit 324 to perform operations on the secure data in the secure storage unit 326.

The trusted devices 130 can be provisioned by the secure programming system 100 of FIG. 1 to include security information. For example, the trusted devices 130 can include the device identification 302, security algorithms 304, a security certificate 306 and the key pairs 150 each having the private key 152 and the public key 154.

In an illustrative example, the security keys 106 can comprise one or more of the key pairs 150 for a public key encryption system. The security information can be encrypted with the public key 154 of one of the key pairs 150 and decrypted using the private key 152. However, it is understood that the system can take advantage of different security paradigms including symmetric encryption, asymmetric encryption, data encryption standard (DES), hash codes, PGP, or other cryptographic systems. In a further example, the key pairs 150 can be used to provide a digital signature using two different sets of the security keys 106. In the digital signature example, a message or payload can be encrypted using the private key 152 of a first element and the public key 154 of a second element. The resulting encrypted message can be decrypted using the public key 154 of the first element and the private key 152 of the second element. If the message is successfully decrypted, then it shows that the message was encrypted by the first element thus established the digital signature.

The device identification 302 is a data value that can uniquely identify each of the trusted devices 130 individually. For example, the device identification 302 can include serial numbers, markers, security codes, or a combination thereof.

The security algorithms 304 are secure code elements 314. The security algorithms 304 can provide an application programming interface to external systems to control security functionality on the trusted devices 130. The security algorithms 304 can be customized to each of the trusted devices 130. For example, the security algorithms 304 can include the code elements 314 such as source code, executable code, a library module, a link module, configuration files, initialization data, hardware control codes, or a combination thereof.

The security certificate 306 is a security object associated with one of the trusted devices 130. The security certificate 306 can be pre-programmed to certify that a device has a particular root of trust embedded in it. The security certificate 306 can have one or more of the public key 154 in them. The security certificate 306 can include security data such as key pairs 150, security keys 106 of FIG. 1, encrypted passwords, or a combination thereof.

The security certificate 306 can be a securely stored data element. For example, the security certificate 306 can be encrypted security information that must be decrypted before use.

The key pairs 150 can be security elements having two or more separate security keys used to encrypt and decrypt data. For example, the key pairs 150 can include the private key 152 and the public key 154. The security information encrypted with the public key 154 can be decrypted using the private key 152.

The key pairs 150 can be implemented in a variety of ways. For example, the key pairs 150 can be configured to have different key lengths to change the level of security. The private key 152 and the public key 154 can be implemented with the same or different character lengths.

Although the key pairs 150 are described in the context of a public key encryption system, it is understood that the key pairs 150 can also be used to implement other encryption paradigms. For example, the key pairs 150 can be used for symmetric encryption, asymmetric encryption, standards based encryption, hashing algorithms, or any other encryption system.

The trusted devices 130 can include security functionality implemented as security modules. For example, the trusted devices 130 can include an identification module 316, an authentication module 320, a cryptography module 318, and a code signing module 322.

The identification module 316 can verify the identification of one of the programmable devices 128. The identification module 316 can receive the device identification 302 of one of the programmable devices 128 and determine if the device identification 302 is correct. For example, the device identification 302 can be compared to a list of known devices, compared against a checksum, compared using a computational algorithm, or similar techniques.

The authentication module 320 can authenticate one or more of the properties of one of the programmable devices 128. The authentication module 320 can receive the device identification 302, the security parameters including one or more of the security keys 106 to determine if the security parameter provided is valid. The authentication module 320 can also be used to validate the device identification 302.

The validity of the security parameter can be determined in a variety of ways. For example, the validity of the security parameter can be validated by successfully decoding the security parameter using one of the security keys available to one of the trusted devices 130. In another example, the validity of the security parameters can be validated by decrypting one of the security parameters and comparing it to a predefined value stored within one of the trusted devices 130.

The cryptography module 318 is a unit for performing cryptographic operations. The cryptography module 318 can provide an interface to perform computationally intensive operations such as encryption and decryption. The other security modules can be coupled with the cryptography module 318 to provide security functionality.

The cryptography module 318 can be implemented in a variety of ways. For example, the cryptography module 318 can include hardware, software, or a combination thereof. The cryptography module 318 can provide a standardized interface to allow the other security modules to perform the required cryptographic functions.

The code signing module 322 is a unit for securing code elements 314. The code signing module 322 can encrypt code elements, decrypt code elements, and control the execution of the code elements. The code signing module 322 can be used to ensure that one of the code elements 314 can be executed on one of the trusted devices 130 by verifying that the security information associated with the code element 314.

In an illustrative example, each of the code elements 314 can include an execution parameter that indicates the model number of the trusted devices 130 where the code elements 314 are authorized to execute. The code signing module 322 can be used to validate the execution parameter, compare the parameter to the model number information in one of the trusted devices 130, and only allow execution of the code elements 314 if the two values match. This could be used to limit operation of the code element 314 to a particular high end phone or other specific device.

One of the advantages of the trusted devices 130 is that the trusted devices 130 can identify and authenticate the security information internally to increase the level of security. The trusted devices 130 can validate the security information using the security keys 106 stored in the secure storage unit 326.

The trusted devices 130 can provide a measure of trust when the trusted devices 130 are secure. The trusted devices 130 can have a variety of configurations. For example, the trusted devices 130 can have a system identification, an authentication mechanism, encryption and decryption functionality, code signing to protect executables, trusted storage, and a trusted execution environment.

The system identification can include elements that identify or describe hardware and software components. The trusted devices 130 can have the ability to securely authenticate its identity and other properties. The trusted devices must be able to securely encrypt and decrypt information. The trusted devices 130 must be able to authenticate trusted code. The trusted devices must have secure storage and execution capability.

The secure programming system 100 must be able to implement a system of roots of trust. The roots of trust (RoT) are a set of functions in a trusted computing environment that are always trusted by the system. For example, the roots of trust can serve as a separate secure compute engine controlling the trusted computing platform cryptographic process. Alternatively, devices can implement the roots of trust as hardware and software components that are inherently trusted. They are secure by design and can be implemented in hardware or protected by hardware. They can be used to perform security critical functions such as measuring or verifying software, protecting cryptographic keys, and performing device authentication.

The roots of trust can provide a variety of security functionality including: on the fly encryption, detection and reporting of tampering with secure data, detection of active tampering attempts, digital rights management, and other security functions.

Implementing secure operation in a mobile hardware space is difficult because of the higher risk resulting from physical access to the devices. Such secure devices require the hardware to work closely with protected data and software to insure secure operation.

Figure 4:
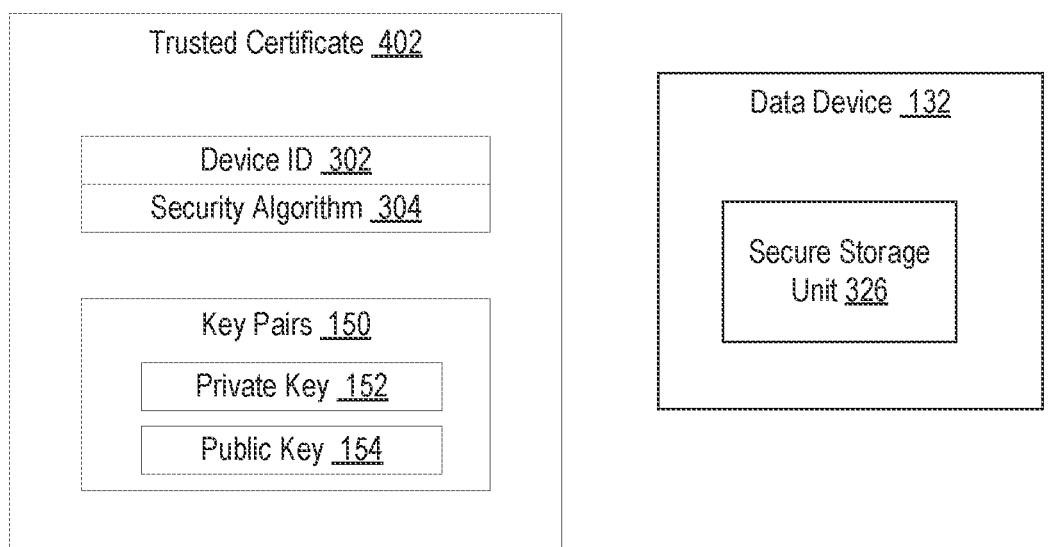
FIG. 4 depicts an example of a data device.

Referring now to FIG. 4, therein is shown an example of one of the data devices 132. The data devices 132 are components having the secure storage unit 326. The data devices 132 are passive components capable storing the secure data in the secure storage unit 326 and providing access to the stored data when accessed by one of the trusted devices 130 of FIG. 1.

The data devices 132 can be provisioned by the secure programming system 100 of FIG. 1 to include security information. For example, the data devices 132 can include the device identification 302, the security algorithms 304, the security certificate 306 of FIG. 3, and the key pairs 150 each having the private key 152 and the public key 154. In this case, the data within the secure storage unit 326 may be internally accessed from within the data devices 132.

The secure storage unit 326 can be used as a write once data area. Information can be programmed into the secure storage unit 326 and then the secure storage unit 326 can be processed to eliminate the access to the data within the secure storage unit 326 from outside the data devices 132.

In an illustrative example, one of the data devices 132 can be a flash memory device. Within the flash memory device, the flash memory can be partitioned into different blocks. Some of the blocks can be used to provide general memory space. Some of the other blocks may be configured to be private and used to store information that is not accessible from outside the flash memory drive. A private block can be used to form the secure storage unit 326.

In another example, the secure storage unit 326 can be a dedicated memory area on one of the data devices 132 that is protected by a security fuse. The data can be written to the secure storage unit 326 and then external access can be eliminated by blowing the security fuse.

Each of the data devices 132 can include a trusted certificate 402. The trusted certificate 402 is a data structure that can include other security parameters. For example, the trusted certificate 402 can include the device identification 302, the security algorithms 304, and the key pairs 150.

Figure 5:
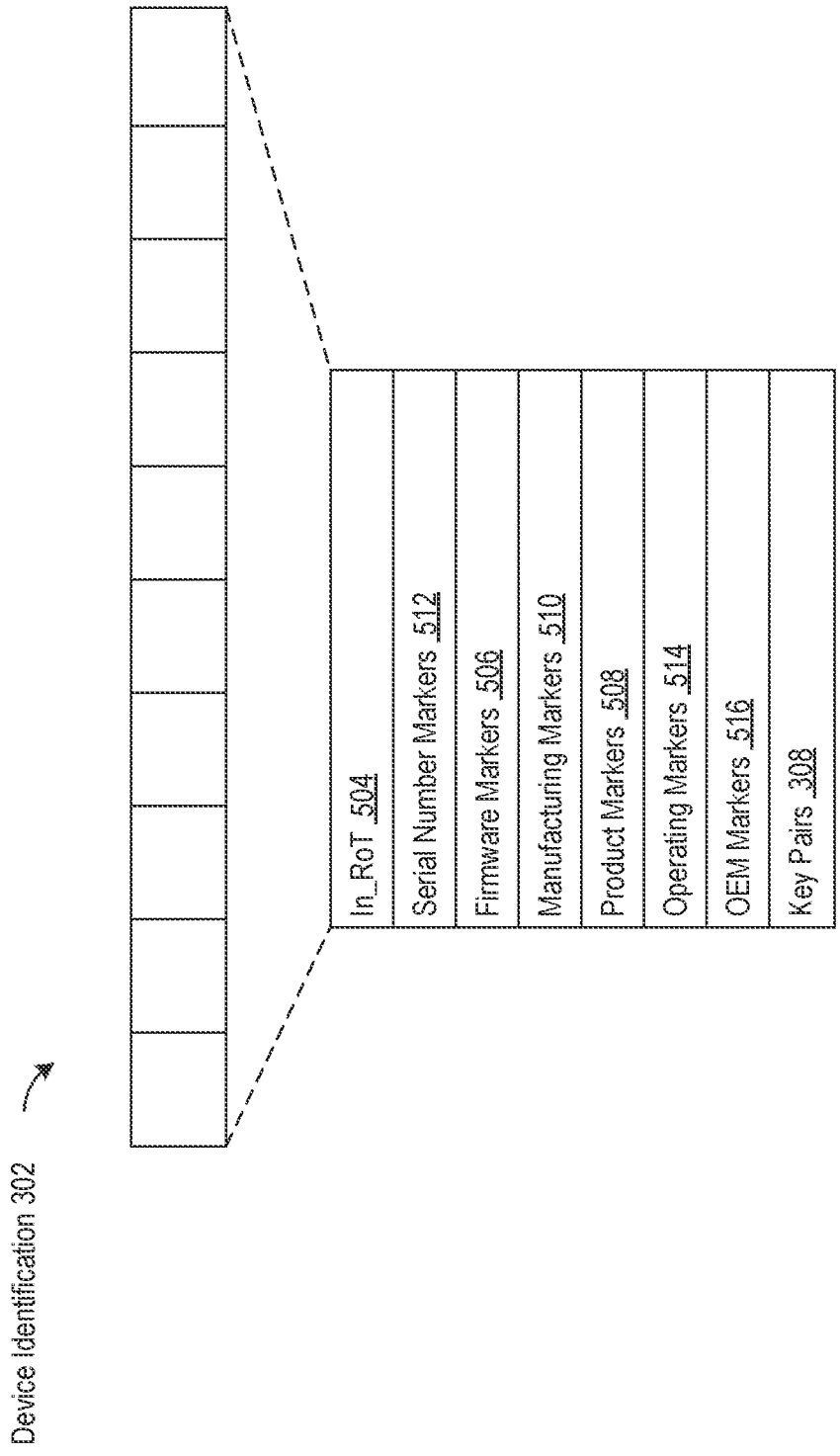
FIG. 5 depicts an example of a device identification.

Referring now to FIG. 5, therein is shown an example of the device identification 302. The device identification 302 is a data structure that can be used to uniquely identify one of the programmable devices 128 of FIG. 1, the secure programming system 100 of FIG. 1, the programmer 112 of FIG. 1, or a combination thereof. The device identification 302 can be used to describe the programmable devices 128 including the data devices 132 and the trusted devices 130.

The device identification 302 can have a variety of configurations. For example, the device identification 302 can include an incoming root of trust 504, serial number markers 512, firmware markers 506, manufacturing markers 510, product markers 508, operating markers 514, original equipment manufacturer markers 516 (OEM markers), the key pairs 150, or similar markers.

The incoming root of trust 504 is a security element. The incoming root of trust 504 can be programmed into one of the programmable devices 128 at manufacture or programming time. For example, the incoming root of trust 504 can be a serial number and a key value. In another example, the incoming root of trust 504 can be an embedded identifier, such as a device identifier implanted at silicon creation time in one of the programmable devices 128.

The serial number markers 512 are security elements that can include a serial number for one of the programmable devices 128. The device identification 302 can include one or more of the serial number markers 512.

The firmware markers 506 are security elements that can describe or identify the firmware used in one of the programmable devices 128. The firmware markers 506 can include a version number, a calculated checksum value, a partial or complete hash value, a text string identifier, a numeric identifier, or a combination thereof. For example, one of the programmable devices 128 can be a circuit board having firmware installed on the board. The firmware markers 506 can identify the version number for each separate firmware element. The firmware version information could be used to coordinate interoperability between code elements 314 of FIG. 3 in the programmable devices 128. In another example, the firmware markers 506 can include a calculated hash checksum, such as a MD5 hash or fingerprint. The hash checksum can be used to verify the data integrity of the firmware by comparing the hash checksum against a hash calculated against the live version of the firmware. Any difference would indicate that the firmware has been modified.

The manufacturing markers 510 are security identifiers that can describe one or more manufacturing properties. For example, one of the programmable devices 128 can include the manufacturing markers 510 such as location information, programmer identification, programming unit identification, manufacturing time information, manufacturing location information, time windows, manufacturing execution system identification information, factory identification, vendor identification, manufacturing equipment information, or manufacturing related parameters.

The product markers 508 are security elements that can describe the products used with the programmable devices 128. The product markers 508 can include related manufacturers, branding information, product line information, model information, or other product related parameters.

The operating markers 514 are security elements that can describe the operating properties for the programmable devices 128. The operating markers 514 can include operating voltage, voltage patterns, current levels, power draw, heating factors, critical operating frequencies, operating sequence information, or operating parameters.

The OEM markers 516 are security elements that can describe the original equipment manufacturers or related contract manufacturers who can use the programmable devices 128. The OEM markers 516 can include manufacturer identification 518, license information, time windows, authorized locations, authorized factories, product lot size, serial number ranges, or other OEM related parameters.

The device identification 302 is a multi-variable data structure that includes security information for the programmable devices 128. The data elements of the device identification 302 can be individually encrypted within the device identification 302. The device identification 302 itself can be encrypted. The device identification 302 can be specific to each one of the programmable devices 128 both in terms of the data elements forming the device identification 302 and the degree of encryption and other security mechanisms used to protect the device identification 302 itself.

One of many advantages of the device identification 302 is the enablement of access to specific data elements within the device identification 302 by decrypting only the elements required. By encrypting both the device identification 302 and the individual data elements, a finer granularity of security can be provided.

Figure 6:
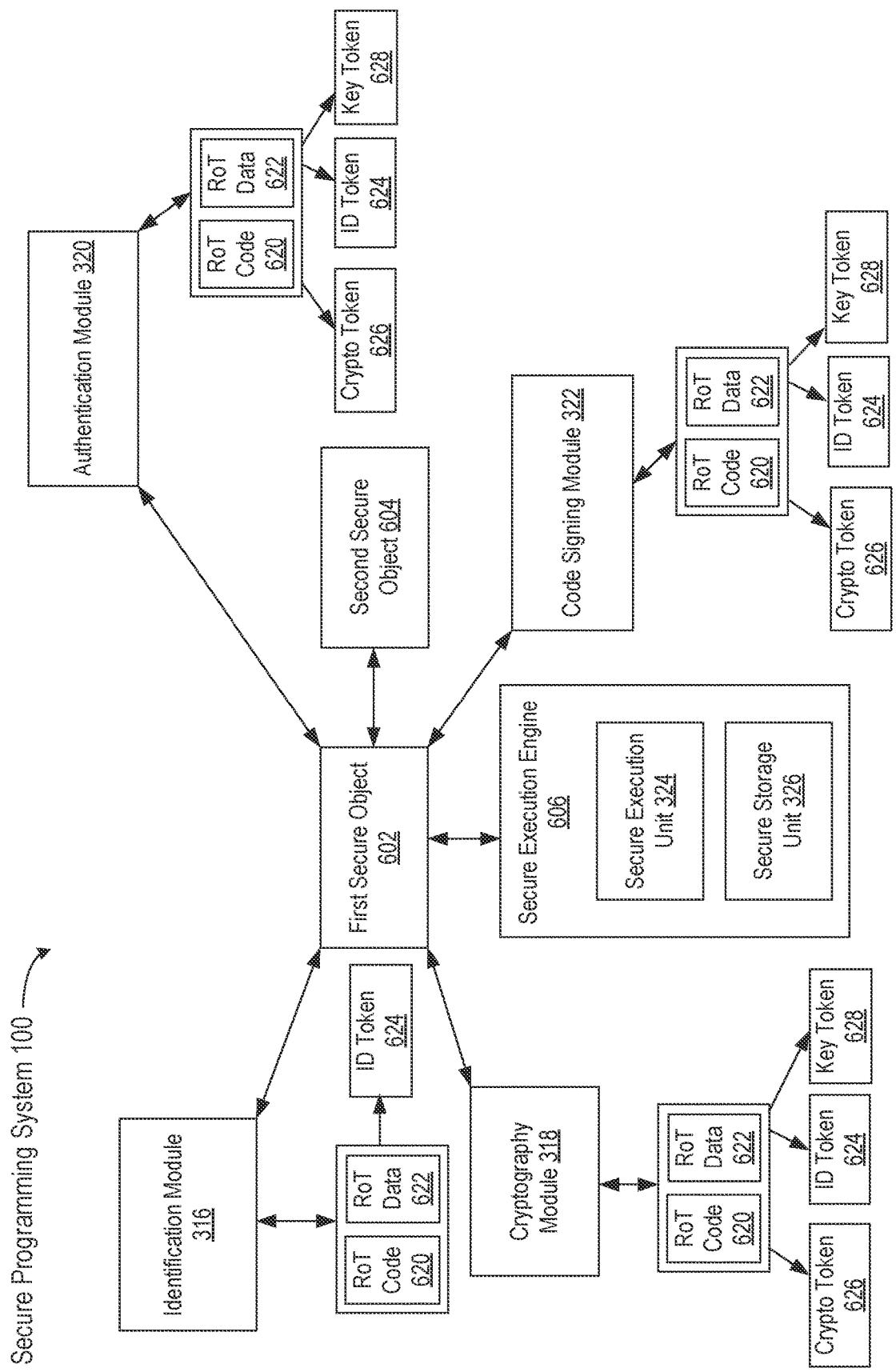
FIG. 6 depicts an example block diagram of a secure programming system.

Referring now to FIG. 6, therein is shown an example block diagram of the secure programming system 100. The secure programming system 100 includes several secure objects, such as a first secure object 602 and a second secure object 604. The first secure object 602 may interface or communicate with the second secure object 604.

The secure objects represent any hardware or software objects having security mechanisms or protocols for protection from unauthorized interception or duplication. For example, the secure objects may include, but is not limited to, one of the data devices 132, one of the trusted devices 130, an electronic component, an electronic device, a boot loader, a firmware (FW), an operating system (OS), a software application, a hardware programmer, a peripheral device, a website, a machine, etc.

The first secure object 602 may interface with the identification module 316, the authentication module 320, the cryptography module 318, and the code signing module 322. For illustrative purposes, although the second secure object 604 is shown connected only with the first secure object 602, the second secure object 604 may also be connected with any combination of the identification module 316, the cryptography module 318, the authentication module 320, the code signing module 322. The first secure object 602 or the second secure object 604 is protected from security breach using, but is not limited to, a combination of the identification module 316, the cryptography module 318, the authentication module 320, the code signing module 322, any other units, modules, or functions of the secure programming system 100.

The identification module 316 generates an identity of a secure object to protect the secure object from an unauthorized access to the secure object. The identification module 316 extracts identification tokens 624 (ID tokens). The ID tokens 624 include information that is employed to verify an identity before access to a secure object is granted. The ID tokens 624 may include, but are not limited to, a user identification, a serial number of a device, a device identification, etc.

The ID tokens 624 may be extracted by the identification module 316 using any secure information or mechanism, including, but is not limited to, a root of trust code 620 (RoT code) and a root of trust data 622 (RoT data). For example, the Rot data 622 may represent information associated with a digital birth certificate of a device.

The term root of trust (RoT) referred to herein refers to a set of functions in a trusted or secured computing module that includes hardware components, software components, or a combination of hardware and software components. For example, these functions may be implemented in, but are not limited to, a boot firmware, a hardware initialization unit, a cross-checking component/chip, etc. Also, for example, the functions may be implemented using, but is not limited to, a separate compute engine that controls operations of a cryptographic processor.

The ID tokens 624 may be extracted from the Rot data 622 using the Rot code 620. The ID tokens 624 may be cryptographically protected and so may be decrypted only by the Rot code 620. The ID tokens 624 may be unique such that each secure object has its own identification and so none of the secure objects shares its identification with another secure object.

The Rot code 620 includes instructions or commands that are used to decipher data that may be used to identify a source of a device or to decode content. The Rot data 622 includes information that is protected and may only be decoded using the Rot code 620.

The Rot code 620 and Rot data 622 may be provided or generated by any secure mechanisms. For example, the Rot code 620 and Rot data 622 may be programmed into a secure storage unit of a device during programming or configuring the device.

Also, for example, the Rot code 620 and Rot data 622 may be sent from a host server or system to the secure programming system 100 in a secure manner such that only the secure programming system 100, which has been authorized and validated to receive the Rot code 620 and Rot data 622. Further, for example, the host server or system may include the security master system 104 of FIG. 1 that sends the security keys 106 of FIG. 1 to the secure programming system 100 for identification or authentication before the secure programming system 100 may be able to receive or decrypt information from the security master system 104.

As an example, the secure storage unit may include, but is not limited to, a one-time programmable memory or any other storage units that are known only to authorized users or devices. As another example, the secure storage unit may include, but is not limited to, a storage or memory that is accessible only with authorized information or identification without which permission would be denied.

For example, the Rot code 620 and Rot data 622 may be preprogrammed into a device, such as the secure objects, at the time when the device is programmed or configured before the device is integrated or operated in a production environment or system. Also, for example, the production environment or system may include, but is not limited to, a portable device, a computer, a server, an electronic circuit board, etc.

The authentication module 320 can be used to verify whether an identification token 624 is authorized for access to a secure object. After the identification module 316 extracts the ID tokens 624, the authentication module 320 verifies the ID tokens 624 to identify whether a secure object is a valid object that may communicate with an authorized system to send or receive secure information. For example, if one of the ID tokens 624 is not valid, the secure object may not be allowed to exchange information with the programmer 112 of FIG. 1.

After the authentication module 320 verifies that the ID tokens 624 of the secure object is valid, the authentication module 320 may generate a combination of one of the ID tokens 624, a key token 628, and a cryptographic token 626. The key token 628 includes information employed for authentication of the ID tokens 624. The cryptographic token 626 includes information employed for cryptographically encode or decode information for information security or data confidentiality.

In one or more embodiments, the ID tokens 624, the key token 628, or the cryptographic token 626 may be generated from the Rot data 622 using the Rot code 620. In one or more embodiments, the ID tokens 624, the key token 628, or the cryptographic token 626 may be cryptographically protected and so may be decrypted only by the Rot code 620.

The cryptography module 318 can provide data encryption and decryption for secure information exchanged between the secure objects or between a secure object and an external system. The external system that may exchange the secure information with the secure objects may include, but is not limited to, the programmer 112, the security master system 104, a host system, etc.

In one or more embodiments, after the identification module 316 extracts the ID tokens 624 or the authentication module 320 validates the ID tokens 624, the cryptography module 318 may generate the ID tokens 624, the key token 628, and the cryptographic token 626. The cryptographic token 626 may be generated by the cryptography module 318 using the Rot code 620 to decode information from the Rot data 622.

In one or more embodiments, the cryptography module 318 may generate the ID tokens 624 or the key token 628 using the cryptographic token 626 to further decode other information from the Rot data 622. In an embodiment, elimination of a data breach is greatly simplified using the cryptography module 318 having multiple levels of protection that improve information security or data confidentiality.

In one or more embodiments, the cryptography module 318 may include cryptography methods including, but is not limited to, symmetric-key cryptography, public-key cryptography, etc. For example, the cryptography module 318 may include a cryptographic method in which both sender and receiver may share the same key or different keys that may be computed using a predetermined algorithm.

As an example, the cryptographic method may include, but is not limited to, block cipher methods, cryptographic hash functions, etc. As another example, the cryptographic method may include, but is not limited to, Data Encryption Standard (DES), Advanced Encryption Standard (AES), triple-DES, MD4 message-digest algorithm, MD5 algorithm, Secure Hash Algorithms 1 and 2, etc.

As an example, the cryptographic method may include, but is not limited to, a public-key or an asymmetric key cryptography in which two different but mathematically related keys may be used—the public key and the private key. As another example, a public key system may be constructed so that calculation of one key (e.g., a private key) may be computationally infeasible from the other key (e.g., a public key), even though they are related. Both public and private keys may be generated secretly as an interrelated pair.

For example, in public-key cryptosystems, a public key may be freely distributed, while its paired private key may remain secret. In a public-key encryption system, a public key may be used for encryption, while a private or secret key may be used for decryption.

The code signing module 322 verifies the integrity of code information exchanged between systems or devices. The code signing module 322 can verify whether content of exchanged information has been altered or tampered.

For example, the code signing module 322 may include a process of digitally signing executables or scripts to confirm a software author or generator and validates that an executable code or script has not been altered or corrupted. Also, for example, a code may be verified as altered or corrupted since it was signed by way of, but is not limited to, a cryptographic hash, checksum, etc.

In one or more embodiments, after the identification module 316 extracts the ID tokens 624 or the authentication module 320 validates the ID tokens 624, the code signing module 322 may generate the ID tokens 624, the key token 628, and the cryptographic token 626. The cryptographic token 626 may be generated by the code signing module 322 using the Rot code 620 to decode information from the Rot data 622.

In one or more embodiments, the code signing module 322 may generate the ID tokens 624 or the key token 628 using the cryptographic token 626 to further decode other information from the Rot data 622. In an embodiment, elimination of data breach is greatly simplified using the code signing module 322 having multiple levels of protection that improve information security or data confidentiality.

A secure object, such as the first secure object 602 or a second secure object 604, may interface with a secure execution engine 606. The secure execution engine 606 includes a mechanism that manages or controls operations of the secure object. The secure execution engine 606 includes a secure execution unit 324 and a secure storage unit 326.

The secure execution unit 324 is a block that executes codes or computer instructions in a protected environment. The environment in which the secure execution unit 324 operates may create a flexible, scalable solution to problems of creating a large-scale, wide-area secure environment in which only trusted, authenticated application code can operate. The secure execution unit 324 may enable the programmer 112 and the secure objects to work together in a secure environment.

The secure execution unit 324 may execute trusted codes that have been stored by the secure storage unit 326 when the secure objects were previously programmed, configured, tested, or certified before the secure objects operate in an end-user production environment. The trusted codes executed by the secure execution unit 324 may be signed and authenticated.

The secure storage unit 326 stores and provides trusted codes for the secure execution unit 324 to execute. In an embodiment, secure environment is greatly simplified using the secure execution engine 606 that stores program codes in the secure storage unit 326 and executes the program codes using the secure execution unit 324, thereby providing an additional level of protection against data breach.

For example, the trusted codes may be previously stored in a secure storage or memory area of the secure objects when the secure objects were previously programmed, configured, tested, or certified. Also, for example, the trusted codes may be decoded by the cryptography module 318 using information sent from the programmer 112 to the secure objects.

Figure 7:
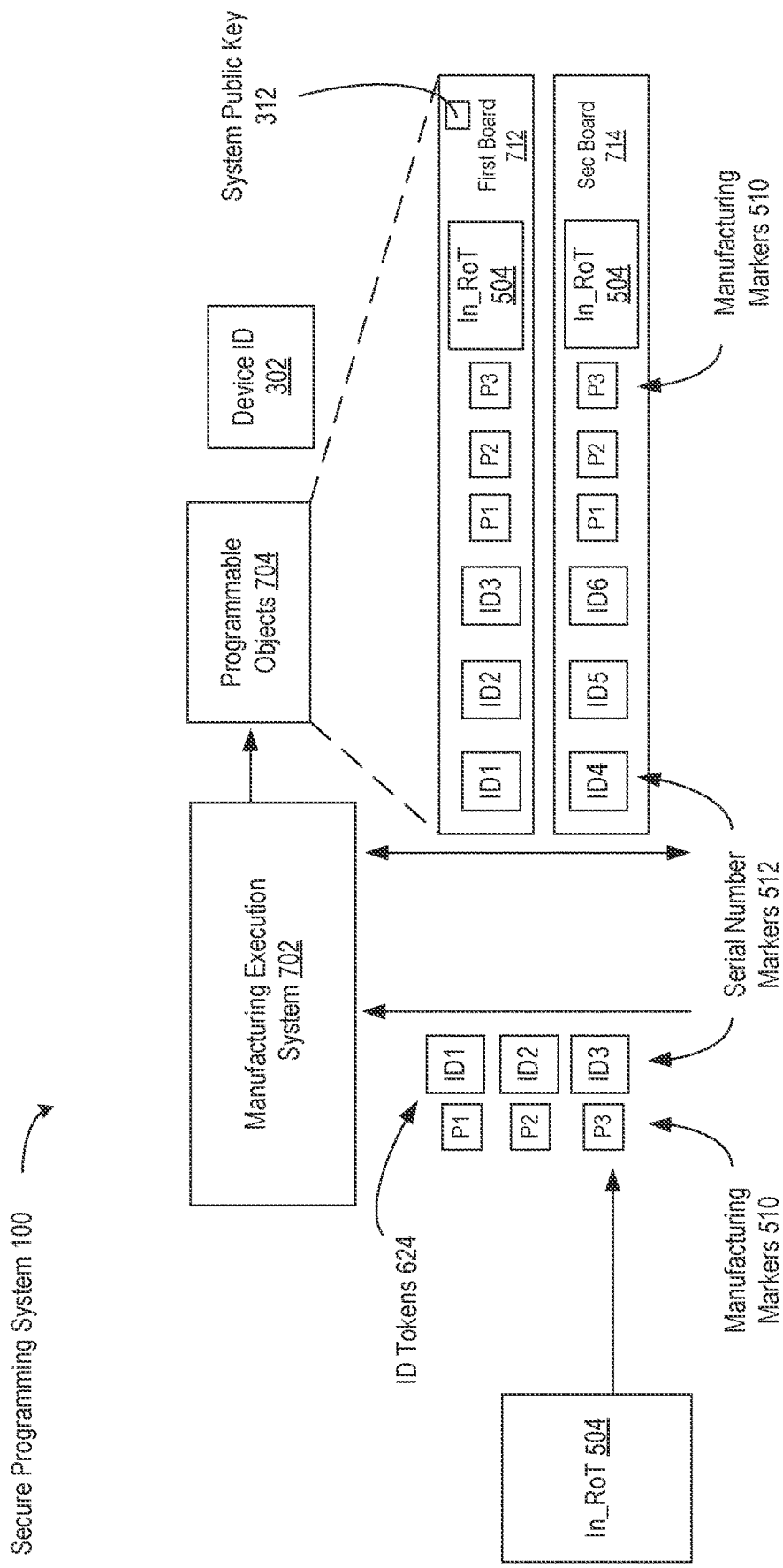
FIG. 7 depicts a second example block diagram of the secure programming system.

Referring now to FIG. 7, therein is shown a second example block diagram of the secure programming system 100. The example diagram shows a data flow of secure information during programming of the secure objects.

For example, the identification tokens 624, depicted as ID1, ID2, and ID3, may include serial number markers 512 of the secure objects. The serial number markers 512 are unique information assigned to each secure object. The serial number markers 512 of a secure object can be different from another of the serial number markers 512 of another secure object such that there may not be two secure objects share the same serial number marker. The serial number markers 512 may be generated by the programmer 112 of FIG. 1. Each serial number marker may be assigned to each secure object by the programmer 112.

An incoming root of trust 504 (In_RoT) of FIG. 5 may include, but is not limited to a programmer identification 216 of FIG. 2. The In_RoT 706, denoted as In_RoT 706, includes information that have been previously programmed or configured prior to programming the secure objects. In one or more embodiments, the previously programmed information may have been programmed into a combination of adapters for programming the secure objects, the programmer 112, and the secure objects. For example, the In_RoT 706 can be a serial number implanted in the secure object at silicon manufacture time.

The In_RoT 706 may be separate or different from the ID tokens 624. The In_RoT 706 may include information previously programed that is different from information to be programmed into the secure objects.

For example, the In_RoT 706 may include, but is not limited to, serial numbers or unique keys that were embedded or programmed into components at the time of manufacturing the components. Also, for example, the time of manufacturing the components may be, but is not limited to, a time when the components were manufactured at silicon level or a system level prior to programming the components.

In one or more embodiments, the In_RoT 706 may be ingested or input by a manufacturing execution system 702 (MES). The In_RoT 706 may be combined with a programmer generated unique RoT, such as the ID tokens 624, to generate a unique system-level RoT. The In_RoT 706 may include information from a digital birth certificate that has been previously programmed into a component during the manufacture of the component.

The In_RoT 706 may include any number of manufacturing markers 510, denoted as P1 and P2. The manufacturing markers 510 include information associated with components when the components are manufactured. For example, the manufacturing markers 510 may include, but is not limited to, a component ID, a programmer ID, a location of manufacture of a component, a date and a time of manufacture of a component, etc.

The manufacturing execution system 702 is a computerized system used in manufacturing for product quality control purposes. The MES 702 may track and document transformation of raw materials to finished goods. The MES 702 may provide information about how current conditions on a plant floor can be optimized to improve production output. The MES 702 work in real time to enable control of multiple elements of a production process (e.g., inputs, personnel, machines, support services, etc.).

In one or more embodiments, the MES 702 may receive the In_RoT 706 along with the ID tokens 624 to program the programmable devices 128. The In_RoT 706 and the ID tokens 624 may be used to generate the device identification 302 of a secure object. The device identification 302 includes information that is unique and associated with only one device or secure object.

The device identification 302 may include unique information that may be programmed into a system, such as a first board 712 or a second board 714. The first board 712 or a second board 714 are board-level systems with several secure objects assembled and connected with each other in the systems.

The first board 712 may include a system public key 154 for cryptography. The system public key 154 may be implemented in the first board 712 for a public key encryption system. The system public key 154 may be part of one of the key pairs 150 of FIG. 1. Security information may be encrypted by a secure object using the public key 154 of FIG. 1 of one of the key pairs 150 and decrypted by the first board 712 using the private key 152.

The first board 712 may use the system public key 154 to encrypt secure information and send to a secure object, which may decrypt the encrypted information using the private key 152. Although the system public key 154 is described for the first board 712, it is understood that a system public key may be implemented in the second board 714.

System 100 illustrates only one of many possible arrangements of components configured to provide the functionality described herein. Other arrangements may include fewer, additional, or different components, and the division of work between the components may vary depending on the arrangement. For example, in some embodiments, some of the security modules may be omitted, along with any other components relied upon exclusively by the omitted component(s). As another example, in an embodiment, system 100 may further include multiple serial numbers or other system identifiers.

Figure 8:
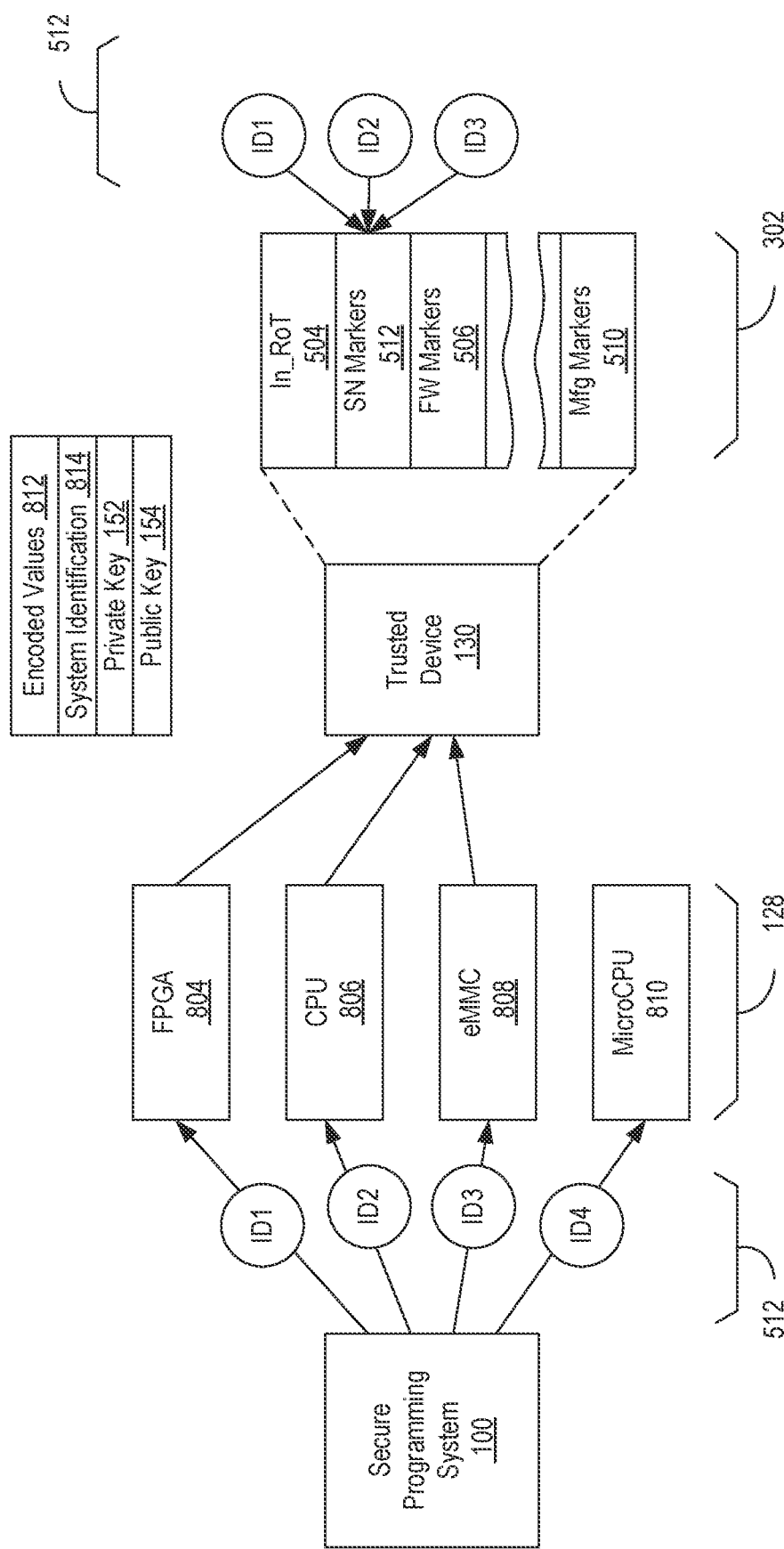
FIG. 8 is a block diagram of a provisioning one of the trusted devices.

Referring now to FIG. 8, therein is shown an example of provisioning one of the trusted devices 130. The provisioning process can program security data into the programmable devices 128 and associate the trusted devices 130 with another one of the trusted devices 130. In addition, the provisioning process can associate the trusted devices 130 with the secure programming system 100.

The secure programming system 100 can encode one or more of the serial number markers 512 using the public key 154 of the secure programming system 100 and program the encrypted values in the programmable devices 128. For example, the programmable devices 128 can include a field programmable gate array 804, a programmable central processing unit 806 (CPU), an embedded multimedia memory controller 808 (eMMC), a microCPU 810, or a similar device.

Thus, each of the programmable devices 128 can have one of the serial number markers 512 that can only be decrypted using the private key 152 of FIG. 1 associated with the secure programming system 100. In an illustrative example, the serial number markers 512 can represent a system identification 814 of the secure programming system 100. This can provide a security linkage between the security programming system 100 and the programmable devices 128. The security linkage indicates a relationship between the security programming system 100 and the programmable devices 128.

Although the provisioning process is described using the private key 152 of the secure programming system 100, it is understood that one of the serial number markers 512 of a different system component can be used. For example, the programmable devices 128 can be provisioned using the serial number markers 512 for the programmer 112 of FIG. 1.

After being provisioned, the programmable devices 128 can then be installed on one of the trusted devices 130, such as a circuit board, that can also be provisioned with the public key 154 of the secure programming system 100. The circuit board can then identify the programmable devices 128 by decrypting the encoded values 812 and compare the results to confirm that the serial number markers 512 match.

In another example, the secure programming system 100 can receive the serial number markers 512 for one of the trusted devices 130, such as the circuit board, and provision the programmable devices 128 with the encoded values 812 generated by encrypting the serial number markers 512 of the circuit board and programming the information into the programmable devices 128. After installation, the circuit board can decrypt the encoded values 812 and compare the serial number markers 512 to the serial number of the circuit board.

The trusted devices 130 can be provisioned with the device identification 302. The device identification 302 for one of the trusted devices, such as the circuit board, can include the incoming root of trust 504, the serial number markers 512, the firmware markers 506, the manufacturing markers 510, or a similar identifier. For example, the serial number markers 512 can include the identifiers ID1, ID2, and ID3 associated with different types of the programmable devices 128. Each of the programmable devices 128 associated with the appropriate identifier can be identified and authenticated by the circuit board where the circuit board has been provisioned with the public key 154 of the appropriate component.

Although the provisioning process is described as using the serial number markers 512 to identify the related and authorized systems, it is understood that other elements within the device identification 302 can be used as well. For example, the programmable devices 128 can use another portion of the device identification 302, such as the manufacturing markers 510 or the firmware markers 506, to establish the security linkage between the trusted devices 130, such as the circuit board, and the programmable devices 128.

An advantage of the encoding a portion of the device identification 302 using the public key 154 associated with one of the elements of the secure programming system 100 is to provide an authentication mechanism to limit the interoperability of the programmable devices 128 and the trusted devices 130. By provisioning the programmable devices 128 with a value encoded by the public key 154 of one of the elements, the trusted devices 130 can verify that the programmable devices 128 are authorized to operate with the trusted devices 130 using the private key 152.

Figure 9:
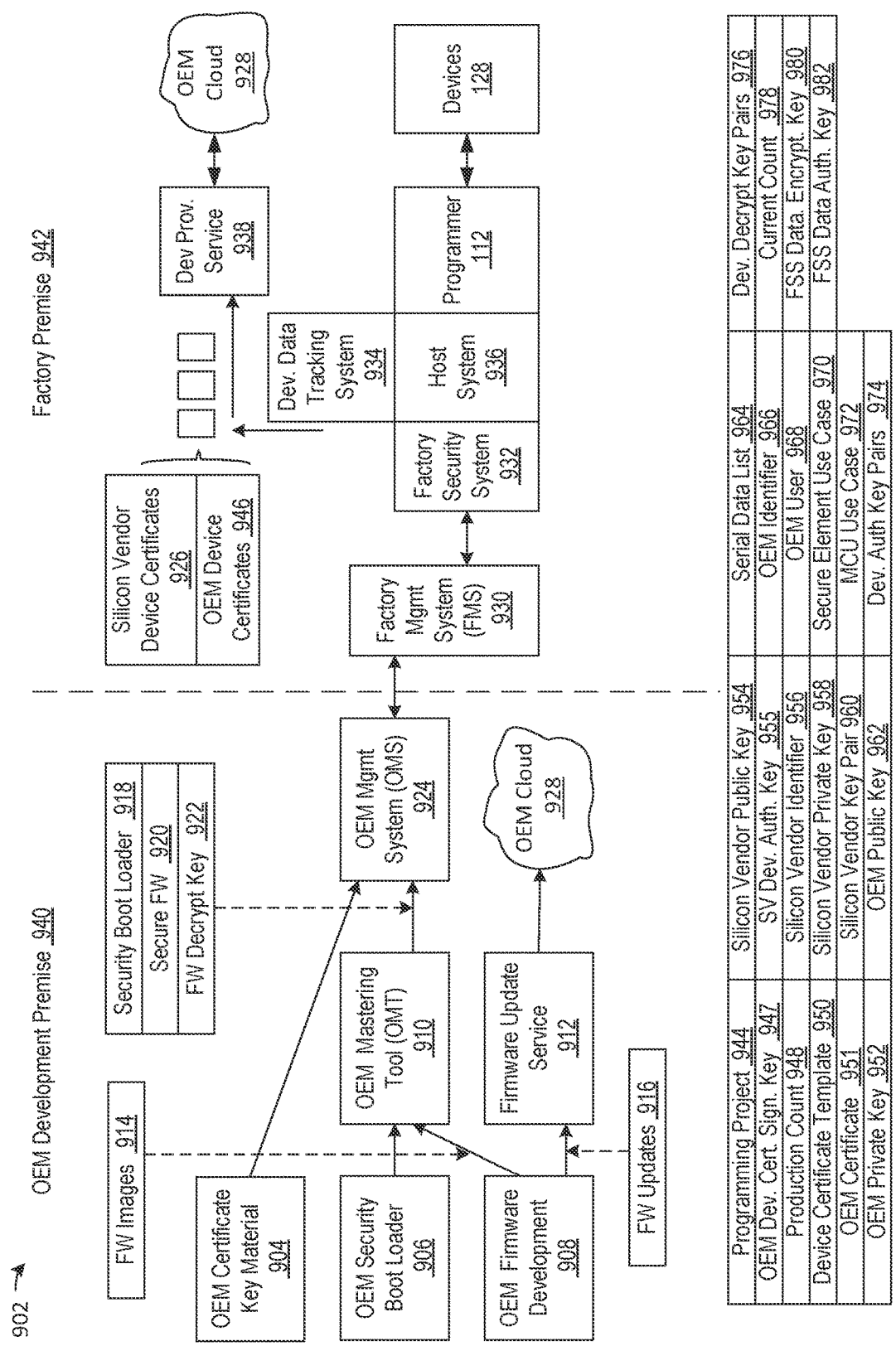
FIG. 9 is an example of a managed and security processing system.

Referring now to FIG. 9, therein is shown an example of a managed and security processing system 902 (MSP system). The MSP system 902 can securely deploy and provision the programmable devices 128.

The MSP system 902 can individually configure data devices and active, trusted devices with cryptographic information to provide a secure programming and operation environment. The MSP system 902 can allow the secure programming of the programmable devices 128 at a secure original equipment manufacturer (OEM) site.

The MSP system 902 can be one of the embodiments of the secure programming system 100 of FIG. 1. The elements of the MSP system 902 can be implemented using the element of the secure programming system 100.

The MSP system 902 can support the operation of the system distributed in part across multiple locations or premises. The MSP system 902 can include an OEM development premise 940 and a factory premise 942. The OEM development premise 940 can be used to prepare for the actual programming and provisioning of the programmable devices 128. The OEM development premise 940 can be used to prepare programming information for multiple factories. The OEM development premise 940 is a location where an OEM can prepare the programming project 944 having the information for configuring a set of secure devices, such as the programmable devices 128, secure elements, trusted devices 130 of FIG. 1, or other similar devices.

Although there are differences between the different types of secure devices, the terms are generally understood to be interchangeable and are general in nature. The secure devices, secure elements, programmable devices 128, trusted devices 130, and other similar elements can be used interchangeably in this description for convenience and brevity.

The OEM development premise 940 can take firmware images 914 that are used to provision the programmable devices 128 and prepare the programming project 944. The programming project 944 can then be securely transferred to the factory premise 942 and used to control the programming of the programmable devices 128.

The OEM development premise 940 can have a set of secure manufacturing systems and data stores for facilitating creating the programming project 944. For example, the OEM development premise 940 can include OEM certificate key material 904, an OEM security boot loader 906, the OEM firmware development system 908, an OEM mastering tool 910, a Firmware update service 912, and an OEM management system 924.

The factory premise 942 is a location for programming and provisioning the programmable devices 128. The factory premise 942 can be a programming center, a fabrication facility, a contract manufacturer site, or a similar location. In an embodiment, the factory premise 942 is where the programmer 112 and the programmable devices 128 are locate and operated.

The MSP system 902 can include a security boot loader 918. The security boot loader 918 is the secure programming code that can be executed at boot time on the programmable devices 128 to insure compliance with the security protocols. The OEM security boot loader 906 creates device identity, creates the ability to accept an encrypted data stream and de-crypt on device and initializes a secure run time environment on the device so that firmware can run securely on the device.

The MSP system 902 can also include secure firmware 920. The secure firmware 920 is software code and data to be embedded in non-volatile memory of the programmable devices 128. The secure firmware 920 can be transferred in an encrypted state and decrypted at the programmer 112.

The MSP system 902 can include a firmware decrypt key 922. The firmware decrypt key 922 can be used to decrypt the secure firmware 920 that has been encrypted using the encryption key related to the firmware decrypt key 922. For example, the firmware decrypt key and the encryption key can be part of a symmetric key pair used for encryption.

The MSP system 902 can include firmware images 914 from the OEM: The firmware images 914 are embedded application code that will be loaded by OEM security boot loader 906 and run on the programmable devices 128 during and after manufacturing.

The MSP system 902 can include the OEM certificate key material 904: The OEM certificate key material 904 can include information such as a silicon vendor device authentication key 955, an OEM device certificate signature key 947 required to sign an OEM device certificate 946, and an OEM device certificate template 950.

The OEM is a block of information used to form the OEM certificate 951. It includes the basic required information for the OEM certificate 951. The OEM certificate 951 is a block of information that defines an OEM user 968. The OEM certificate 951 can include an OEM identifier 966, an OEM public key 154 and an OEM private key 152. The OEM identifier 966 is a value that uniquely identifies the OEM.

A silicon vendor is an entity that can manufacture or provide the programmable devices 128. The silicon vendor can be identified with a silicon vendor identifier 956. The silicon vendor identifier 956 is a value linked to the silicon vendor. For example, the silicon vendor identifier 956 can be linked to the company that actually makes the integrated circuits or components that form the programmable devices 128. The silicon vendor can also be a company that pre-configures the programmable devices 128 before delivering them for programming by the system.

The MSP system 902 can include an OEM firmware development system 908. The OEM firmware development system 908 supports the development of firmware images 914 for deployment to the programmable devices 128.

The MSP system 902 can include the OEM mastering tool 910 (OMT): The OEM mastering tool 910 is a security application or system that can bind the OEM security boot loader 906 to the firmware images 914. The OEM mastering tool 910 can sign and encrypt the firmware images 914 and prepare the firmware images 914 for field updates. The field upgrades can allow the firmware deployed in the programmable devices 128 to be changed remotely in a secure fashion. The OEM mastering tool 910 can produce the secure firmware 920 by encrypting the firmware images 914 using the firmware decrypt key 922. The OEM mastering tool 910 can include a HSM or TSM and be implemented in hardware or software.

The MSP system 902 can include an OEM management system 924. The OEM management system 924 is a system for defining a programming project 944 for an OEM user. The programming project 944 is an information package that defines a secure production run of the programmable devices 128.

The OEM management system 924 can bind the OEM security boot loader 906, the firmware images 914, the OEM certificate 951, the OEM certificate key materials 904, and a production count 948 to the programming project 944. Once the programming project 944 is initially created, the programming project 944 can updated to include the references, code, and data of the OEM security boot loader 906, the firmware images 914, the OEM certificate key materials 904, the OEM certificate 951, and the production count 948. The binding process means that the information is part of the parameters of the programming project 944. The OEM management system 924 can also bind the programming project 944 to a specific security programming system at the factory premise 942. The programming project 944 can include the system identification 814 of FIG. 8 of a programming system or subsystem such as the secure programming system 100, the programming unit 110, the programmer 112, or a combination thereof. Then the programming project 944 can only be performed on a system having the system identification 814.

The production count 948 is an indicator describing the number of secure devices to be produced in the production run. The production count 948 can be compared to an incrementing number that is updated when a secure device begins or completes production. The programmer 112 receiving the programming project 944 can use the production count 948 to limit the number of devices programmed and provisioned to prevent unauthorized production of the programmable devices 128. During production, a current count 978 can indicate the current number of the products that have been produced. The system can stop programming the devices by comparing the current count 978 to the production count 948 and stopping when the current count 978 is equal to the production count 948.

The OEM management system 924 can be configured in a variety of ways. For example, the OEM management system 924 can be implemented in a shared configuration and generate the programming project 944 for deployment to multiple OEMs each having their own factory, such as the factory premise 942. The OEM management system 924 can be implemented using the secure master storage system 102 of FIG. 1, the security master system 104 of FIG. 1, the secure programming system 100 of FIG. 1, or a combination of systems and subsystems thereof.

The MSP system 902 can include a factory management system 930. The factory management system 930 is a system for managing the secure programming components at the factory premise 942. The factory management system 930 can receive the programming project 944 from the OEM management system 924 and the decrypt and distribute the manufacturing information to the other security and programming systems located at the factory premise 942.

The factory management system 930 can be implemented in a variety of ways. For example, the factory management system 930 can be implemented with the manufacturing execution system 702 of FIG. 7, the programming processor 202 of FIG. 2, the host computer system, or another similar processing system.

The MSP system 902 can include a factory security system 932. The factory security system is an HSM based security appliance that generates keys and certificates to be programmed into the programmable devices 128. The factory security system 932 can support a multi-tenant OEM architecture by isolating the security information of one OEM from that of another. This allows the factory security system 932 to program and provision different sets of the programmable devices 128 for different OEMs in different programmers.

The factory security system 932 can be configured in a variety of ways. For example, the factory security system 932 can be implemented using the security master system 104 of FIG. 1, the security controller 114 of FIG. 1, the programming processor 202 of FIG. 2, the first security module 116 of FIG. 1, the second security module 118 of FIG. 1, the nth security module 120 of FIG. 1, or a combination thereof. The factory security system 932 can be implemented in a centralized or distributed fashion using one or multiple security components in the MSP system 902.

The factory security system 932 can provide high security encryption services including key pair generation, encryption, decryption, certificate management, secure storage, secure execution, and other similar security processing features. The factory security system 932 can also support secure development, secure mastering, secure deployment of data and code, secure provisioning, secure programming, and secure updates.

The factory security system 932 can perform device authentication based on device certificates, deployment management and versioning, digital lifecycle management, and application management. The factory security system 932 can provide symmetric encryption, hash functions, data encapsulation, digital signatures, key agreement and transport, key management, and user access control.

The factory security system 932 can include a factory security system certificate 933 for authenticating the identity of the factory security system 932. The factory security system certificate 933 can be used to sign information transferred from the OEM development premise 940 and the OEM management system 924 to the factory management system 930 and the factory security system 932. The factory security system 932 can include a factory security system data encryption key 980 and a factory security system data authentication key 982. The keys can be used to securely encrypt, decrypt, sign, and authenticate secure information.

The MSP system 902 can include a host system 936 at the factory premise 942. The host system 936 is a computer system for controlling the execution of the programming project 944 and managing the communication between the programmer 112 and Factory security system 932.

The host system 936 can be implemented in a variety of ways. For example, the host system 936 can be implemented using the security controller 114, the programming processor 202, or another similar computing system coupled to the secure processing system 100. The host system 936 can be coupled to the factory security system 932, the programmer 112, the factory management system 930, or other similar systems.

The MSP system 902 can include the programmer 112 for programming the programmable devices 128. The programmer 112 can receive a set of blank or partially programmed devices and securely program the programmable devices 128 with the information from the programming project 944.

The programmer 112 can create serial data lists 964 for programming the programmable devices 128. The serial data lists 964 are lists of device specific data to be programmed into the programmable devices 128. This can include the firmware images 914, the OEM device certificate 946, code, data, or other information. The serial data lists 964 can vary based on the individual device information, such as serial numbers, device identification, data certificates, or similar device specific parameters.

The MSP system 902 can include device certificates to protect the programmable devices 128. The device certificates can include silicon vendor device certificates 926, original equipment manufacturer device certificates 946 (OEM device certificates 946), or other device certificates. The device certificates can include information about the programmable devices 128 including public keys, the device identification 302 of FIG. 3, a silicon vendor identifier 956, the OEM identifier 966, or other similar information.

The silicon vendor device certificate 926 is set of data elements that securely define the identity of one of the secure elements, such as the programmable devices 128 or trusted devices 130 of FIG. 1. The silicon vendor device certificate 926 can include the device identification 302 of FIG. 3, a silicon vendor public key 154, and/or other security information. Information encrypted by a silicon vendor private key 152 can be decrypted using the silicon vendor public key 154 of a silicon vendor key pair 150.

The silicon vendor device certificate 926 can be programmed into a secure storage unit of the secure element by the silicon vendor or manufacturer before the secure elements are transferred to other manufacturers or users. The silicon vendor device certificate 926 can be stored in a write-once secure storage unit where additional information may be added to the silicon vendor device certificate 926, but existing information cannot be erased or modified. Portions of the secure storage unit can be locked when no further changes are required. The secure storage unit can include one or more data elements, such as multiple device certificates and other related security data.

The silicon vendor device certificates 926 can be implemented in a variety of ways. For example, the silicon vendor device certificates 926 can be implemented using the manufacturing markers 510 of FIG. 5, the security certificate 306 of FIG. 3, the security algorithm 304 of FIG. 3, the product markers 508 of FIG. 5, the operating markers 514 of FIG. 5, the incoming root of trust 504 of FIG. 5, the trusted certificate 402 of FIG. 4, or another similar data element.

The MSP system 902 can include a device data tracking system 934 for providing device level programming statistics in real time. The device data tracking system 934 can track device level information for the secure programming system 100 in the local factory or for devices being provisioned remotely. The device data tracking system 934 can track device level information for each of the programmable devices 128 configured by the programmer 112 in the MSP system 902. The device data tracking system 934 can track data such as the silicon vendor device certificates 926, the system identification 814 of FIG. 8, the device identification 302, or other data elements that have been programmed into devices. The device data tracking system 934 can track device status including validity status, configuration status, duplicate status, or other device level status.

The MSP system 902 can include a device provisioning service 938. The device provisioning service 938 is a system for provisioning the programmable devices 128 over the Internet. The device provisioning service 938 can be a combination of hardware and software that can securely deliver provisioning information to the programmable devices 128 in the field. The device provisioning service 938 can distribute security information, data updates, software updates, and other security and operational information needed for continued secure operation of the devices.

The MSP system 902 can include a firmware update service 912. The firmware update service 912 is a system for updating the firmware of the programmable devices 128 over the Internet, such as an OEM cloud 928. The firmware update service 912 can securely deliver firmware updates 916 to a system having one or more of the programmable devices 128 and update the programmable devices 128 with the new firmware. The firmware updates 916 are software and data packages used to update the firmware in the programmable devices 128. The firmware update service 912 can be part of a system having security software and hardware that can deploy the firmware updates 916 and associated security information to ensure the programmable devices 128 are updated securely.

The MSP system 902 can be operated in a variety of ways. In an illustrative example, the MSP system 902 can be operated based on a secure element use case 970. The secure element use case 970 can describe one way to use the MSP system 902 to securely program the programmable devices 128 where the programmable devices 128 are already configured with firmware and have the silicon vendor device certificate 926 pre-installed at the silicon vendor facility.

The secure element use case 970 can include two major steps. In step 1, the silicon vendor device certificate 926 is extracted from one of the programmable devices 128 and the device is authenticated. In step 2, the OEM device certificate 946 is created based on the silicon vendor device certificate 926 of the authenticated device. Then the OEM device certificate 946 is programmed into the device.

In this use case, an HSM-based security system, such as the factory security system 932, can be integrated as part of the secure programming system, such as a system for programming secure microcontroller units with integrated security areas. The integrated security areas can be protected areas of memory that can be written once and not changed. This allows the non-modifiable storage of security data such as keys, code, or certificates.

The system can include an OEM management system 924, the factory management system 930, a job creation and job runner system, and the device data tracking system 934 to manage the status data for the programmable devices 128. The various systems can be implemented in a variety of ways. For example, the OEM management system 924, the factory management system 930, a job creation and job runner system, and the device data tracking system 934 can all be executed as software on the host system 936. In another example, the systems can each run on dedicated hardware.

In this security model, the factory premise 942 can act as a proxy for the OEM user and can execute the functionality of the OEM management system 924. This effectively implies that the OEM user 968 implicitly trusts the factory premise 942 with providing the OEM certificate key materials 904 and the OEM certificate 951 and setting the production count 948 for the programmable devices 128. Since this activity is done on the host system 936 of the programming unit 110 of FIG. 1, the job setup, the generation of the OEM certificate key material 904, and the configuration of the secure programming system 100 be done by authorized personnel at a physically secure location within the factory premise 942.

Some implementations can focus on the provisioning of the OEM device certificates 946 onto the programmable devices 128 that are being configured as secure elements. However, it is understood that securing the flow of the OEM certificate key material 904 and secure updating of the production count 948 by the OEM systems are protected by physical security means and secure data channels.

The OEM data from the OEM development premise 940 is secure and encrypted from OEM management system 924 all the way to the factory security system 932 as the data is encrypted and tied to a specific one of the factory security system 932. For example, the programming project 944 can be encrypted using the factory security system certificate 933 which can only be decrypted by the intended one of the factory security system 932.

In another example, the transfer of the OEM certificate key material 904, including the OEM device certificate signature key 947 is done securely because the material is encrypted during transmission. The OEM device certificate signature key 947 can include a private key component.

In an illustrative example, since the private key 152 of the programmable devices 128 never leaves the device and the import of the OEM device certificate signature key 947 into OEM management system 924 is done securely. This can reduce the need for physical security since the data is encrypted.

In another illustrative example, the MSP system 902 can be operated based on a microcontroller unit use case 972 where the MSP system 902 is used for provisioning the programmable devices 128 and trusted devices 130 of FIG. 1, such as secure microcontroller units. The secure microcontroller units can include secure processing and secure storage facilities.

The MCU use case 972 can include two primary steps. In the first step, the OEM security boot loader 906 can be programmed into the programmable devices 128. Afterward, the programmable devices 128 can be booted using the OEM security boot loader 906 to create device authentication key pairs 150 and device decryption key pairs 150 for the programmable devices 128. Then the OEM device certificate 946 can be constructed, programmed, and signed using portions of the two key pairs.

In the second step, the MSP system 902 can read the silicon vendor device certificates 926 and authenticate the programmable devices 128. The firmware decrypt key 922 can be encrypted with device decryption key from the silicon vendor device certificate 926. The encrypted firmware and the encrypted firmware decrypt key 922 can be programmed on the programmable devices 128.

The OEM security boot loader 906, the OEM firmware development system 908, the OEM mastering tool 910, the OEM management system 924, and the generation of the OEM certificate key material 904 can all be performed at the OEM development premise 940. The overall project definition and the determination of the production count 948 are controlled by OEM user 968.

The OEM software execution environment can be hosted on a computer at the OEM development premise 940. All the OEM Roots of Trust are securely transported from the OEM development premise 940 to the factory premise 942. The factory management system 930, the factory security system 932, and the device data tracking system 934 can execute at the factory premise 942 on the host system 936.

In an embodiment, because the first step requires secure provisioning of the programmable devices 128, it must be performed in a secure facility, such as an OEM trusted factory, a silicon vendor factory, an OEM factory, or a programming center. Step 2 can then be performed at a facility with a lower level of security, such as an untrusted Factory, a Contract Manufacturer, third party partner, or a similar type of facility.

In this Security model, the OEM Roots of Trust and the programming project 944 are defined at the OEM development premise 940 and the distributed to the factory premise 942. It is important that an OEM user should manager their own Roots of Trust to improve security of the supply chain for the OEM products.

In an illustrative example, the MCU use case 972 requires physical security because the key pair 150 of FIG. 1 of the programmable devices 128 is generated in the factory security system 932 and can potentially be exposed at the factory premise 942. The physical connection between the programmable devices 128 and the programmer 112 is in the clear, so someone with physical access to the systems of the factory premise 942 could snoop and steal important information. Thus, physical security should be implemented to protect the security information.

In an alternate example of the MCU use case 972, the programmable devices 128 can be blank and not pre-programmed with the silicon vendor device certificate 926. In this case, the OEM device certificate 946 can be used for authentication. In addition, the firmware decrypt key 922 can be encrypted using the public decryption key from the OEM device certificate 946, such as the OEM public key 154.

Figure 10:
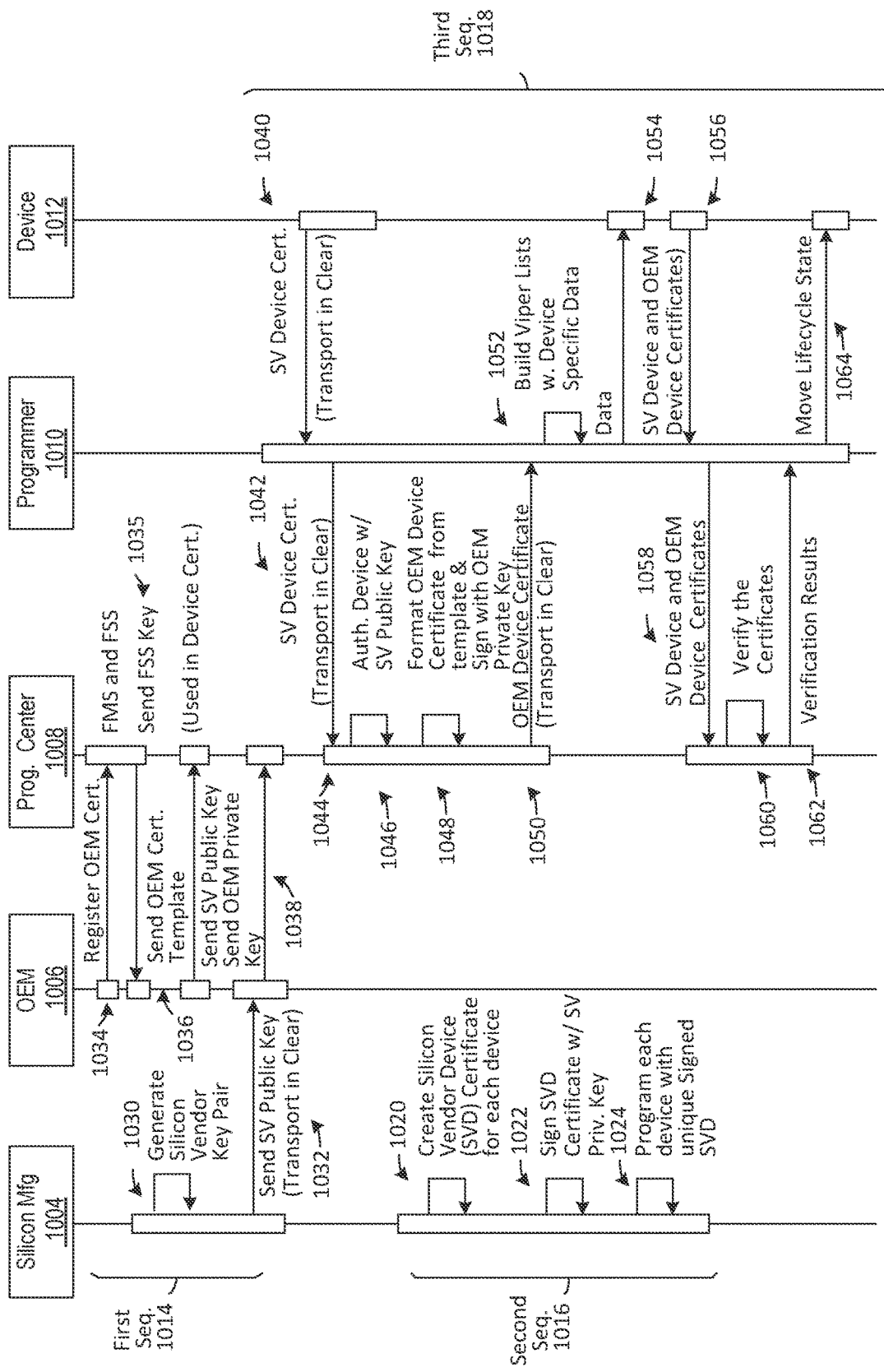
FIG. 10 is a detailed example of the secure element use case.

Referring now to FIG. 10, therein is shown a detailed example of the secure element use case 970. The secure element use case 970 describes the process for securely configuring the secure elements, such as the programmable devices 128 of FIG. 1. The MSP system 902 of FIG. 9 can securely deploy and provision each of the programmable devices 128 of FIG. 1 according to the secure element use case 970.

In the secure element use case 970, the secure elements can be instantiated, transferred, and managed at different premises. The premises can include different types of locations such as a silicon manufacturer 1004, an OEM location 1006, a programming center 1008, a programmer location 1010, and a device location 1012. Each of the premises represents a location where some type of secure programming related actions can occur. Further, the use case can include data and actions embedded at the programmer 112 of FIG. 1 and the device location 1012.

The secure element use case 970 can include three different sequences of events, each for performing a different secure activity. In a first sequence 1014, the MSP system 902 of FIG. 9 can initialize the factory security system 932 of FIG. 9 using OEM management system 924 of FIG. 9. This can be performed at the OEM development premise 940 of FIG. 9, the factory premise 942 of FIG. 9, or another similar location.

The MSP system 902 can also initialize the factory management system 930 of FIG. 9 at the factory premise 942, the programming center 1008, or another similar location. The factory management system 930 can be updated with the current count 978, a silicon vendor public key 954 of FIG. 9, an OEM private key 952 of FIG. 9, and a OEM device certificate template 950 of FIG. 9. The factory management system 930 can forward the information to the factory security system 932 for secure processing.

In the second sequence 1016, the secure elements are programmed at the silicon vendor (SV) factory with a silicon vendor device certificate 926 of FIG. 9.

In a third sequence 1018, the MSP system 902 can cryptographically authenticate each of the devices, such as the programmable devices 128 or trusted devices 130 of FIG. 1, using the silicon vendor device certificate 926 that was pre-installed in the second sequence 1016. Then the OEM device certificate 946 of FIG. 9 can be constructed and programmed into the programmable devices 128.

The OEM device certificate 946 can be constructed by re-using the public key portions of the device identity key pair from the silicon vendor device certificate 926, such as the silicon vendor public key 954. Therefore, the silicon vendor public key 954 can be used to calculate the OEM device certificate 946, so both certificates are certified using the same certificate. Alternatively, a different key pair can be used to represent the OEM identity separate from the silicon vendor key pair. This can be performed by the factory security system 932 or on the secure element itself.

In the second sequence 1016, step 1020 is performed at the silicon manufacturer 1004. The silicon manufacturer 1004 can be the company that creates the raw secure elements. The silicon vendor device certificates 926 of FIG. 9 are created for each of the secure elements, such as the programmable devices 128 or trusted devices 130. The silicon vendor device certificates 926 can include unique information about each of the secure elements, such as the device identification 302 of FIG. 3, serial numbers, product type, manufacture date, or similar device information.

Step 1022 is also performed at the silicon manufacturer 1004. Each of the silicon vendor device certificates 926 is signed with the silicon vendor private key 958 of FIG. 9 of the silicon manufacture with the silicon vendor identifier 956 of FIG. 9. Signing the silicon vendor device certificate 926 encrypts the data of the certificate. The data can be decrypted only with the silicon vendor public key 954.

Step 1024 is also performed at the silicon manufacturer 1004. Each of the programmable devices 128 is programmed with the silicon vendor device certificate 926 that was signed with the silicon vendor private key 958. The silicon vendor device certificate 926 signed by the silicon vendor private key 958 shows that the device is approved or provided by the silicon vendor. Successfully decrypting the silicon vendor device certificate 926 with the silicon vendor public key 954 can authenticate that the programmable device 128 is from the silicon vendor that signed it.

The second sequence 1016 can uniquely tag each of the programmable devices 128 with a unique and individual instance of the silicon vendor device certificate 926 that has been further signed with the silicon vendor private key 958. This provides that the silicon vendor device certificate 926 can be decoded using the silicon vendor public key 954 to verify that the silicon vendor device certificate 926 was provided by the silicon vendor having the silicon vendor identifier 956. This allows the factory or other device user to determine the authenticity of the programmable devices 128.

The first sequence 1014 is performed at the silicon manufacturer 1004, the OEM location 1006, and the programming center 1008. The first sequence 1014 can configure the programming components at the programming center 1008 for secure programming.

In a step 1030, the silicon vendor can generate the silicon vendor key pair 960 having a silicon vendor public key 954 and a silicon vendor private key 958. This can be a silicon vendor key pair 1080 having a silicon vendor private key 958 and silicon vendor public key 954.

In a step 1032, the silicon vendor public key 954 can be transferred to the OEM user 1006. The silicon vendor public key 954 can be sent in the clear and unencrypted. For example, the silicon vendor public key 954 can be sent over a network link.

In a step 1034, the OEM user 1006 can register the OEM certificate 951 of FIG. 9 with the factory management system 930 of FIG. 9 and the factory security system 932 of FIG. 9 of the programming center 1008. The OEM certificate 951 can include the OEM public key 962 of FIG. 9 to decrypt and authenticate information that was encrypted or signed with the OEM private key 962. The registration of the OEM certificate at the programming center 1008 can be performed securely to provide the programming center 1008 with the security information for the OEM user 1006. The registration can be performed to introduce and identify the OEM credentials into the factory management system 930 and the factory security system 932.

In a step 1035, the factory management system 930 and the factory security system 932 can send a factory security system encryption key 980 to the OEM management system 924 in a secure exchange process. The factory security system data encryption key 980 can be used to encrypt information sent from the OEM user 1006 to the factory management system 930 and the factory security system 932 to support the secure transfer of information. The factory security system 932 can send the factory security system data encryption key to the OEM management system 924.

In a step 1036, the OEM user 1006 can create aa package having the SV device authentication public key, the OEM device certificate signature key, and the OEM device certificate template 950. The OEM device certificate signature key can be created in OEM management system 924 or import from an external security system such as an external HSM. The package can be encrypted in the OEM management system 924 using the factory security system data encryption key 980 and then sent to the factory management system 930 and the factory security system 932. Because the package has been encrypted using the factory security system data encryption key 980 of the factory security system 932, it can only be decrypted using the factory security system data authentication key 982 of the factory security system 932. The OEM device certificate template 950 is a template for the OEM device certificate 946 that includes the public key 152 of the device having the device identification 320 of FIG. 3 and then signed by the OEM Private Signature key. The OEM public key 962 is a cryptographic value tied to the OEM user 1006. The OEM public key 962 have a variety of formats. For example, the key can be formatted as an X.509 public key certificate or another public key format. The X.509 standard defines a public key certificate to show the ownership of a public key. The OEM public key 962 can provide validation information for a public key. The OEM public key 962 can be used for device certification in the programming center 1008.

In a step 1038, the OEM user 1006 can send the package having the silicon vendor public key 954, the OEM private key 952, and the OEM device certificate template 950 to the programming center 1008. The information in the package can then be used to sign the programmable devices 128.

The third sequence 1018 is performed on the programmer 112 and the programmable devices 128 at the programming center 1008 or a factory premise 942. The third sequence 1018 can authenticate the secure elements, provision and cryptographically sign the secure elements with the OEM information, and verify that the provisioned devices are authorized.

In a step 1040, the programmer 112 can read the silicon vendor device certificate 926 of each of the programmable devices 128 to be programmed. The silicon vendor device certificates 926 are transferred in the clear from the programmable devices 128 to the programmer 112.

In a step 1042, the silicon vendor device certificates 926 can be transferred from the programmer 112 to the factory management system 930 and the factory security system 932. The factory management system 930 controls the programming operation and the factory security system 932 will manage the device and system security.

In a step 1044, the silicon vendor device certificates 926 are received at the factory management system 930 of the programming center 1008. The programmer 112 is located at the factory premise 942 of FIG. 9.

In a step 1046, the programmable devices 128 can be authenticated using the silicon vendor public key 954. This step confirms that the devices to be programmed are provided by the silicon vendor having the silicon vendor identifier 956. The programmable devices 128 are authenticated when the silicon vendor device certificate 926 that was signed with the silicon vendor private key 958 in sequence 1 is decrypted using the silicon vendor public key 954. If the information in the silicon vendor device certificate 926 can be accessed using the silicon vendor public key 954, then the device is authenticated.

In a step 1048, the OEM device certificate 946 is formatted based on the OEM device certificate template 950. Then OEM device certificate 946 is signed with the OEM private key 952.

In a step 1050, the OEM device certificate 946 is transferred to the programmer 112. Because the OEM device certificate 946 has been encrypted and signed with the OEM private key 952, it can be transferred in the clear.

In a step 1052, the programmer 112 can build the serial data lists 964. The serial data lists 964 are list of device specific data to be programmed into the programmable devices 128. This can include the serial numbers, the device identification, the OEM device certificate 946, manufacturing markers, code, data, markers, mac addresses, device specific keys, or other information.

In a step 1054, the device specific data included on the serial data lists 964 can be programmed into the programmable devices 128 by the programmer 112. The serial data lists 964 can indicate where the device specific data should be stored. For example, the OEM device certificate 946 can be stored in the secure storage unit.

In a step 1056, the silicon vendor device certificate 926 and the OEM device certificate 946 are re-extracted and retrieved from the secure elements, such as the programmable devices 128 or the trusted devices 130, by the programmer 112. Even though copies of the silicon vendor device certificate 926 and the OEM device certificate 946 may already exist in the factory security system 932 or elsewhere in the system, the device certificates are re-extracted to verify the programmable devices 128 and to detect potential duplicate production runs, unauthorized duplication, or other improper activities. The validation steps can be used to ensure that the device certificates have been programmed without errors. This can include programming failures, device damages, bit errors, or similar errors.

In a step 1058, the silicon vendor device certificate 926 and the OEM device certificate 946 are sent to the factory security system 932 for verification and further use. The retrieved device certificates can be used for a second round of authentication to verify that the proper ones of the programmable devices 128 were programmed. This can be used to prevent unauthorized duplicate of the programmable devices 128 and to prevent counterfeiting the devices.

In a step 1060, the silicon vendor device certificate 926 and the OEM device certificate 946 are verified to make sure that the programmable devices 128 are proper. This can include validating the silicon vendor device certificate 926 using the silicon vendor public key 954 and validating the OEM device certificate 946 with the OEM public key 962. Validation of the device certificate involves comparing the public key in the device certificate with the public key in the silicon vendor certificate 1078 to ensure they match. In addition, the certificate can be processed through a certificate validation tool (not shown) to ensure that the format of the certificate is valid. The signature on the certificate is also validated using the factory security system 932.

In a step 1062, the verification results are sent back to the programmer 112. In a step 1064, the programmer 112 can processed the completed devices. If the programmable devices 128 are not validated, then the programmer 112 can identify the devices with a validation status indicating a bad device and transfer them to a bad devices receptacle (not shown) for disposal. If the programmable devices 128 are properly verified, then the programmable devices 128 can be updated with a verified state value and passed along as verified components. Alternatively, the programmer 112 can generate a validation report to log the device identification and the validation status of each of the programmable devices 128 in the production run. The programmable devices 128 that are invalid can be removed or destroyed at a later time.

3.0. Functional Overview

The secure programming system 100 can configure and provision the secure elements, such as the programmable devices 128 and the trusted devices 130 of FIG. 1, in a variety of ways. Different levels of security can be implemented depending on the type of operations that are performed on the secure elements. Different use cases and processes flows can be implemented on the same physical systems to accommodate the needs of different end users.

Figure 11:
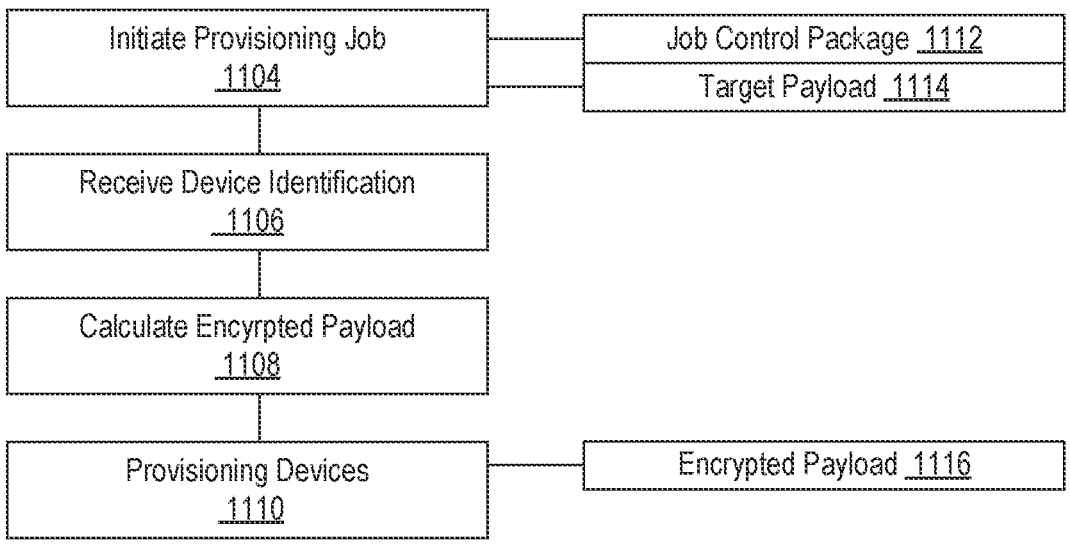
FIG. 11 is an example of a provisioning process flow for programmable devices in accordance with one or more embodiments.

Referring now to FIG. 11, therein is shown an example of a provisioning process flow 1102 for the programmable devices 128 of FIG. 1 in accordance with one or more embodiments. The various elements of the provisioning process flow 1102 may be performed in a variety of systems, including systems such as system 100 of FIG. 1 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The provisioning process flow 1102 is responsible for programming the programmable devices with the target payload 1114 provided by the secure programming system 100. The provisioning process flow 1102 can be responsible for initiating a provisioning job in the secure programming system 100, receiving the programmable devices 128, calculating the encrypted payload 1116, and provisioning the programmable devices 128. The provisioning process flow 1102 can describe the programming of the system identification 814 of FIG. 8 and the device identification 302 of FIG. 3 into the programmable devices 128, as well as describe the security linkage between them.

The provisioning process flow 1102 can have a variety of configurations. For example, the provisioning process flow 1102 can include an initiate provisioning job module 1104, a receive device information module 1106, a calculate encrypted payload module 1108, and a provisioning devices module 1110.

The initiate provisioning job module 1104 can receive a job control package 1112 and the target payload 1114 for programming into the programmable devices 128. The job control package 1112 comprises instructions and parameters for provisioning the programmable devices 128 with the target payload 1114.

The target payload 1114 is the information to be encrypted and programmed into the programmable devices 128. The target payload 1114 can include data, code, security keys, and other information. For example, the target payload 1114 can be secure firmware code to be executed on the trusted devices 130 of FIG. 1. In another example, the target payload 1114 can include different data elements combined together, such as a set of additional security keys and one or more software modules. For example, the job control package 1112 can be part of the programming project 944 of FIG. 9.

The job control package 1112 comprises the information needed to configure and program the programmable devices 128 with the target payload 1114. The job control package 1112 can include programming instructions, security information, programmer configuration information, device configuration information, and other similar job information.

In an illustrative example, the job control package 1112 can contain instructions for provisioning a specific set of the programmable devices 128. The job control package 1112 can include one or more of the security keys 106 of FIG. 1 to be used to encrypt the target payload 1114 before programming into the programmable devices 128. The security keys 106 can represent the roots of trust used for encrypting the target payload 1114.

The job control package 1112 can include the security keys 106 for identifying the secure programming system 100, the programming unit 110 of FIG. 1, the programmer 112 of FIG. 1, the target payload 1114, and other security parameters. For example, the programmer identification 216 of FIG. 2 can be encrypted using the public key 154 of FIG. 1 associated with the programmer 112. The programmer identification 216 of FIG. 2 can be decrypted only with the private key 152 of FIG. 1 of the security keys 106 associated with the programmer 112. The identifiers for the other system elements can likewise by encrypted and decrypted using the public key 154 and the private key 152 associated with that element.

The job control package 1112 can include the programmer identification 216 of the programmer 112 for executing the production run. If the programmer identification 216 of the job control package 1112 does not match that of the programmer 112 in use, then the production job will not execute. This allows the restriction of jobs to only execute on a designated programmer 112. Similarly, the job control package 1112 can include a premise identification, a factory identification, or other location and equipment identifiers to ensure that a job control package 1112 can only run on known equipment in known locations. This can prevent unauthorized production of secure devices.

After the initiate provisioning job module 1104 has completed, the control flow can pass to the receive device identification module 316 of FIG. 3. The receive device information module 1106 can receive information about the programmable devices 128 to be programmed.

The secure programming system 100 can be coupled to a manufacturing execution system 702 of FIG. 7. The MES 702 can be configured to send the serial numbers of the programmable devices 128 to be programmed to the secure programming system 100.

For example, the MES 702 can read the serial numbers from the programmable devices 128 using optical or radio frequency techniques. In another example, the MES 702 can be programmed with a list of the serial numbers or other parameters related to the programmable devices 128 to be programmed. In yet another example, the secure programming system 100 can read the serial numbers of the programmable devices 128 directly. After the receive device information module 1106 has completed, the control flow can pass to the calculate encrypted payload module 1108.

The calculate encrypted payload module 1108 can encrypt the target payload 1114 to form an encrypted payload 1116. The encrypted payload 1116 can be formed using the public key 154 associated with one or more portions of the device identification 302 of FIG. 3 for each of the programmable devices 128.

The calculate encrypted payload module 1108 can encrypt the target payload 1114 in a variety of ways. For example, the target payload 1114 can be encrypted using the public key 154 associated with the serial number markers 512 of FIG. 5, the firmware markers 506 of FIG. 5, the manufacturing markers 510 of FIG. 5, the product markers 508 of FIG. 5, the operating markers 514 of FIG. 5, the OEM markers 516 of FIG. 5, or similar values within the device identification 302 for one of the programmable devices 128. The encrypted payload 1116 can be decrypted using the private key 152 associated with the selected parameter from the device identification 302.

In another example, the calculate encrypted payload module 1108 can calculate the encrypted payload 1116 using the information from the secure programming system 100. The target payload can be encrypted using the public key 154 associated with the secure programing system 100, the programming unit 110, the programmer 112, the device adapters 208 of FIG. 2, or another similar parameter.

The calculate encrypted payload module 1108 can form the encrypted payload 1116 using different portions of the target payload 1114. For example, the encrypted payload 1116 can be formed by encrypting the entire target payload 1114, subsets of the target payload 1114, or a combination of the target payload 1114 and other information.

The calculate encrypted payload module 1108 can use the security modules to process the target payload 1114. The calculate encrypted payload module 1108 can use any combination of the identification module 316, the authentication module 320 of FIG. 3, the cryptography module 318 of FIG. 3, or the code signing module 322 of FIG. 3 to perform the security operations required to form the encrypted payload 1116.

The identification module 316 can be used to verify the identification of each of the programmable devices 128. The authentication module 320 can be used to authenticate the parameters associated with each of the programmable devices 128. The cryptography module 318 can be used to encrypt and decrypt the target payload 1114 and the encrypted payload 1116. The code signing module 322 can be used to verify the validity of the code elements 314 of FIG. 3 within the target payload 1114. After the calculate encrypted payload module 1108 completes, the control flow can pass to the provisioning devices module 1110.

The provisioning devices module 1110 can program each of the programmable devices 128 with the encrypted payload 1116. The provisioning devices module 1110 can interface with the hardware of the programmer 112 to transfer the encrypted payload 1116 to the programmable devices 128 coupled to the programmer 112.

For example, the provisioning devices module 1110 can program each of the programmable devices 128, such as the data devices 132 of FIG. 1, with the files of encrypted payload 1116. The provisioning devices module 1110 can include specific information for configuring each different device type of the programmable devices 128. The data devices 132 can be coupled to the programmer 112 using the device adapters 208.

In another example, the provisioning devices module 1110 can provision each of the programmable devices 128, such as the trusted devices 130. The trusted devices 130 can include smart phones, circuit boards, security devices, or similar devices. The trusted devices 130 can be coupled to the programmer 112 directly in the device adapters 208, via a data link such as a wired or wireless connection, or a combination thereof.

In an illustrative example, the secure programming system 100 can establish the identity of each of the programmable devices 128 based on the components used to build the system. For each of the trusted devices 130, such as smart phones or circuit boards, the device identification 302 can include serial numbers or other identifiers for each of the components within the trusted devices 130. The identity of the programmable devices 128 can span hardware, software, and/or firmware components.

Because the device identification 302 can include the OEM markers 516, the identification can be unique across all manufacturers and vendors. In addition, because the device identification 302 can be encrypted by the secure programming system 100 at manufacturing time, the identity of the programmable devices 128 can be stored securely off the device and on the device using the device identification 302 and the security keys 106.

One advantage of the secure programing system 100 is that the system identification 814 of FIG. 8 enables a higher level of device security. By encoding the programmable devices 128 with an encrypted version of the system identification 814, the programmable devices 128 have a higher level of trust and traceability for the remainder of the lifecycle of each of the programmable devices 128.

Another additional advantage of the secure programming system 100 is that the manufacturing supply chain is more secure because the use of the system identification 814 provides a root of trust at the silicon device level. The system identification 814 is programmed into the programmable devices 128 and is based on and includes unique manufacturing data. The system identification 814 allows compromised firmware to be detected because the firmware would not have the system identification 814 available in the proper encrypted form.

The block diagram illustrates only one of many possible flows for system generation. Other flows may include fewer, additional, or different elements, in varying arrangements. For example, in some embodiments, the security modules may be omitted, along with any other elements relied upon exclusively by the omitted element(s). As another example, in an embodiment, a flow may further include a hash generation module.

Figure 12:
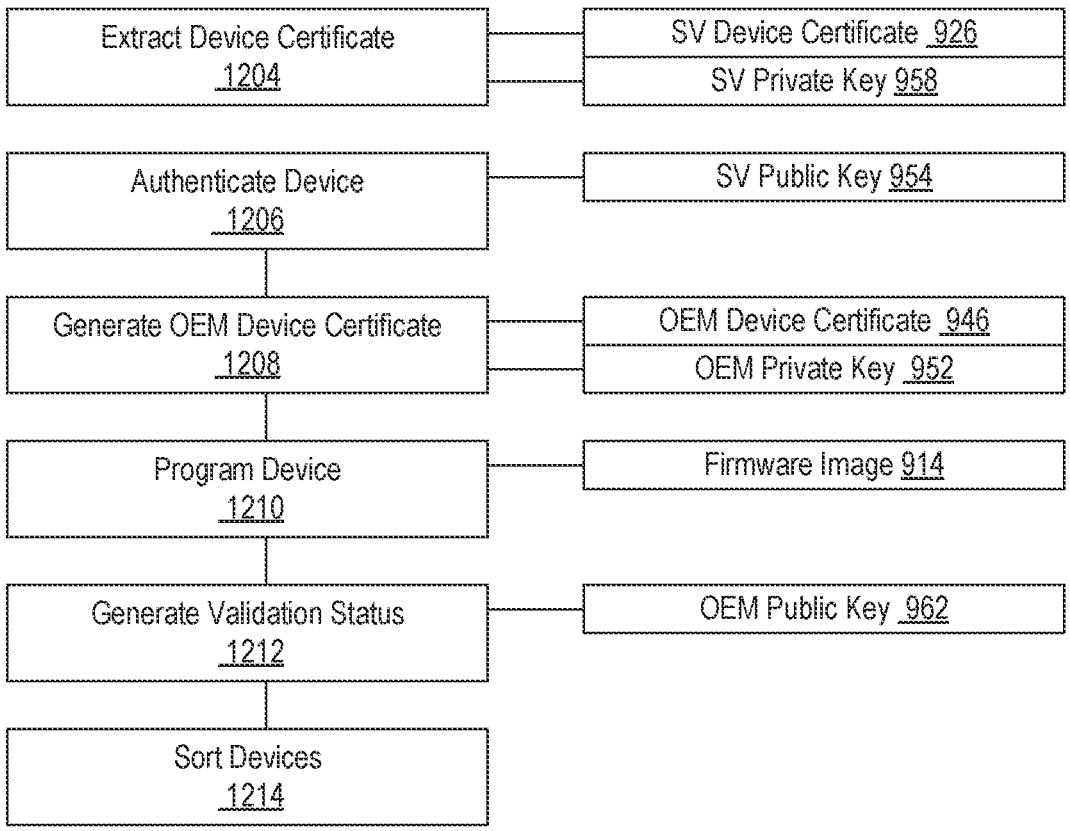
FIG. 12 is an example of a secure manufacturing process flow for the programmable devices in accordance with one or more embodiments.

Referring now to FIG. 12, therein is shown an example of a secure manufacturing process flow 1201 for the programmable devices 128 of FIG. 1 in accordance with one or more embodiments. The various elements of the provisioning process flow 1102 may be performed in a variety of systems, including systems such as system 100 of FIG. 1 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The provisioning process flow 1102 authenticates the programmable device 128 in the programmer 112 of FIG. 1, generates the OEM device certificate 946, programs a target payload 1114 into the programmable device 128, and verifies the silicon vendor device certificate 926 and the OEM device certificate 946.

The provisioning process flow 1102 can have a variety of configurations. For example, the provisioning process flow 1102 can include an extract device certificate module 1204, an authenticate device module 1206, a generate OEM device certificate module 1208, a program device module 1210, a generate validation status module 1212, and a sort devices module 1214. The control flow of the provisioning process flow 1102 can pass from module to module in sequential order.

The extract device certificate module 1204 can extract the silicon vendor device certificate 926 from the programmable devices 128. The silicon vendor device certificate 926 can be encrypted by the silicon vendor private key 152 and stored in the secure storage unit 326 of FIG. 3 of the programmable devices 128 mounted in the programmer 112 of FIG. 1. The programmer 112 can access the secure storage unit 326 to extract the silicon vendor device certificate 926 that had been pre-programmed into the programmable devices 128 by the silicon vendor.

The authenticate device module 1206 can authenticate the silicon vendor device certificate 926 to demonstrate that the programmable devices 128 in the programmer 112 are authentic devices from the silicon vendor. To authenticate the programmable devices 128, the silicon vendor device certificate 926 that had previously been encrypted using the silicon vendor public key 154 can be decrypted using the silicon vendor public key 154. If the decryption is successful, then the programmable devices 128 are valid and from the silicon vendor. Otherwise, if the silicon vendor device certificate 926 cannot be successfully decrypted using the silicon vendor public key 154, then the devices are not authentic.

The generate OEM device certificate module 1208 can create the OEM device certificate 946 using the OEM device certificate template 950 of FIG. 9. The OEM device certificate 946 can include information about the programmable devices 128 retrieved from the silicon vendor device certificate 926. After the OEM device certificate 946 has been created, it can be signed using the OEM private key 152.

The program device module 1210 can transfer the OEM device certificate 946 and the target payload 1114 from the programmer 112 to the programmable devices 128. The OEM device certificate 946 can be stored in one of the secure storage units 326 of FIG. 3 of the programmable devices 128. The target payload 1114 can be programmed into a secure or non-secure portion of the programmable devices 128. The target payload 1114 can include the firmware image 914, the firmware update 916 of FIG. 9, the security algorithm 304 of FIG. 3, or other code or data to be deployed in the programmable devices 128.

The generate validation status module 1212 can retrieve the silicon vendor device certificate 926 and the OEM device certificate 946 from the programmable devices 128 after the target payload 1114 had been programmed. The silicon vendor device certificate 926 can be authenticated against the silicon vendor public key 154. The OEM device certificate 946 can be authenticated against the OEM public key 154. If both of the device certificates are authenticated, then the programmable devices 128 are valid.

The sort devices module 1214 can generate a validation status 1222 of the programmable devices 128 based on the authentication of the device certificates. If both of the device certificates are valid, then the validation status 1222 is set to valid. If either or both of the device certificates are invalid, then the validation status 1222 is set to invalid.

If the validation status 1222 shows that one or both of the device certificates are invalid, then the current one of the programmable devices 128 being programmed is invalid and should not be used. The programmer 112 can transfer the invalid one of the programmable devices 128 to an output receptacle for disposal.

The sort devices module 1214 can also generate a validation report that lists the serial number or device identification of the programmable devices 128 that failed validation. Reporting the attempted use of unauthorized devices can increase security by identifying potential fraud and abuse.

Verifying the integrity of the silicon vendor device certificate 926 and the OEM device certificate 946 after the programmable devices 128 have been programmed increases the level of security by showing that the same devices that were initially loaded into the programmer 112 of FIG. 1 are the devices that received the target payload 1114 of FIG. 11. Checking that the programmable devices 128 are authorized by the silicon vendor and double checking that the programmable devices 128 are authorized by the silicon vendor and the OEM user 968 of FIG. 9 at completion helps prevent unauthorized manufacture and reduces the likelihood of counterfeit products.

4.0. Example Embodiments

Examples of some embodiments are represented, without limitation, in the following clauses:

According to an embodiment, a method of operation of a secure programming system comprises extracting a silicon vendor device certificate from a programmable device mounted in a programmer, authenticating the silicon vendor device certificate using a silicon vendor public key, generating an OEM device certificate for the programmable device based on the silicon vendor device certificate, the OEM device certificate signed with an OEM private key, transferring the OEM device certificate and a target payload to the programmable device in the programmer, extracting the OEM device certificate and the silicon vendor device certificate from the programmable device after the OEM device certificate is transferred into the programmable device, generating a validation status by authenticating the OEM device certificate using the OEM public key and authenticating the silicon vendor device certificate using the silicon vendor public key, the validation status set to invalid if the either the OEM device certificate or the silicon vendor device certificate are not successfully authenticated, and sorting the programmable device into an output receptacle of the programmer based on the validation status.

In an embodiment, the method further comprises writing the OEM device certificate into a secure storage unit on the programmable device.

In an embodiment, the method further comprises extracting the silicon vendor device certificate from a secure storage unit of the programmable device.

In an embodiment, the method further comprises moving the programmable device into a bad device receptacle at the programmer.

In an embodiment, the method further comprises creating a job control package having a programmer identification of the programmer.

According to an embodiment, a method of operation of a secure programming system comprises receiving a job control package having a target payload, extracting a silicon vendor device certificate from a programmable device mounted in a programmer, the silicon vendor device certificate encrypted by a silicon vendor private key, authenticating the silicon vendor device certificate in a factory security system using a silicon vendor public key, generating an OEM device certificate for the programmable device based on the silicon vendor device certificate, the OEM device certificate signed with an OEM private key, transferring the OEM device certificate and the target payload to the programmable device in the programmer, the OEM device certificate stored in a secure storage unit of the programmable device, extracting the OEM device certificate and the silicon vendor device certificate from the programmable device after the OEM device certificate is transferred into the programmable device, generate a validation status by authenticating the OEM device certificate using the OEM public key and authenticating the silicon vendor device certificate using the silicon vendor public key, the validation status set to invalid if the either the OEM device certificate or the silicon vendor device certificate are not successfully authenticated, and sorting the programmable device into an output receptacle based on the validation status.

In an embodiment, the method further comprises encoding an authorized count into the OEM device certificate.

In an embodiment, the method further comprises authenticating the OEM device certificate and the silicon vendor device certificate in the factory security system.

In an embodiment, the method further comprises matching a silicon vendor identifier from the silicon vendor device certificate with a stored vendor identifier from a security controller in the programming unit.

In an embodiment, the method further comprises generating a valid device list having a device identifier of the silicon vendor device certificate linked to the validation status.

According to an embodiment, a secure programming system comprises a programmer for extracting a silicon vendor device certificate from a programmable device, transferring the OEM device certificate and a target payload to the programmable device in the programmer, extracting the OEM device certificate and the silicon vendor device certificate from the programmable device after the OEM device certificate is transferred into the programmable device, sorting the programmable device into an output receptacle of the programmer based on the validation status, and a factory security system, coupled to the programmer, for authenticating the silicon vendor device certificate using a silicon vendor public key, generating an OEM device certificate for the programmable device based on the silicon vendor device certificate, the OEM device certificate signed with an OEM private key, generating a validation status by authenticating the OEM device certificate using the OEM public key and authenticating the silicon vendor device certificate using the silicon vendor public key, the validation status set to invalid if the either the OEM device certificate or the silicon vendor device certificate are not successfully authenticated.

In an embodiment, the system further comprises the OEM device certificate stored in a secure storage unit on the programmable device.

In an embodiment, the system further comprises the extracting the silicon vendor device certificate extracted from a secure storage unit of the programmable device.

In an embodiment, the system further comprises the programmer moving the programmable device into a bad device receptacle.

In an embodiment, the system further comprises a job control package having a programmer identification of the programmer.

In an embodiment, the system further comprises the programmable device includes the silicon vendor device certificate encrypted by the silicon vendor private key and the OEM device certificate and the silicon vendor device certificate both stored in secure storage units, the programmer includes a job control package having a target payload, and the factory security system is for authenticating the silicon vendor device certificate using the silicon vendor public key.

In an embodiment, the system further comprises the OEM device certificate having an authorized count of the programmable device.

In an embodiment, the system further comprises the OEM device certificate and the silicon vendor device certificate both validated by a security controller of the factory security system.

In an embodiment, the system further comprises a silicon vendor identifier from the silicon vendor device certificate matching a pre-installed silicon vendor identifier from a security controller in the programming unit.

In an embodiment, the system further comprises a valid device list having a device identifier of the silicon vendor device certificate of the programmable device.

According to an embodiment, a method of operation of a secure programming system comprises coupling programmable devices to a programming unit, the programmable devices having at least a first device and a second device, retrieving a first device certificate from the first device, the first device certificate having a first device identifier and a first device public key, retrieving a second device certificate from the second device, the second device certificate having a second device identifier and a second device public key, receiving a job control package and a target payload, the job control package having an authorized device list, the target payload having a first content and a second content different from the first content, decrypting the target payload with a hardware security module at the programming unit, forming a first provisioning package having the first content, the first provisioning package configured to provision the first device, forming a second provisioning package having the second content, the second provisioning package configured to provision the second device, transferring the first provisioning package to the first device and the second provisioning package to the second device contemporaneously, calculating an authentication status of the first device by comparing the first device identifier to the authorized device list, and sorting the first device into an output receptacle of the programing unit based on a device authentication status of the first device.

In an embodiment, the method further comprises coupling the programmable devices to the programming unit includes coupling the programmable devices to the programming unit with an in-system programmer (ISP) and one of the programmable devices is mounted on a circuit board.

In an embodiment, the method further comprises transferring the first device public key to an external security controller of a job controller system, forming the job control package at the job controller system by encrypting the first content using the first device public key, and wherein decrypting the target payload includes decrypting the first content using a first device private key.

In an embodiment, the method further comprises decrypting the first content of the first provisioning package within the first device, the first content decrypted using a first device private key and another hardware security module coupled to the first device.

In an embodiment, the method further comprises retrieving the first device certificate includes retrieving an OEM device certificate having an OEM identifier and calculating the authentication status by comparing the OEM identifier of the first device to an authorized OEM value of the job control package.

In an embodiment, the method further comprises calculating the authentication status includes calculating the authentication status on the first device.

In an embodiment, the method further comprises transferring a secure boot image to execute on the first device while coupled to the programming unit, and calculating the authentication status using the secure boot image.

According to an embodiment, a secure programming system comprises a programming unit configured to couple programmable devices to the programming unit, the programmable devices having at least a first device and a second device, the first device having a first device certificate, first device identifier, and a first device public key, the second device having a second device certificate, a second device identifier and a second device public key, a secure storage unit of the programming unit having a job control package and a target payload, the job control package having an authorized device list, the target payload having a first content and a second content different from the first content, a device programmer of the programming unit having a first provisioning package with the first content, the first provisioning package configured to provision the first device, a second provisioning package having the second content, the second provisioning package configured to provision the second device, the device programmer configured to transfer the first provisioning package to the first device and the second provisioning package to the second device contemporaneously, a hardware security module of the programming unit for decrypting the target payload and calculating an authentication status of the first device by comparing the first device identifier to the authorized device list, and an output receptacle of the programing unit for sorting the programmable devices based on a device authentication status.

In an embodiment, the system further comprises an in-system programmer (ISP) of the programming unit configured to couple to one of the programmable devices mounted on a circuit board.

In an embodiment, the system further comprises the programming unit configured to transfer the first device public key to an external security controller of a job controller system for forming the job control package at the job controller system by encrypting the first content using the first device public key, and decrypting the first content using a first device private key.

In an embodiment, the system further comprises the programming unit configured to decrypt the first content of the first provisioning package within the first device, the first content decrypted using a first device private key and another hardware security module coupled to the first device.

In an embodiment, the system further comprises the first device certificate is an OEM device certificate having an OEM identifier and the authentication status is calculated by comparing the OEM identifier of the first device to an authorized OEM value of the job control package.

In an embodiment, the system further comprises the programming unit configured to receive the authentication status that is calculated on the first device.

In an embodiment, the system further comprises programming unit configured to transfer a secure boot image to the first device for calculating the authentication status.

According to an embodiment, one or more non-transitory computer-readable media storing instructions that, when executed by one or more computing devices, cause coupling programmable devices to a programming unit, the programmable devices having at least a first device and a second device, retrieving a first device certificate from the first device, the first device certificate having a first device identifier and a first device public key, retrieving a second device certificate from the second device, the second device certificate having a second device identifier and a second device public key, receiving a job control package and a target payload, the job control package having an authorized device list, the target payload having a first content and a second content different from the first content, decrypting the target payload with a hardware security module at the programming unit, forming a first provisioning package having the first content, the first provisioning package configured to provision the first device, forming a second provisioning package having the second content, the second provisioning package configured to provision the second device, transferring the first provisioning package to the first device and the second provisioning package to the second device contemporaneously, calculating an authentication status of the first device by comparing the first device identifier to the authorized device list, and sorting the first device into an output receptacle of the programing unit based on a device authentication status of the first device.

In an embodiment, the non-transitory computer-readable media further comprises coupling the programmable devices to the programming unit includes coupling the programmable devices to the programming unit with an in-system programmer (ISP) and one of the programmable devices is mounted on a circuit board.

In an embodiment, the non-transitory computer-readable media further comprises transferring the first device public key to an external security controller of a job controller system, forming the job control package at the job controller system by encrypting the first content using the first device public key, and wherein decrypting the target payload includes decrypting the first content using a first device private key.

In an embodiment, the non-transitory computer-readable media further comprises decrypting the first content of the first provisioning package within the first device, the first content decrypted using a first device private key and another hardware security module coupled to the first device.

In an embodiment, the non-transitory computer-readable media further comprises retrieving an OEM device certificate having an OEM identifier and calculating the authentication status by comparing the OEM identifier of the first device to an authorized OEM value of the job control package.

In an embodiment, the non-transitory computer-readable media further comprises calculating the authentication status on the first device.

According to an embodiment, a method of operation of a secure programming system comprises coupling programmable devices to a programming unit, the programmable devices having at least a first device, receiving a job control package and a target payload, the job control package having a job authentication identifier, the target payload having a first content, retrieving a first device certificate from the first device, the first device certificate having a first device identifier, a first device authentication, and a first device public key, sending a first device challenge to the first device, receiving a first device response from the first programmable device in response to the first device challenge, the first device response having an authentication value, validating the first device response to generate an authentication status for the first device, in response to a successful validation of the first device response, transferring a first provisioning package to the first device, the first provisioning package having the first content, and sorting the first device into an output receptacle of the programing unit based on the device authentication status of the first device.

In an embodiment, the method further comprises sending the first device challenge include generating the first response challenge at a security controller of the programming unit based on the authentication value and the first device public key.

In an embodiment, the method further comprises receiving the first device response includes generating the first device response at the first device based on the first device challenge and a first device private key and the first device response is generated with a first device security controller of the first device.

In an embodiment, the method further comprises validating the first device response includes decrypting the authentication value from the first device response at a security controller of the programming unit using the first device public key, and generating the authentication status based on the authentication value of the first device response matching the authentication value of the first device challenge.

In an embodiment, the method further comprises coupling the programmable devices to the programming unit includes coupling the programmable devices to the programming unit with an in-system programmer (ISP), an in-circuit programmer, an on-board programmer, or a network link.

In an embodiment, the method further comprises transferring the first provisioning package includes encrypting the first content of the first provisioning packing using the first device public key, decrypting the first content of the first provisioning package at a security controller of the first device using the first device private key, and programming the first content into the first device.

In an embodiment, the method further comprises receiving the job control package includes receiving a stocking keeping unit (SKU) configuration and a security provisioning object for the first device, configuring the first device using the SKU configuration, and provisioning the first device with the security provisioning object.

According to an embodiment, secure programming system comprises a programming unit configured to couple programmable devices to a programming unit, the programmable devices having at least a first device, the first device having a first device certificate with a first device identifier, a first device authentication, and a first device public key, the programming unit configured to send a first device challenge to the first device and receive a first device response from the first programmable device in response to the first device challenge, the first device response having an authentication value, and the programming unit configured to transfer a first provisioning package having the first content to the first device, a secure storage unit of the programming unit to receive a job control package and a target payload, the job control package having a job authentication identifier, the target payload having a first content, a security controller of the programming unit to validate the first device response to generate an authentication status for the first device, and an output receptacle of the programming unit for sorting the first device based on the device authentication status of the first device.

In an embodiment, the system further comprises the security controller is configured to generate the first response challenge based on the authentication value and the first device public key.

In an embodiment, the system further comprises the programming unit is configured to receive the first device response generated at the first device based on the first device challenge and a first device private key and the security controller is configured to generate the first device response.

In an embodiment, the system further comprises security controller is configured to decrypt the authentication value from the first device response at a security controller of the programming unit using the first device public key and generate the authentication status based on the authentication value of the first device response matching the authentication value of the first device challenge.

In an embodiment, the system further comprises the programming unit is configured to couple the programmable devices to the programming unit with an in-system programmer (ISP), an in-circuit programmer, an on-board programmer, or a network link.

In an embodiment, the system further comprises the security controller is configured to encrypt the first content of the first provisioning packing using the first device public key.

In an embodiment, the system further comprises the programming unit is configured to receive a stocking keeping unit (SKU) configuration and a security provisioning object for the first device, configure the first device using the SKU configuration, and provision the first device with the security provisioning object.

According to an embodiment, one or more non-transitory computer-readable media storing instructions that, when executed by one or more computing devices, cause coupling programmable devices to a programming unit, the programmable devices having at least a first device, receiving a job control package and a target payload, the job control package having a job authentication identifier, the target payload having a first content, retrieving a first device certificate from the first device, the first device certificate having a first device identifier, a first device authentication, and a first device public key, sending a first device challenge to the first device, receiving a first device response from the first programmable device in response to the first device challenge, the first device response having an authentication value, validating the first device response to generate an authentication status for the first device, in response to a successful validation of the first device response, transferring a first provisioning package to the first device, the first provisioning package having the first content, and sorting the first device into an output receptacle of the programming unit based on the device authentication status of the first device.

In an embodiment, the non-transitory computer-readable media further causes generating the first response challenge at a security controller of the programming unit based on the authentication value and the first device public key.

In an embodiment, the non-transitory computer-readable media further causes receiving the first device response includes generating the first device response at the first device based on the first device challenge and a first device private key and the first device response is generated with a first device security controller of the first device.

In an embodiment, the non-transitory computer-readable media further causes decrypting the authentication value from the first device response at a security controller of the programming unit using the first device public key, and generating the authentication status based on the authentication value of the first device response matching the authentication value of the first device challenge.

In an embodiment, the non-transitory computer-readable media further causes coupling the programmable devices to the programming unit includes coupling the programmable devices to the programming unit with an in-system programmer (ISP), an in-circuit programmer, an on-board programmer, or a network link.

In an embodiment, the non-transitory computer-readable media further causes encrypting the first content of the first provisioning packing using the first device public key, decrypting the first content of the first provisioning package at a security controller of the first device using the first device private key, and programming the first content into the first device.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 13:
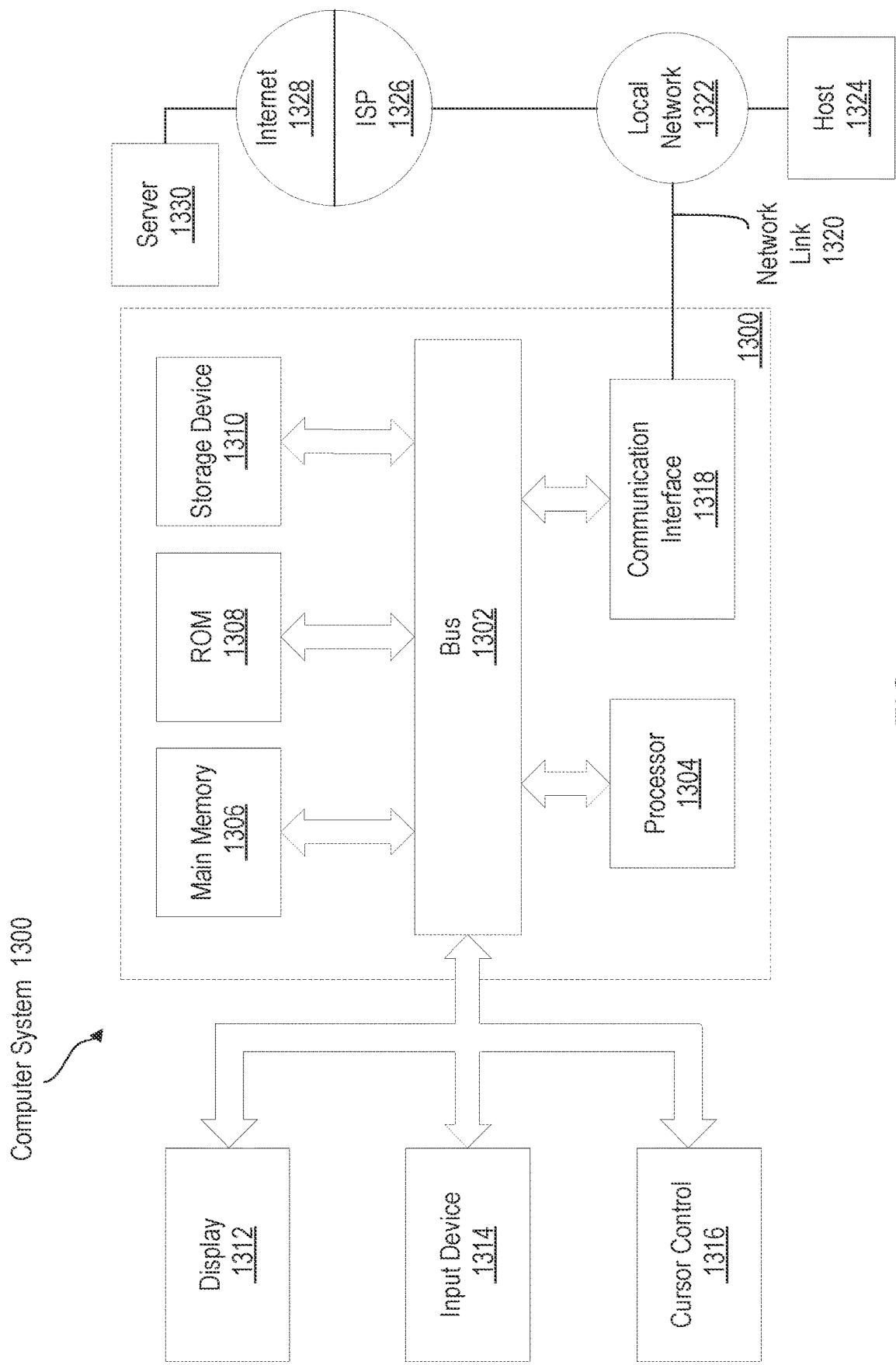
FIG. 13 is a block diagram of a computer system upon which embodiments of the invention may be implemented.

Referring now to FIG. 13, therein is shown a block diagram that illustrates a computer system 1300 utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more busses 1302 or other communication mechanism for communicating information, and one or more hardware processors 1304 coupled with busses 1302 for processing information. Hardware processors 1304 may be, for example, a general purpose microprocessor. Busses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

In an embodiment, output to display 1312 may be accelerated by one or more graphics processing unit (GPUs) in computer system 1300. A GPU may be, for example, a highly parallelized, multi-core floating point processing unit highly optimized to perform computing operations related to the display of graphics data, 3D data, and/or multimedia. In addition to computing image and/or video data directly for output to display 1312, a GPU may also be used to render imagery or other video data off-screen, and read that data back into a program for off-screen image processing with very high performance. Various other computing tasks may be off-loaded from the processor 1304 to the GPU.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be some integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as an 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service provider 1326. Service provider 1326, which may for example be an Internet Service Provider (ISP), in turn provides data communication services through a wide area network, such as the world wide packet data communication network now commonly referred to as the Internet 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send messages and receive data, including program code and/or other types of instructions, through the network(s), network link 1320, and communication interface 1318. In the Internet example, a server 1330 might transmit a requested code for an application program through Internet 1328, ISP 1326, local network 1322 and communication interface 1318. The received code may be executed by hardware processors 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a hardware processor 1304, possibly via an operating system and/or other intermediate layers of software components.

In an embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Figure 14:
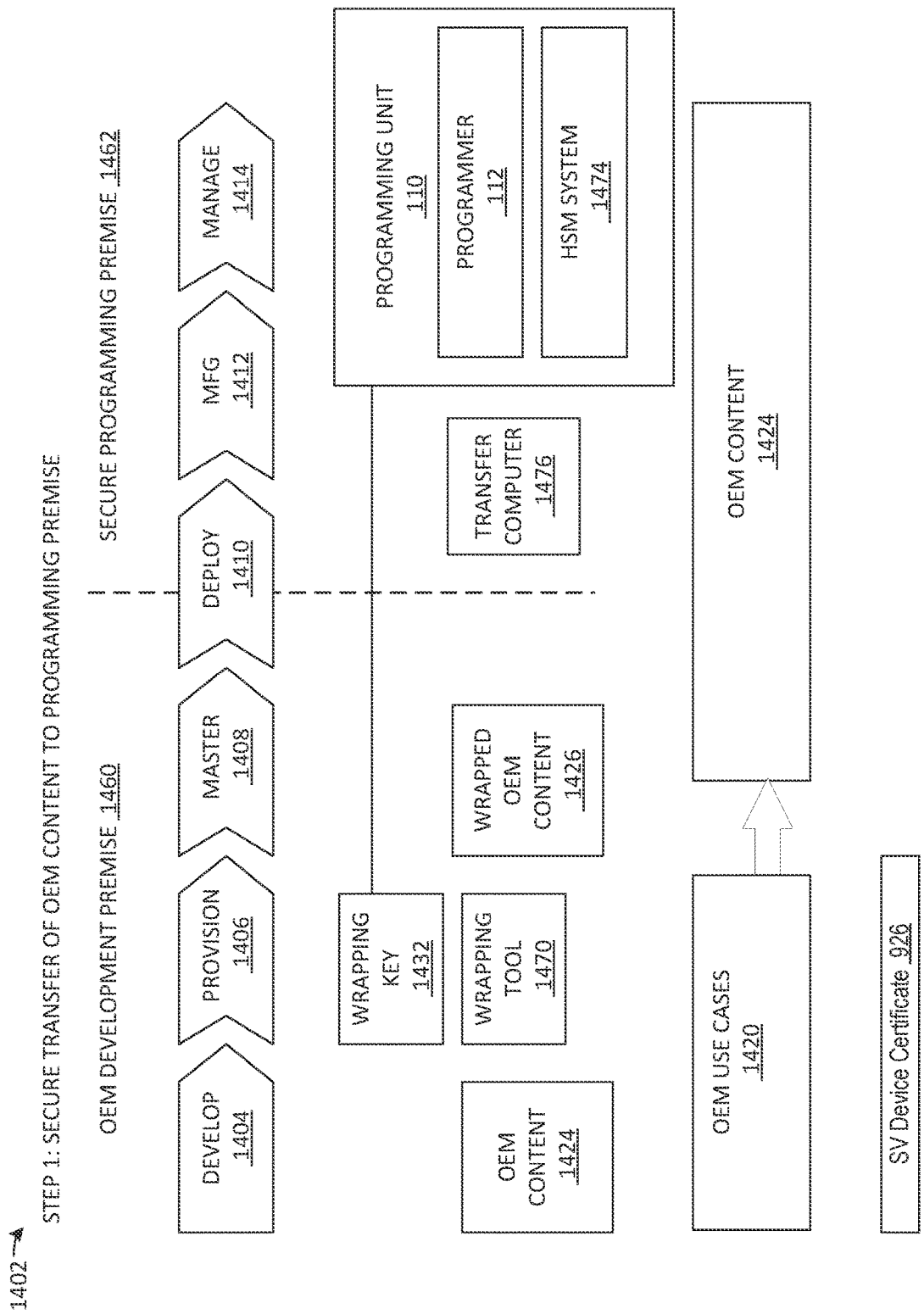
FIG. 14 is an example of a secure transfer step.

Referring now to FIG. 14, therein is shown a block diagram that illustrates a secure transfer step 1403. The secure programming environment 1402 can include a multi-step process for securely provisioning the programmable devices 128. The process can include the secure transfer of OEM content to programming premise, the secure import of OEM content into the programmer system, securely provisioning the programmable devices 128, and enabling device management.

The secure programming environment 1402 can include different components at multiple premises or location where different provisioning operations can be performed. For example, the secure programming environment 1402 can protect an OEM content 1424 using a wrapping tool 1470 at the OEM development premise 1460 and securely transfer a wrapped OEM content 1426 to a secure programming premise 1462.

The secure programming environment 1402 can support the secure provisioning of the programmable devices 128 using a variety of different use cases. The different use cases can implement different security algorithms and mechanisms to protect the OEM content 1424 and provision different types of the programmable devices 128 with different levels of protection. The use cases can also utilize different configurations for the programmer The use cases 1420 can be used to protect different types of OEM content and data. For example, the use case 1422 can provision the OEM security context and data including a secure boot manager 1428 (SBM), security keys 106, security certificates 1436, production count data 1440, protected firmware images 914, and other similar content.

The security keys 106 can include device certificate signing keys, firmware encryption keys, secure booting keys, firmware update keys, or other similar keys. The security certificates 1436 can include device certificate templates, mutual authentication certificates, and other similar certificates. The protected firmware images 914 can include encrypted firmware images, signed firmware images, or other secured firmware data images.

The OEM content 1424 can be received and protected at the OEM development premise 1460 and then securely transferred to the secure programming premise 1462 for provisioning into the programmable devices 128. The OEM content 1424 can be protected during the transfer from the OEM development premise 1460 to the secure programming premise 1462 using different security techniques depending on the type of content.

The secure programming environment 1402 can securely manage the provisioning of the programmable devices 128 using a multi-stage process. For example, this can include a development stage 1404, a provisioning stage 1406, a mastering stage 1408, a deployment stage 1410, a manufacturing stage 1412, and a management stage 1414.

In the development stage 1404, the OEM 1416 can develop a secure content package 1418 for deployment and provisioning to the programmable devices 128. For example, this can include receiving various pieces of content and assembling the OEM content 1424. The OEM content 1424 can be the set of associated content needed for provisioning the programmable devices 128. The development stage 1404 can include acquiring the data, security keys, device certificates, device identification, programmer identification, and other related content needed to program the target devices.

In the provisioning stage 1406, the programmable devices 128 can be provided with security credentials to facilitate development and testing of the product. During this stage, any initial security keys and certificates deployed during development can be re replaced by production level keys and certificates that will be used during manufacturing.

In the mastering stage 1408, the target content and the firmware images 914 can be encrypted and signed using the targeted production keys, such as a signing key, a primary key, a public key, or similar cryptographic key. Mastering is the shift from use of development keys and certificates to production keys and certificates which are defined and used during mastering.

In the deployment stage 1410, the target package can be transferred to the destination premise. The deployment stage 1410 can include configuring additional security such as managing secure connections, air gap security measures, package levels security, traffic monitoring, or other similar security preparations.

In the manufacturing stage 1412, the target package can be received by the programming system and unpacked before provisioning the programmable devices 128. This can include operations such as decryption, signature validation, decompression, isolating individual components, securely programming the target content into the programmable devise, validating the programmable devices, checking identities, error checking, counterfeit detection, base stock verification, and other similar manufacturing tasks.

In the management stage 1414, the programmable devices 128 can be managed over their lifecycle. Device management can include auditing devices, developing product manufacturing and tracing databases, tracking activations, tracking error conditions, cloud onboarding, provisioning, and other device lifecycle events.

The secure programming environment 1402 can be configured for different use cases. The use cases 1420 can include the use cases 1420 for secure booting, device identification and chain of trust, firmware and intellectual property content protection, mutual authentication, firmware update service, cloud-based provisioning, overproduction protection, cloning protection, and other similar use cases.

Each of the use cases 1420 can be used to generate a set of the OEM content 1424 needed to provision the programmable devices 128. The OEM content 1424 can be loaded and protected at the OEM development premise 1460 and then securely transferred to the secure programming premise 1462 for provisioning into the programmable devices 128.

The OEM content 1424 can be protected during the transition from the OEM development premise 1460 to the secure programming premise 1462. This protection can include encrypting the content at the OEM development premise before delivery to the programming system at the secure programming premise 1462.

In one example, the OEM development premise 1460 can be a separate facility where the OEM content 1424 is used to produce a wrapped OEM content 1426. The wrapped OEM content 1426 is content that has been protected cryptographically.

The wrapped OEM content 1426 can be protected with a wrapping key 1432. The wrapping key 1432 is a cryptographic key value, such as a secret hardware security module (HSM) wrapping key. The OEM content 1424 can be encrypted with the wrapping key 1432 using security software tools, such as the wrapping tool 1470, deployed within the secure environment of the OEM development premise 1460 and transferred to the secure programming premise

1462. The security software tools 1464 can include the wrapping tool for wrapping protected content.

The wrapping key 1432 can be related to a particular target system or premise. For example, the wrapping key 1432 can be linked to the secure programming system 100, such as where the wrapping key 1432 can be linked to the device identification 302 of the programmer 112 of the programming unit 110. The wrapping key 1432 can be associated with an HSM system, such as a security controller, or programmable device with a dedicated security module.

In another example, the wrapping key 1432 can be linked to a secure programming premise 1462 for the secure programming premise 1462. The wrapping key 1432 can be an OEM key, a premise key, a programmer key, or other similar key.

In yet another example, the wrapping key 1432 can be the public key 154 of one of the key pairs 150 associated with one of the programming units 110 at the secure programming premise 1462. An unwrapping key 1432 can be the private key 152 of one of the key pairs 150 associated with the programming unit 110. The OEM content 1424 can be encrypted with the wrapping key 1432 and then decrypted with the unwrapping key 1432. This ensures that the wrapped OEM content 1426 can only be used on the programming unit 110 for which it was intended.

In another example, the wrapping key 1432 can be the public key 154 of the security controller 114 (HSM) in the secure programming system 100. The wrapped OEM content 1426 can then be unwrapped using the HSM system 1474 and OEM content 1424 stored in the HSM system 1474. This provides a very high level of security because the OEM content 1424 is securely stored and processed only in the HSM system 1474. This can prevent any potential exposure of the keys and the OEM content 1424, thus providing a higher level of security than storing and processing the keys and content on the programming unit 110 or the host pc of the secure programming system.

The secure programming premise 1462 can be a manufacturing facility at another location. For example, in many manufacturing arrangements, the OEM may have a contract manufacturer use the wrapped OEM content 1426 to provision the programmable devices 128 in a different location or country.

The secure programming premise 1462 can use the secure programming system 100 to unwrap the wrapped OEM content 1426 and securely provision the programmable devices 128. The unwrapping key 1432 linked to the wrapping key 1432 from the OEM development premise 1460 can be securely transferred to the secure programming premise 1462 to unwrap the wrapped OEM content 1426.

The OEM content 1424 is protected in transition from the OEM development premise 1460 to the secure programming premise 1462. The OEM content 1424 can be secured by wrapping or encrypting the OEM content 1424 to form the wrapped OEM content 1426 using the wrapping key 1432. The wrapping key 1432 can be tied to a particular programmer 112. In another example, the wrapping key 1432 can be stored in the security controller 114 of the secure programming system 100. The OEM content 1424 can be encrypted using the wrapping key 1432 and then transferring the wrapped OEM content 1426 to the programming premise over the Internet. Because the wrapped OEM content 1426 is encrypted, it may be securely transferred over the Internet.

Figure 15:
FIG. 15 is an example of a secure import step.
Figure 15:
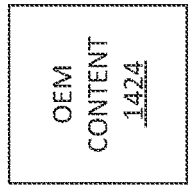
Figure 15:
Figure 15:
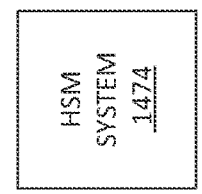
Figure 15:
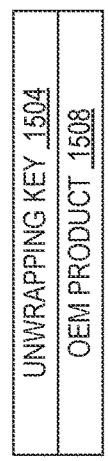

Referring now to FIG. 15, illustrates an example of a secure import step 1502. In the secure import step 1502, the wrapped OEM content 1426 can be securely imported into the secure programming system 100.

The secure programming premise 1462 can include a transfer computer 1476 for acquiring the wrapped OEM content 1426. The transfer computer 1476 can receive the wrapped OEM content 1426 transferred from the OEM development premise 1460 in a secure manner. For example, the OEM content 1424 can be wrapped and signed to allow authentication of the source and validation of content integrity to detect any potential tampering. No other security would be required during transit. In another embodiment, the transfer computer 1476 can send a query to the OEM development premise 1460 to request the wrapped OEM content 1426. The transfer computer 1476 can be a general-purpose computer or dedicated computing element used for transferring content between premises or secure zones.

The transfer computer 1476 can have a secure configuration where the transfer computer 1476 is physically separated from the secure programming system 100. The physical separation can be implemented in a variety of ways such as by using an air gap 1506. The air gap 1506 represents a break in the data connectivity between the transfer computer 1476 and the secure programming system 100. The air gap 1506 can isolate the secure programming system 100 from any external network connected to the transfer computer 1476.

The wrapped OEM content 1426 can be transferred from the transfer computer 1476 to the secure programming system 100 in a variety of secure ways. For example, the wrapped OEM content 1426 can be transferred using a removable media device, such as a Flash drive, a diskette, a disk drive, a memory stick, an optical media, or other data storage media. The wrapped OEM content 1426 This can maintain the air gap between the transfer computer 1476 and the secure programming system 100. The air gap allows the secure programming system 100 to be isolated from the Internet. This can prevent unauthorized access from outside sources.

In another example, the wrapped OEM content 1426 can be transferred using a specialized secure communication channel (not shown). This can include a separate encrypted data link, a removable network link, a secure network firewall, physically secured network links, or similar secure communication links.

In yet another example, the secure programming system 100 can include an integral host computer for processing incoming data, but the host computer can be directly connected to the secure programming system 100 if the secure programming system 100 is not connected to the Internet.

In this example, the wrapped OEM content can be sent over the Internet to a network connected PC at a secure programming premise. The OEM content is then transferred from this PC over the air gap to the transfer computer 1476 of the secure programming system 100 using a removable media such as flash media, optical disc, magnetic disc, or other similar media.

Once the wrapped OEM content 1426 is received by the security controller 114 of the programming unit 110 of the secure programming system 100, it can be securely stored and unwrapped. The security controller 114, such as an HSM unit, can decrypt the wrapped OEM content 1426 using an unwrapping key 1432. The wrapping key 1432 can be securely stored in the secure storage area.

The OEM content can be unwrapped by defining an OEM product 1508, such as a product that should be produced for the OEM, using the Data and Security Management software on the Host PC of the programmer 112. The OEM content 1424 representing the OEM product can be defined using the data and security software of the host PC of the programmer 112. The OEM content 1424 can be bound to the OEM product 1508.

Figure 16:
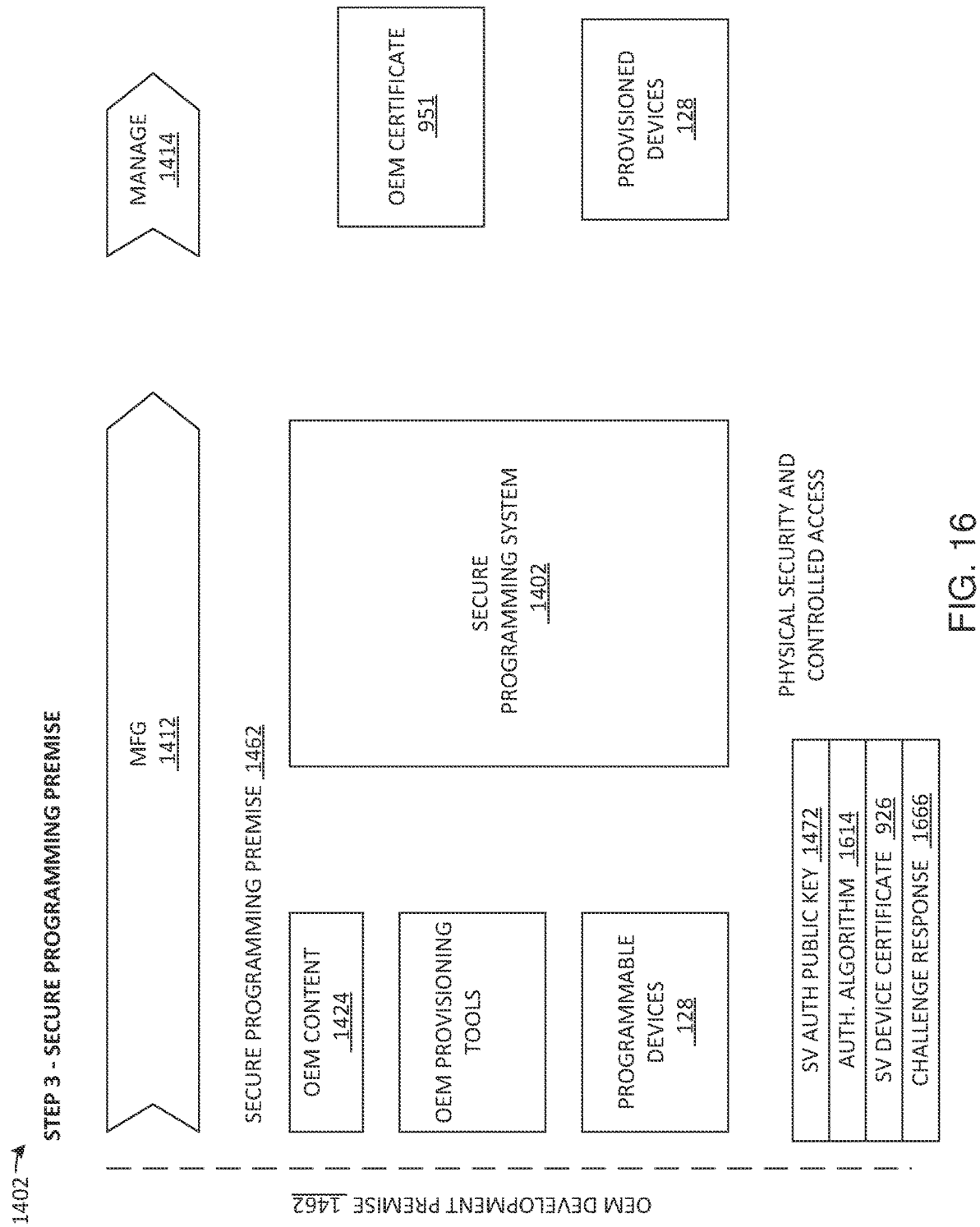
FIG. 16 is an example of a secure provisioning step.

Referring now to FIG. 16, illustrates an example of a secure provisioning step 1602. In the secure provisioning step 1602, the wrapped OEM content 1426 can be unwrapped and used for secure provisioning and data programming of the programmable devices 128 at the secure programming premise 1462.

The secure programming system 100 can implement several different use cases 1420 at the secure programming premise 1462 for provisioning different types of the programmable devices 128. The use cases 1420 can include an authenticating devices use case 1422, a provisioning identity use case 1422, a provisioning mutual authentication use case 1422, a provisioning secure booting use case 1422, a provisioning firmware protection use case 1422, a cloud provisioning use case, a secure update use case, and other secure operations and use cases.

In the authenticating devices use case 1422, the OEM 1416 can provide a silicon vendor authentication public key 154 associated with the OEM content 1424. The programming unit 110 can execute an authentication algorithm 1614 to read the silicon vendor device certificate 926, pass it to the security controller 114 and validate the silicon vendor authentication key 1616 and challenge response 1666 for each of the programmable devices 128 using the Authentication Key and Challenge response to the device using the Public device key 1668 from the silicon vendor certificate 1078.

The provisioning identity use case 1422 can set or provision the identity of the programmable devices 128 during product creation. In this use case, the OEM content 1424 can include a device certificate private signing key 1670 and a device certificate template 1454. The OEM content 1424 can be securely imported securely into the security controller 114 of the programming unit 110. For example, the programming unit 110 can be a programmer with a hardware security module (HSM).

The provisioning algorithm for microcontroller units (MCU) and secure elements 1620 are described below. The secure elements 1620 are security integrated circuits that provide secure storage and trusted execution environment in a tamper free package.

For the secure elements 1620, a device identity key pair 150 can be generated on the programmable devices 128 or in the security controller 114 of the programmer 112.

If the device identity key pair 150 is generated on the programmable device 128, the device public key 154 (Public Key) is read by the programmer 112, then passed to the security controller 114. The security controller 114 can then create the device certificate 1630 for the programmable device 128 using the device certificate template 1454 and the device certificate signing key 1632 and the device public key 154 of the programmable device 128. The device certificate 1630 is then programmed into the programmable device 128 in a secure manner, such as in a write once area.

If device identity key pair 150 is generated in the security controller 114, a device certificate 1630 is created in the security controller 114 using the Device certificate signing key 1632 and the device public key 154 of the programmable device 128. The device certificate 1630 is then programmed into the programmable device 128 in a read only region 1634 along with the device private key 152 that is programmed into one time write only and read protected region.

For microcontroller units 1636, the security boot manager 1640 (SBM), supplied as part of the OEM content 1424 is first programmed into one of the programmable devices 128. The security boot manager 1640 can initialize the secure storage unit 326 and secure execution unit 324 on the programmable device 128 and ensures that on re-boot, the security boot manager 1640 is executed and acts as the master firmware on the programmable device 128 and controls all access to the device. The security boot manager 1640 is also responsible for creating the device identity key pairs 150 on the programmable devices 128.

If the device Identity Key pair is generated on the microcontroller unit 1638, the device public key 154 is read by the programmer 112 and then passed to the security controller 114 where the device certificate 1630 is created using the and the device certificate signing key 1632 and the device public key 154 of the programmable device 128. The device certificate 1630 is then programmed into the device in a read only region 1634 of the programmable device 128.

If the device Key pair 150 is generated in the security controller 114, the device certificate 1630 is created in the security controller 114 using the device certificate signing key 1632 and the device public key 154 of the programmable device 128. The device certificate 1630 is then programmed into the device in a read only region 1634 along with the device Private key 152 that is programmed into a one-time write only and read protected region.

The provisioning mutual authentication use case 1422: The provisioning mutual authentication use case 1422 can provision the device identity as above and add a root certificate authority certificate 1642 that corresponds to one of the authentication endpoint 1676. The root certificate authority certificate 1642 is a digital certificate certifying the ownership of the public key named in the authority certificate 1642. The root certificate authority certificate 1642 can be issued by a trusted third-party certificate authority.

In an illustrative example, the process is shown for mutual authentication of two devices, such as a server and an end point. Here, each device is provisioned by an identity key pair and a device certificate.

The server can authenticate the end point. The server requests the end point's device certificate. The server then authenticates the Public Key in the public certificate of the end point through a challenge response operation with the end point sending an encrypted msg using the Public Key of the end point to the end point as a challenge and getting the unencrypted message back from the end point as a response. If the response matches the original message, then the public key corresponds to the identity of the end point and also validates that the private key of the end point. This represent the first step in the authenticating process.

The next step is to authenticate the chain of trust of the device certificate of the end point. If the chain of trust that the OEM of the end point has been established as "OEM Root CA certificate→OEM Intermediate Signing Certificate→Device Certificate", where each arrow corresponds to a signature on the Device Certificate by outer certificates. Now if the server is to verify the chain of trust for the end point, then it has to have access to the two higher level certificates. To expedite this processing, the OEM root CA certificate and OEM Intermediate Signing Certificate could be provisioned into the server at an initial stage, such as during manufacture, so that it could verify the chain of trust of the end point on the server, without having to dynamically fetch certificates from a known location during operation phase of these devices.

The same process can be used for having the end point authenticate the server.

The provisioning secure boot for MCU use case 972. The provisioning secure boot for controllers use case 1422 can be performed in a variety of ways. It can use an asymmetric method, a MAC method, or other similar techniques.

The asymmetric method 1644 for the provisioning secure boot for MCU use case 972 is performed as follows.

In the asymmetric method 1644, the OEM content 1424 can provides the OEM Code Signing Public key 154, the signed secure boot manager 1428, and signed firmware images 914 using the OEM Code Signing Private key 152. The provisioning algorithm 1468 can then program the code signing Public key 154 at a specific secure location in one of the programmable devices 128 as well as the signed SBM and signed firmware images 914. Upon boot of a device, the device boots by checking the signature of SBM and each FW component using the Code Signing Public Key. Some devices can support multiple code signing keys that are used to sign different FW images and such a model can also be supported.

Using a MAC method 1646. The MAC method 1646 can also include a hashing method. The MAC method 1646 is a message authentication code (MAC) technique to verify the integrity of a protected content. A checksum or message authentication code can be calculated for a given content element. The sender and receiver both share an identical key stored locally. The sender generates a cryptographic checksum or message authentication code based on the key and attaches it to the initial message. The receiver can also generate the code and compares the receiver generated code with the received message. Matching the checksums can ensure the message is from the sender keyholder.

In the secure programming case, the OEM content 1424 can include a Secure boot key 1654 that is programmed in a write once, read protected area of the programmable device 128. Then the security boot manager 1640 (SBM) and each of the signed firmware images 914 can be associated with a firmware image hash value 1656. The firmware image hash value 1656 can be generated in a variety of ways, such as using the md5 algorithm. The protected content can be stored into a write protected area of the programmable device 128.

Upon re-boot, the programmable device 128 can read each piece of the secured firmware content, such as the security boot manager 1640, an application image, etc., and generate a live hash value 1658, such as an md5 hash value, and compares it to the firmware image hash value 1656 that was generated and stored in the programmable device 128 for that piece of firmware images. If the hash values match, the booting process succeeds, otherwise it fails. This can prevent the tampering of the signed firmware images 914 which would result in a different hash value for the current or live hash value 1658.

The Provisioning FW Protection use case 1422. In this use case the wrapped OEM content 1426 can include encrypted firmware images 914 and a firmware decryption key 1674. The OEM content 1424 can then be unwrapped and imported into the security controller 114, such as hardware security module. The provisioning algorithm 1468 running on the programmer 112 receives the encrypted firmware images 914 and the firmware encryption key from the security controller 114 and provisions the device by programming the encrypted firmware images 914 and the encryption key 1662 at write once read protected storage on the device. In another approach, the encryption key 1662 may also be wrapped on a per device basis using the Device Identity Public key 154 and then programmed to the programmable devices, this approach being more secure than the previous approach where the firmware encryption key 1662 is programmed in the clear under physical protection The Production count use case 1422 can be implemented by importing the OEM content 1424 and then protected it in the security controller (HSM) from modification. This mechanism provides OEM complete control over overproduction.

From the above description of the architecture and the use cases, it is clear that the security controller, such as a hardware security module, provides the secure programming system 100 with the ability to securely store data such as the OEM inputs and secrets, secret keys, and cryptographical data that is generated during provisioning process. This can include securely execute cryptographic operations, signing and authentication certificates, encryption/decryption of data, or a combination thereof.

From the above description, it is clear that the programmer 112 plays an integral part as a controller by running the provisioning algorithm that manages processing and movement of data and secrets between the security controller 114 and the device. The programmer also provides the ability to read and write security credentials and firmware images into the programmable devices using a PHY interface connection to the chip.

Figure 17:
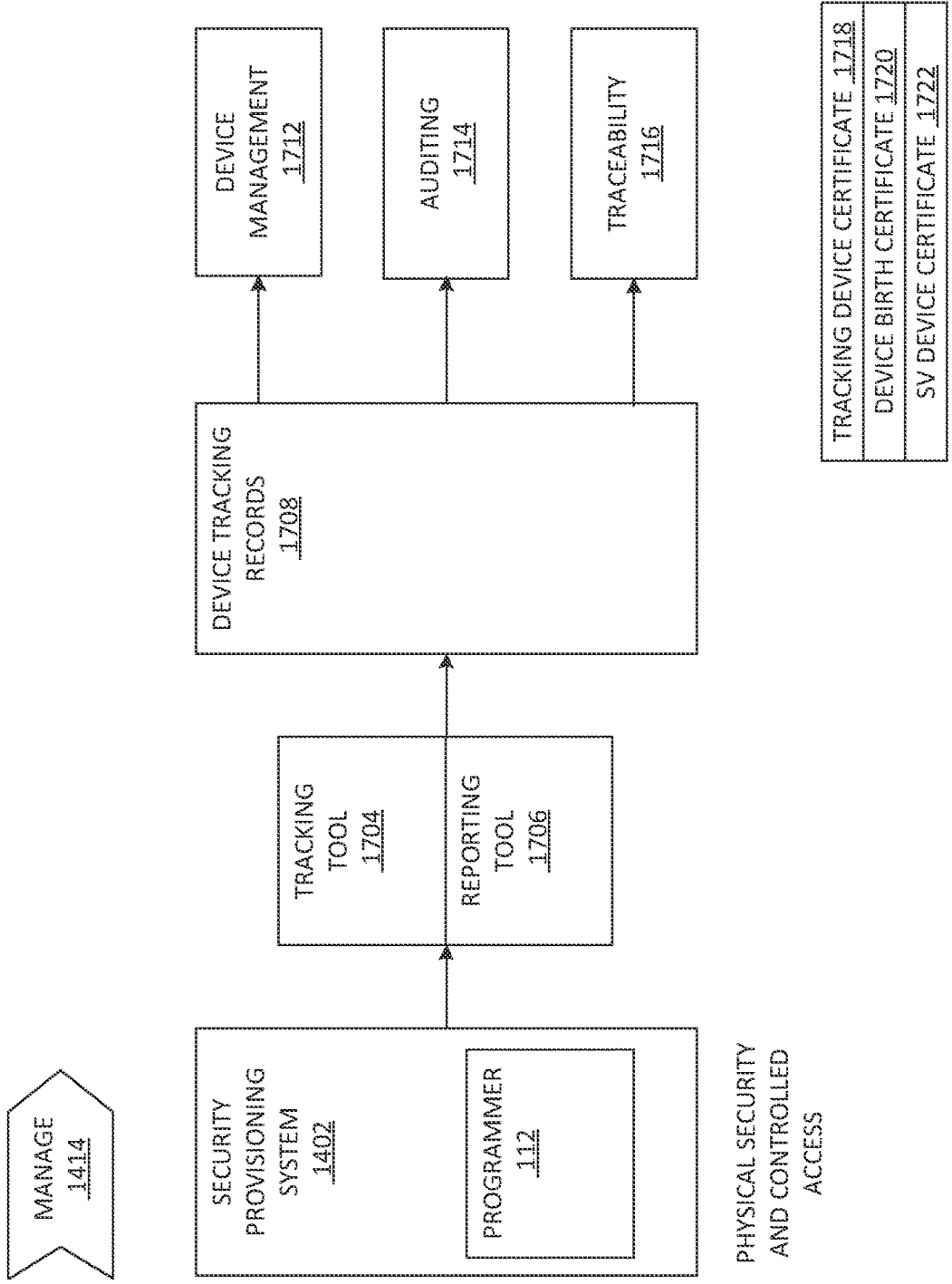
FIG. 17 is an example of a device management step.

Referring now to FIG. 17, illustrates an example of a device management step 1702. In the device management step 1702, a device tracking system 1704 of the secure programming system 100 can maintain records on the lifecycle history and usage of the programmable devices 128 after they leave the secure programming premise 1462.

The device tracking system 1704 can maintain a database or other data storage subsystem having usage and status records for the programmable devices 128. The device tracking system 1704 can maintain records, such as device tracking records that include the device identification, an identity device certificate, a device birth certificate, and other status and identification information.

The device tracking records 1708 are data records identifying the status of the programmable devices 128. For example, the device tracking records 1708 can include data regarding significant events or actions related to the programmable device 128 with the device identification 302 of one of the device tracking records 1708. This can include an activation date, one or more usage dates, a licensing date, a license validity date range, a termination date, or other information.

The device tracking records 1708 can have a variety of formats. For example, the device tracking records 1708 can have an XML format, a text format, a binary format, an encoded format, or other data format capable of representing the desired information.

The device tracking records 1708 can be used to enable multiple type of downstream services. This can include device management services, traceability services, auditing services, and other similar services.

The device management services allow remote data gathering and configuration of the programmable devices 128. The programmable devices 128 can communicate with the device tracking system 1704 to update the device tracking database. The programmable devices 128 can include devices and system including smart phones, semiconductor devices, memories, network systems, circuit boards, hybrid systems, or other similar devices and systems.

The device tracking system 1704 can be updated in a variety of ways. For example, the programmable devices 128 can form a direct network link with the device tracking system 1704 and update the database. In another example, the programmable devices 128 can record events locally and update the device tracking system 1704 when a network link is temporarily available. In yet another example, the programmable devices 128 can record the event information and transfer them to an intermediate system that is capable of updating the device tracking system 1704.

In another embodiment, the device tracking system 1704 can initiate a connection to the programmable devices 128 to retrieve stored event data. The device tracking system 1704 can connect with an intermediate system that has event records and retrieve the event records from the intermediate system.

The device management services can be performed in a variety of ways. For example, cloud onboarding services that are required by a cloud-based services like device lifecycle management applications. These applications can require a secure connection to the programmable devices 128. This can be achieved by providing the device certificates that were provisioned into programmable devices 128 back to the OEM 1416. The OEM 1416 can now populate the identity of each of the programmable devices 128, typically using the device certificates, to the cloud. For example, this can be performed using the cloud-based application programming interfaces (APIs) that are supported by publicly accessible cloud services. This process provides each of the programmable devices 128 with a cloud device identity 1710 so that communication to the devices can be secured.

The auditing services 1714 can track manufacturing information of the programmable devices 128. For example, the device tracking records 1708 can provide manufacturing batch information about how many devices were requested to be produced and how many devices were produced per each job run. This information is encrypted and signed and returned back to a tracking system located at the OEM development premise 1460.

The traceability services 1716 can track the programmable devices 128 over the lifecycle of the devices. This can be done by providing a tracking device certificate 1718 back to the OEM 1416 that can then be stored in a manufacturing execution system (MES) 702 at the secure programming premise, the OEM site, or another location. The tracking device certificate 1718 can include information regarding the initial manufacturing and identity of the programmable devices 128.

In an illustrative example, the tracking device certificate 1718 can be a device birth certificate 1720. Each of the programmable devices 128 can have the device birth certificate 1720. The device birth certificate 1720 is a data object that can securely hold the information describing the manufacturing history of the device. This can include identifiers and parameter information from the silicon vendor, the OEM, the programmer, and other entities that participated in the manufacturing process for the device.

For example, the device birth certificate 1720 can include a silicon vendor device certificate 926 having information about the original silicon vendor that manufactured the device. This can include the time, date, location, and silicon vendor identifier that initially manufactured the device. The device birth certificate 1720 can also include information about intermediate SKU operations, security provisioning, and data programming. The device birth certificate 1720 could include the intermediate programming information such as the programmer identifier, socket number, firmware version number, and other similar information for the intermediate locations and entities that have performed operations on the device.

The traceability services 1716 can be used to update the device birth certificate 1720 as it passes through the system. Alternatively, the traceability services 1716 can be used to record the information from the device birth certificate 1720 in the device tracking records 1708 each time the programmable device 128 is accessible to the tracking system.

Figure 18:
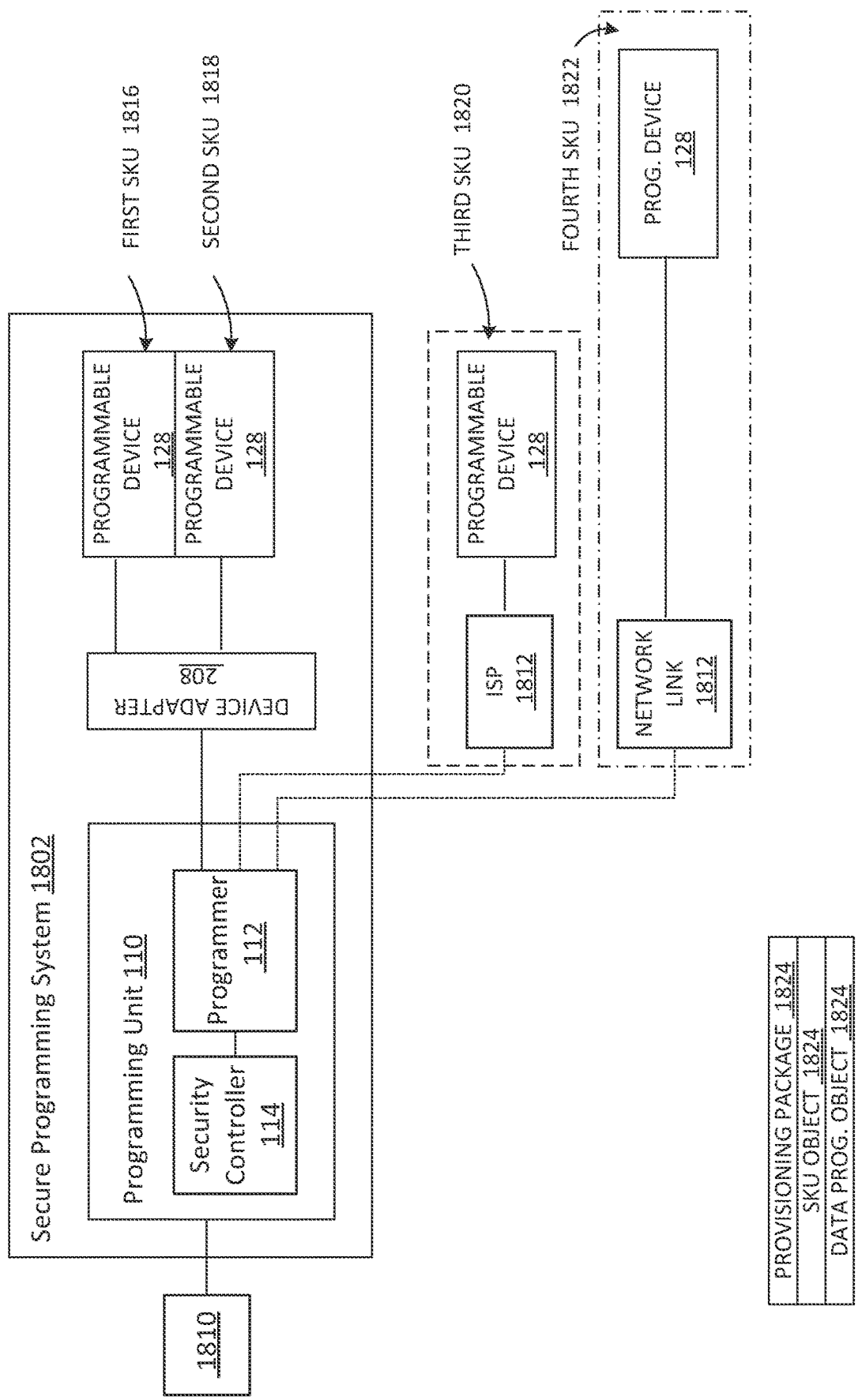
FIG. 18 is an example of a SKU configuration mode.

Referring now to FIG. 18, illustrates an example of a SKU configuration mode 1804. In the SKU configuration mode 1804, the secure programming system 1802 can initialize the programmable devices 128 to produce one or more versions of the programmable devices 128 with different configurations in a single operation.

The secure programming system 1802 can configure the features of the programmable devices 128 to create multiple final device type configurations. Each of the final device type configurations can be identified by a different stock keeping unit (SKU) having different properties.

The programmable devices 128 can be provided be in a blank or raw state in regards to configurable features. The blank state can represent a superset of all features available to be configured. The mechanisms for controlling the features can include security fuses, setting data, configurable registers, control bits, memory area, and other similar elements. The features can be used to control different operational aspects of the programmable devices 128.

For example, the programmable devices 128, such as Flash memory devices, can configure the available memory size by setting parameters that activate or deactivate different memory areas of the base device to reduce the available memory size. This can allow the system to change the memory size of the base device and create different SKUs with different memory sizes using the same base device. A flash memory device with 256+GB of total memory can be configured to be a 128 GB device, a 64 GB device, or a 32 GB device based on setting deactivating certain portions of the total memory area.

In another example, the programmable devices 128 can also include other memory areas, such as write once memory areas, that can also be configured as accessible or not accessible. Other examples can include setting control bits to enable or disable security features in a microcontroller unit, setting registers to change the level of error correction in a hybrid device, programming configuration data values into secure memory location, and other features.

The secure programming system 1802 can receive a SKU data object 1826 having a SKU configuration 1824. The SKU data object 1826 is a data structure having the information for one or more SKU configurations. The SKU data object 1826 can be part of target programming job 1810.

The SKU configuration 1824 is a data structure that represent the settings of one of the SKUs. The SKU configuration 1824 can include the configuration data to be programmed into the programmable devices 128 for a particular SKU. For example, the SKU configuration 1824 can include information for setting security fuses, data areas, configurable registers, control bits, and other data that defines the SKU.

The secure programming system 1802 can configure and program a set of the programmable devices 128 in a variety of ways. In one embodiment, the secure programming system 1802 can execute three general stages of operation: SKU configuration, security provisioning, and data programming. The SKU configuration stage can customize the base devices into one or more SKUs. The security provisioning stage can provision individual and group security information into the programmable devices 128. And the data programming stage can deploy specific content to individual or groups of the programmable devices 128.

In one example, the SKU configuration operation can configure all of the programmable devices 128 as one type of SKU. After the programmable devices have been SKU configured, the security provisioning operation can provision individual security information into the specific devices. Finally, the data programming, or firmware programming, stage can program the content into the programmable devices 128. Thus, in this case, each of the programmable devices 128 coupled to the secure programming system 1802 could have the same SKU configuration, individual security provisioning configurations, and the same content.

It is understood that other configurations are possible. In another example, the SKU configuration can configure some of the programmable devices 128 in a batch of devices differently with some having one SKU configuration while others have a different SKU configuration. This can include a first SKU 1816, a second SKU 1818, a third SKU 1820, and a fourth SKU 1822. Although four SKUs have been shown, it is understood that any number of SKUs may be used.

In yet another more extreme example, each of the programmable devices 128 coupled to the secure programming system 1802 can be individually configured with a separate SKU configuration, a separate security provisioning, and a separate content. The programmable devices 128 representing different SKUs can have different device identity characteristics and different content. Each of the programmable devices 128 can have a different identification configuration including one or more of the device identifications 302, the device birth certificate 1720, the security keys 106, or other identification values. Each of the programmable devices 128 can be a different device type, a different size, a different security level, or other physical property.

The programmable devices 128 can be coupled to the programmer 112 in different ways. In one embodiment, the programmable devices 128 can be mounted in the device adapters 208 where all of the destination sockets 210 have the same configuration. In another embodiment, as indicated by the dashed lines in FIG. 18, the programmable devices 128 can be coupled to the programmer 112 using an in-system programmer 1812. In yet another embodiment, as illustrated by the dot-dash lines, the programmable devices 128 can be coupled to the programmer 112 over a network link 1320.

It is understood that the in-system programmer 1812 can include different types programmers that can program a component while installed in a system. This can include an in-circuit programmer, an on-board programmers, a PCB programmer, and other similar variations. The different embodiments can be implemented as individual configurations for one device type or a connection at a time.

Although one common embodiment of the secure programming system 1802 can have the programmable devices 128 coupled to the programming unit 110 either the same SKU configuration and target content for all of the programmable devices 128, it is understood that the secure programming system 1802 can be a modular system that can support other mixed device configurations. In one alternative example, the device adapters 208 can be configured to have multiple types of the destination sockets 210 for mounting the different types of the programmable devices 128. In this case, one portion of the device adapter 208 could configured with one type of destination sockets 210 and have programmable devices 128, such as flash memory chips. Another portion of the device adapter 208 could be configured with a different type of the destination socket 210 and have a different type of chip mounted, such as a system on a chip with a processor and Flash memory. Each portion could represent a tray of one type of parts.

The programmable device 128 can be coupled to the programmer 112 with different types of connection including wired, wireless, and intelligent connections, such as an in-system programmer. In one embodiment, the programmable devices 128 can be coupled to the programmer 112 over a network link. This can allow the programmable devices 128 to be provisioned locally or remotely and can use a secure agent 1806 running on the programmable device 128 to securely connect with the programmer 112 and securely provision the programmable device 128. This can be the case where the programmable devices 128 are smart phones, circuit boards, consumer systems, or other similar devices and systems.

The secure agent 1806 can be implemented using the secure objects, such as the first secure object 602. The secure agent 1806 can utilize an HSM for cryptographic support such as encryption, decryption, signing, wrapping, unwrapping, or other similar cryptographic functions. The secure agent 1806 can support encrypted communication with the secure programming system 1802.

In yet another embodiment, the programmable devices 128 can be coupled to the programmer 112 via an in-system programmer 1812. This can allow the programmable devices 128 to be provisioned and programmed when already installed on a product or circuit board. The secure agent 1806 can be executed on the in-system programmer 112 or on the programmable devices 128.

It is understood that the secure programming system 1802 can have a hybrid configuration with a mixture of connections including device adapters 208, destination sockets 210, network links, and in-system programmers 1812.

The hardware security module 1474 (HSM) provides dedicated cryptographic capacity to perform security tasks efficiently and at high speed. The secure programming system 1802 can use one or more of the hardware security modules 1474. Depending on the configuration, the hardware security module 1474 can be part of the programming unit 110, the programmer 112, integrated with the programmable devices 128, or a separate module coupled to components of the system. For example, the hardware security module 1474 can be the security controller 114 of the programming unit 110, the secure execution unit 324 associated with the programmable device 128, a security co-processor, a cryptographic chip, a security accelerator, embedded security circuitry, hardware modules, an FPGA, an application specific integrated circuit, or other similar hardware security module.

In an alternative configuration, the hardware security module 1474 can also be implemented as security software, such as SoftHSM, running on different types of hardware including a processor within the system, a network attached processor, a cloud computing element, a co-processor, or other similar computing resources. The hardware security module 1474 can also be implemented as a hybrid system partially in hardware and partially in software.

SKU provisioning is part of the process where a reference base silicon product is turned into multiple product by configuring or disabling certain features. For example, different members of an MCU family can be created by disabling certain features of a base silicon product. The features can include different available Flash memory sizes, SRAM sizes, I/O functionality, or a combination thereof.

Existing programming systems perform the three stages of SKU configuration; security provisioning, and data programming as three individual separate steps during device manufacturing. They may be SKU configured in one location or system and then transferred to another location for security provisioning and data programming. Performing these multiple stages on different apparatuses and location can be time-consuming and inefficient. The secure programming system 1802 can perform all three stages in a single hosting of the programmable devices 128. This ability to mount the programmable devices 128 one and perform all three stages in a single hosting increases efficiency, reduces manufacturing time, and simplified overall operation. The ability to securely receive the SKU information, the security provisioning information, and the secure data and content for data programming enables a more efficient manufacturing operation.

As mentioned earlier, one embodiment can include all of the programmable devices 128 configured, provisioned, and programmed in one single programming operation. The SKU configuration can be common to all of the programmable devices 128 in the current batch being manufacture red. After the SKU configuration stage, each of the programmable devices 128 can have the same SKU configuration and essentially look the same. The security provisioning can add individual security information that can make the programmable devices 128 each have different security attributes. The differentiating factors can include embedded security keys, identification numbers, date/time stamps, and other similar values. Finally, the data programming stage can program the same content into each of the devices. In some cases, there can be additional customization at the data programming stage such as license information, serial numbers, or other similar information.

In another alternate embodiment, the programmer 112 can configure each of the programmable devices 128 loaded at one time with different content. Each of the programmable devices 128 can be programmed individually at the same time. The content can include firmware images, media images, data, serial numbers, and other similar data.

The programmer 112 can be configured to have sufficient memory and processing power to provision all of the programmable devices 128 connected to the programmer 112 at one time. This allows the production of multiple device types having different content simultaneously in one hosting of the programmable devices 128 in the destination sockets 210 and the device adapters 208 coupled to the programmer 112. This can provide additional flexibility in the manufacturing process and increase the efficiency and utilization rates of the secure programming system 1802.

The individualized content for the programmable devices 128 can be provided in a variety of ways. For example, the secure programming system 1802 can receive multiple content payloads for different groups of the programmable devices 128. In another example, the programmer 112 can detect the properties of the individual programmable devices 128 and customize a single copy of the content for the different types of the programmable device 128.

In an illustrative example, the programming unit 110 can receive one or more target programming jobs 1810 and create a variety of the final products. Each of the SKUs can represent a different end component and can have different content configured for different types of the programmable device 128.

The secure programming system 1802 can include the programming unit 110 having the programmer 112 and the security controller 114. The security controller 114 can be at least partially implemented in hardware and can be a hardware security module.

The programmer 112 can be coupled to the programmable devices 128 in several ways. This can include the device adapters 208, an in-system programmer 1812, a network link 1320, or a combination thereof. The programmer 112 can be configured with one type of interface at a time, but it is understood that some configuration could be configured with more that one type of interface.

In a first example, the programmer 112 can be coupled to the device adapter 208 which can have two of the programmable devices 128 mounted in the destination sockets 210. The programmable devices 128 can be of a single type, such as a first SKU 1816, or of multiple types such as the first SKU and a second SKU 1818. It is understood that any reasonable number of destination sockets 210 attached to the device adapter 208. The number of destination sockets 210 can be based on the amount of available physical space and the size of the programmable devices 128.

In a second example, the programmer 112 can be coupled to one of the programmable devices 128 using the in-system programmer 1812. This can allow the programmer 112 to provision the programmable devices 128 when they are mounted on a circuit board or are part of an end product. The programmer 112 can provision the programmable device 128 to form a third SKU 1820. It is understood that there can be one or more of the in-system programmers 1812 attached to the programmer 112 during manufacturing. The number of in-system programmers 1812 can be determined by the number of connections available on the programmer 112 or the amount of physical space available.

In a third example, the programmer 112 can be coupled to the programmable devices 128 using the network link 1320. This can allow the secure programming system 1802 to update the programmable devices 128 remotely. This could be the case where the programmable devices 128 are smart phones, end products, or other remote devices. The programmer 112 can provide the programmable device 128 to form a fourth SKU 1822. The number of programmable devices 128 that can be programmed can be determined by the availability of network connections and the amount of available network bandwidth.

The secure programming system 1802 can thus create multiple SKU devices in a single operation. After coupling to the programmable devices 128, the secure programming system 1802 can retrieve the device certificate and other information associated with the programmable devices 128, form a provisioning package 1824 having the target content, and transfer the provisioning package 1824 to the programmable devices 128 to form the multiple SKUs. This can reduce the number of times the programmable devices 128 need to be physically manipulated by the system and thus reduce the overall time required for processing.

Figure 19:
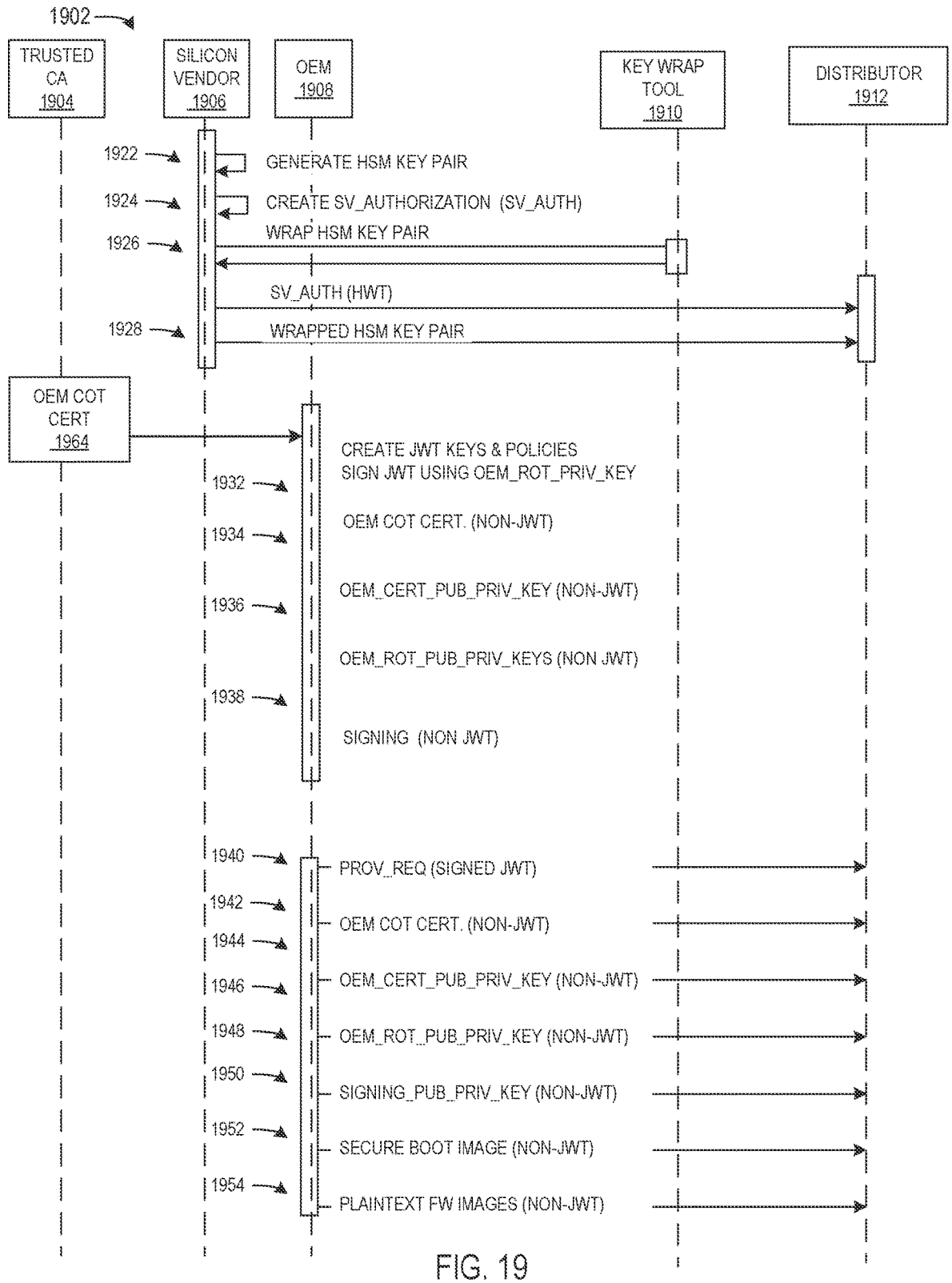
FIG. 19 is an example of a gathering credentials stage.

Referring now to FIG. 19, illustrates an example of a gathering credentials stage 1902. The gathering credentials stage 1902 can show a process for gathering and defining data structure for the secure programming system 100.

The secure programming system 100 can include several different entities or locations where various tasks in the system can be performed. These entities can include a trusted certificate authority 1904, a silicon vendor 1906, an original equipment manufacturer location 1908, a key wrap tool 1910, a distributor 1912, an OEM management system (OMS) 1914, OEM entity 1916, and factory manufacturing system (FMS) 1918, and a data management system (DMS) 1920.

The secure programming system 100 can send messages and data objects between the locations and entities securely using a variety of ways. For example, the messages and data objects can be signed and encrypted using JSON Web Tokens (JWT). The JWT are data objects used to store or transfer signed or encrypted content. The JWT data objects are text based and include a header, a payload, and a signature. Details about the JWT are provided below.

The gathering credentials stage 1902 can include several steps used to generate the credentials and other assets. The various steps can take place at or between different locations and entities. The gathering credentials stage 1902 can allow the OEM 1416 to prepare a package to deploy to the distributor 1912. In an illustrative example, the distributor 1912 can be a contract manufacturer who receives an order to manufacture the parts as defined by the content from the OEM 1416. The OEM 1416 can control the manufacturing process by properly configuring the information sent to the distributor 1912.

A generate HSM key pairs step 1922 can be performed at the silicon vendor 1906 to generate an HSM key pair 1950 and other security key pairs as needed. The silicon vendor 1906 can use a local hardware security module to generate the HSM key pair 1950. The HSM key pair 1950 can be generated and wrapped by the key wrap tool 1910 before being transferred to the distributor 1912. The HSM key pair 1950 can have an HSM public key 154 and an HSM private key 152.

In an illustrative example, the HSM key pair 150 can be linked to the particular hardware of a target HSM device having an HSM identifier 1956. This HSM device can be the security controller 114 of the secure programming system 100.

A Create SV authorization step 1924 can create a silicon vendor authorization object, a SV_Auth element 1960, that can contain the HSM_PUB_KEY. The SV_Auth element 1960 can signed as a JWT data object using a SV_PRIV_KEY. This can be a silicon vendor private key.

A wrap keys step 1926 can use the key wrap tool 1910 to wrap the HSM public key and the HSM private key. This can be a non-JWT data element. The SV_Auth element 1960 can be signed as part of the JWT data object and sent from the silicon vendor 1906 to the distributor 1912.

A distribute wrapped keys step 1928 can send the wrapped public and private keys, the HSM private key 152 and the HSM public key 154, to the distributor 1912. This can be a non-JWT operation.

In an optional step 1930, the OEM chain-of-trust certificate can be created at the trust certificate authority 1948 and provide to establish a valid chain of trust back to the root certificate. The certificate can include the public key, OEM_CERT_PUB_KEY and generate the signature, using the trusted CA private key 152, such as a TRUSTED_CA_PRIV_KEY.

The chain-of-trust is the verifiable linkage between a secure object having an end-entity certificate and a root certificate from a trusted certificate authority. Each link in the change can be individually validated. The combination of linkages can show an unbroken chain of trust reaching all the way back to the root certificate from the trusted certificate authority.

In a create JWT step 1932 the OEM 1416 can create a provisioning request 1958, such as a prov_req, which can include the keys and policies needed for provisioning. The provisioning request 1958 can be a JWT data object signed using an OEM root of trust private key 152, such as an OEM_ROT_PRIV_KEY. In an example, the product SKU information can be included in the prov_req and image signing public keys can also be in prov_req.

A wrap OEM chain of trust certificate step 1934 can wrap the OEM chain of trust certificate 1964 using the key wrap tool 1910. This is a non-JWT object.

A wrap OEM certificate public private keys step 1936 can be used to wrap the OEM certificate public private key 152, such as an OEM_CERT_PUB_PRIV_KEY value, using the key wrap tool 1910. This can be a non-JWT object.

A wrap OEM root of trust public private keys step 1938 can be used to wrap an OEM root of trust public private keys 1968, such as an OEM_ROT_PUB_PRIV_KEYS value, using the key wrap tool 1910. This can be a non-JWT object.

A wrap signing public private key step 1940 can be used to wrap a signing public private key 152, such as a SIGNING_PUB_PRIV_KEY value, using the key wrap tool 1910. This can be a non-JWT object.

A transfer content to distributor step 1942 can transfer the provisioning request 1958 and other data objects from the OEM location 1006 to the distributor 1912. This can include the wrapped versions of the OEM chain of trust certificate 1964, the OEM certificate public private keys 1966 (OEM_CERT_PUB_PRIV_KEY value), the OEM root of trust public private keys 1968 (OEM_ROT_PUB_PRIV_KEYS value), and the signing public private keys 1970 (SIGNING_PUB_PRIV_KEY value). In addition, the secure boot image 1946 and the plaintext firmware images 914 can also be transferred from the OEM 1416 to the distributor 1912.

The data objects used in the system can be signed, wrapped, and encrypted in a variety of ways. In an illustrative example, the data objects can be JWT objects. The JWT data objects can be used to store and transfer secure content. The JWT data objects use the JavaScript Online Notation (JSON) to represent the header, the payload, and the signature. The JWT header can include information such as the algorithm used to sign or encrypt the JWT, a type describing the type of content being signed or encrypted, or a combination thereof.

The JWT payload can be a text representation of a data object encapsulated in the JWT data object. The signature can be a digital value uniquely representing the content.

The JWT data objects can be nested. This mean that a signed JWT data object can be signed or encrypted a second time which can protect the initial signature from being removed or observed by non-authorized users.

The JWT data object can use a variety of signing algorithms. This can include HMAC+SHA256, RSASSA-PKCS1-V1_5+SHA256, ECDSA+P-256+SHA256, or other similar signing algorithms. The Hash-Based Message Authentication Codes (HMAC) implement symmetric cryptography and allow signing message using a shared key. RSA (Rivest, Shamir, Adleman) and ECSA (Elliptic Curve Digital Signature Algorithm) are algorithms that implement asymmetric cryptography and allow signing a message using a public/private key pair.

Figure 20:
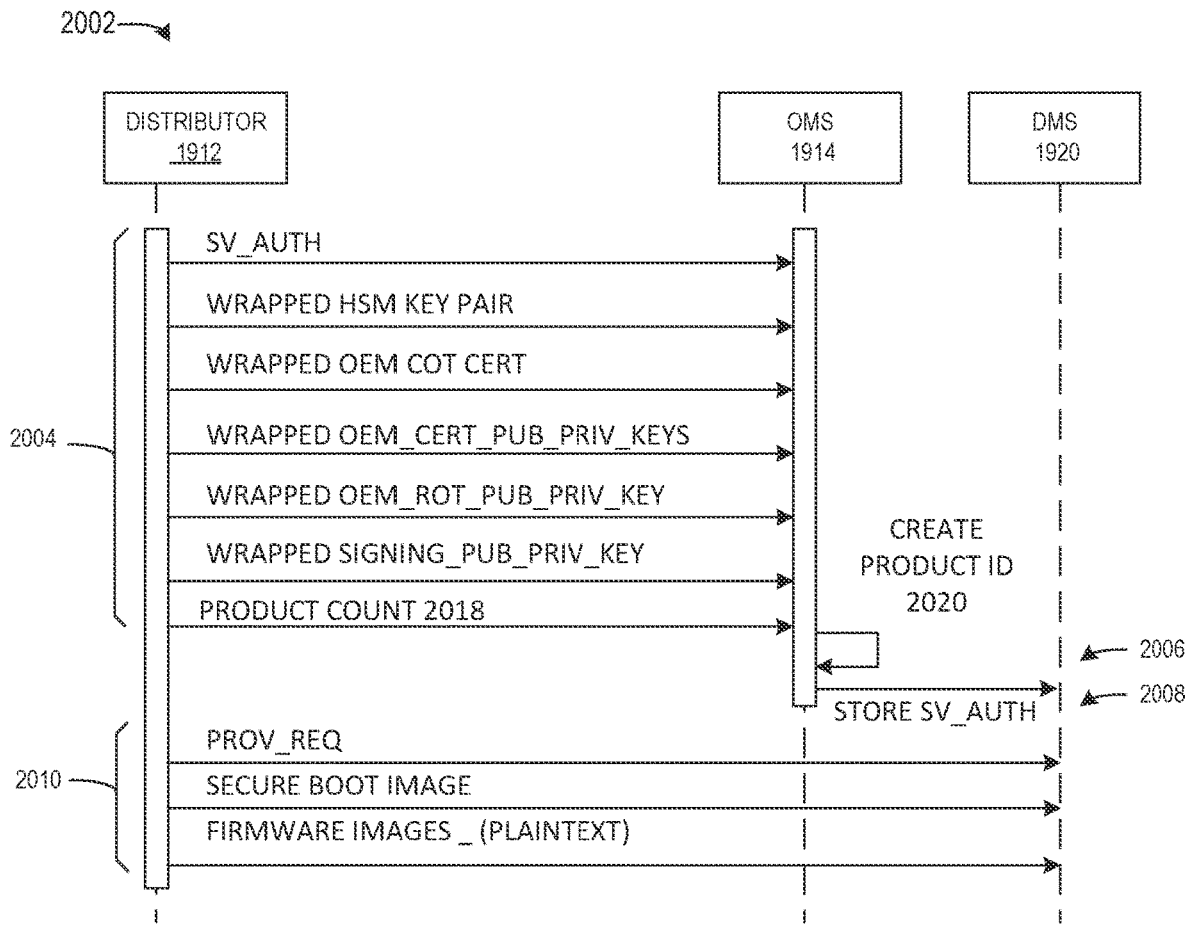
FIG. 20 is an example of a product configuration stage.

Referring now to FIG. 20, illustrates an example of a product configuration stage 2002. The product configuration stage 2002 can create the product configuration and the job package.

In a deploy step 2004, the distributor 1912 can transfer the SV_Auth element 1960 and the associated data objects and files to the OEM management system 924. The OEM management system 924, such as the programming unit 110, can receive the SV_Auth element 1960 and associated content and program the programmable devices 128.

The SV_Auth element 1960 can be linked to a variety of secure and non-secure information used for provisioning and protecting the programmable devices 128. For example, the SV_Auth element 1960 can be linked to wrapped versions of the HSM Private key 152, the HSM public key 154, an OEM chain of trust certificate 1964, an OEM certificate public private keys 1966, an OEM root of trust public private keys 1968, and a signing public private key 152. In another example, these values can be respectively be represented as HSM_PRIV_KEY, HSM_PUB_KEY, OEM_CHAIN-OF-TRUST_CERTIFICATE, OEM_CERT_PUB_PRIV_KEYS, OEN_ROT_PUB_PRIV_KEYS, AND SIGNING_PUB_PRIV_KEY. The SV_Auth element 1960 can include a product count 2018 indicating the number of products to be created.

SV_AuthIn a create product identifier step 2006, the OEM management system 924 (OMS) can create the product identifiers 2020 for the set of the programmable devices 128 equal to the product count 2018.

In a deploy to DMS step 2008, the OEM management system 924 (OMS) can store the SV_Auth element 1960 and the associated wrapped credentials into the HSM system 1474 of the DMS system 1920.

The SV_Auth element 1960 can be updated with the product count 2018, a product identification 2026, and the wrapped credentials and stored in the hardware security module 1474. The OEM management system 924 (OMS) can forward the SV_Auth element 1960 to the data management system 1920 (DMS) having the HSM system 1474. For example, the DMS/HSM can be implemented with the programmer 112 having a hardware security module. The product identification 2026 can include a device identifier, a model number, a batch number, a lot number, a serial number, or other identification values.

In a deploy provisioning request to DMS step 2010, the distributor 1912 can transfer the provisioning request 1958, the secure boot image 1946, and the plaintext firmware images 914 into the DMS system 1920. The provisioning request 1958 can include the prov_req object.

Figure 21:
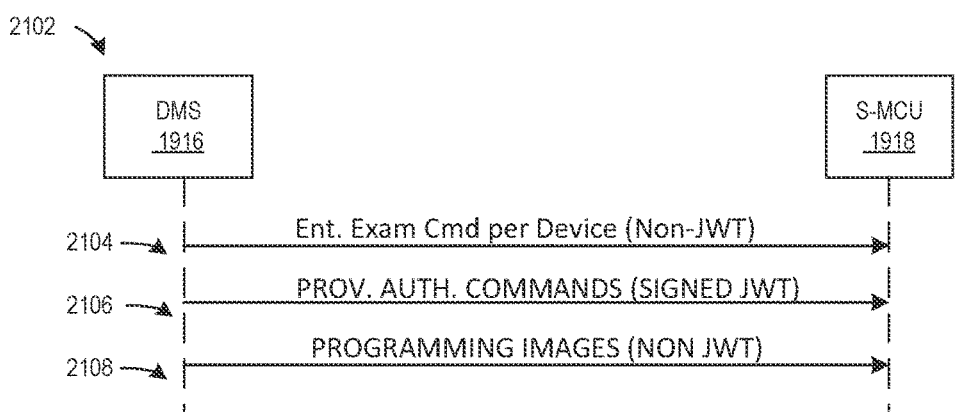
FIG. 21 is an example of a running jobs stage.

Referring now to FIG. 21, illustrates an example of a running jobs stage 2102. The running jobs stage 2102 can transfer information from the DMS system 1920 to the programmable devices 128 including MCU, Flash memory, application specific integrated circuits, field programmable gate arrays, custom chips, read only memories, hybrid devices, wafer level components, smart phones, circuit boards, and other similar device.

The running jobs stage 2102 can include the steps of a providing entrance examination commands step 2104, a provisioning authorization commands step 2106, and a programming images step 2108.

In the providing entrance examination commands step 2104, the DMS system 1920 can perform the entrance exam commands on a per device basis. This is a non-JWT object. In the provisioning authorization commands step 2106, the authorization information can be provisioned into the programmable devices 128. This can include signed JWT data objects.

In the programming images step 2108, the firmware images can be programmed into the programmable devices 128. The firmware images are not JWT data objects.

Figure 22:
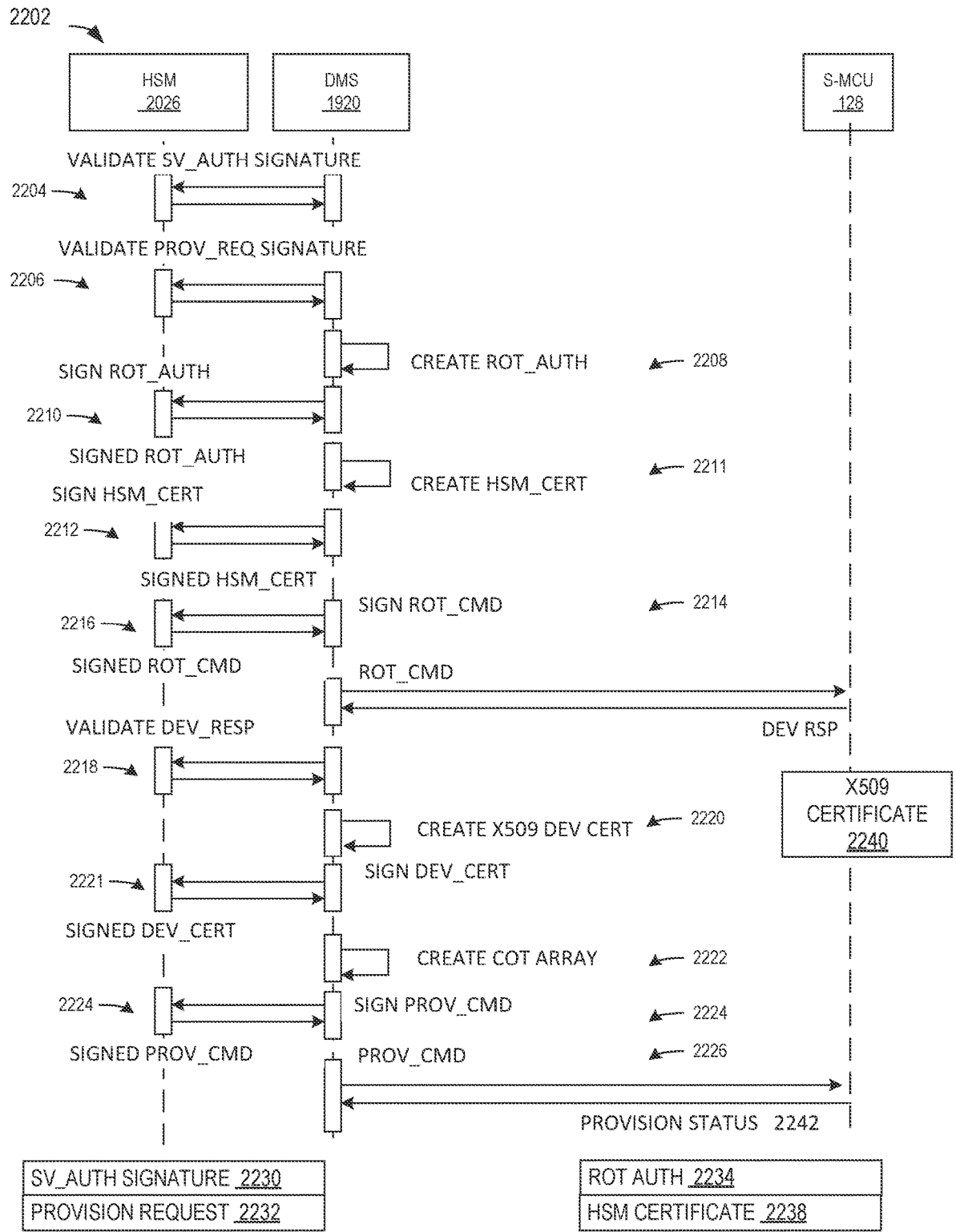
FIG. 22 is an example of a provisioning authorization stage.

Referring now to FIG. 22, illustrates an example of a provisioning authorization flow 2202. The provisioning authorization flow 2202 can be performed on the DMS system 1920, such as the programming unit 110, having the hardware security module 1474 and deployed to the data management system, the DMS 1920, before being deployed on the programmable devices 128, such as a microcontroller unit (MCU).

In a validate SV_Auth step 2204, the DMS system 1920 can validate the SV_Auth element 1960 using the HSM system 1474. The DMS system 1920 can transfer the SV_Auth element 1960 and the associated SV_Auth signature 2230 to the HSM system 1474 to be validated. After validating the signature, the HSM system 1474 can transfer the SV_Auth element 1960 and related information back to the DMS system 1920.

In a validate prov_req step 2206, the DMS system 1920 can also validate the prov_req 2232 using the HSM system 1474 and the DMS system 1920. After validating the signature, the HSM system can transfer the prov_req 2232 back to the DMS system 1920.

In a create rot_auth step 2208, the DMS system can create the JWT rot_auth value 2234 by combing the OEM_ROT_PUB_KEY, the HSM_PUB_KEY, and the Product identification 2026.

In a sign rot_auth step 2210, the DMS system 1920 can sign the JWT rot_auth value 2234 using the OEM_ROT_PRIV_KEY and transfer it back to the HSM system 1474.

In the create HSM certificate step 2211, the DMS system 1920 can create the HSM certificate 2238, such as an HSM certificate, using the signing public key 154, SIGNING_PUB_KEY, and the OEM certificate private key 152, OEM_CERT_PRIV_KEY.

In the sign HSM certificate step 2212, the HSM certificate 2238 can be signed at the HSM public key 154 using the OEM_CERT_PRIV_KEY and the signed HSM certificate 2238 can be transferred back to the DMS system 1920.

In the sign ROT_CMD step 2214, the rot_cmd value can be created based on the SV_Auth value, the rot_auth value, the product identification 2026, and the HSM_PRIV_KEY.

In the update ROT_CMD step 2216, the JWT object dev_rsp that contains the DEV_PUB_KEY can be signed using the DEV_PRIV_KEY.

In the validate dev_resp step 2218, the dev_resp value can be transferred from the DMS system 1920 to the HSM system 1474 and validated.

In the create x509 device certificate step 2220, the X509 device certificate 2240, dev_cert, can be formed using a certificate template 2244 and the DEV_PUB_KEY. The signature can be generated using the SIGNING_PRIV_KEY.

In the sign dev_cert step 2221, the X509 device certificate 2240 can be signed using the SIGNING_PRIV_KEY. The signing can be performed in the HSM system 1474.

In the create chain of trust step 2222, the DMS system 1920 can be used to create an array of chain of trust elements that contain the device certificate 1630, the HSM certificate 2238, and the OEM chain of trust certificate 1964.

In the sign prov_cmd step 2224, the HSM system 1474 can sign the prov_cmd value having the SV_Auth value, the prov_req value, and the array of chain of trust elements. The prov_cmd value can be signed using the HSM_PRIV_KEY. The signed value can be transferred to the DMS system 1920.

In the deploy prov_cmd step 2226, the DMS system 1920 can transfer the prov_cmd value to the MCU programmable device 128. The provisioning status 2242 can be transferred back to the DMS system 1920.

Figure 23:
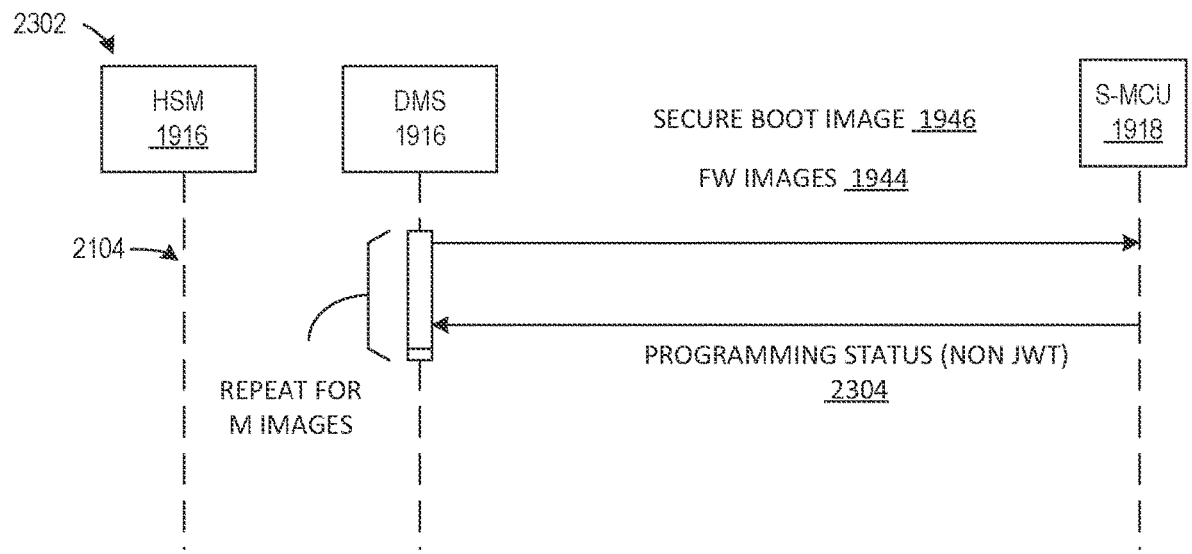
FIG. 23 is an example of a programming images stage.

Referring now to FIG. 23, illustrates an example of a programming images stage 2302. The programming images stage 2302 can program the targeted content into the programmable devices 128. In one embodiment, for each of m images, the secure boot image 1946 or plaintext firmware images are transferred from the DMS system 1920, such as the programmer 112, into the programmable devices 128, such as a microcontroller unit. After programming the programmable devices 128, the programming status 2304 is generated at the DMS system 1920.

Figure 24:
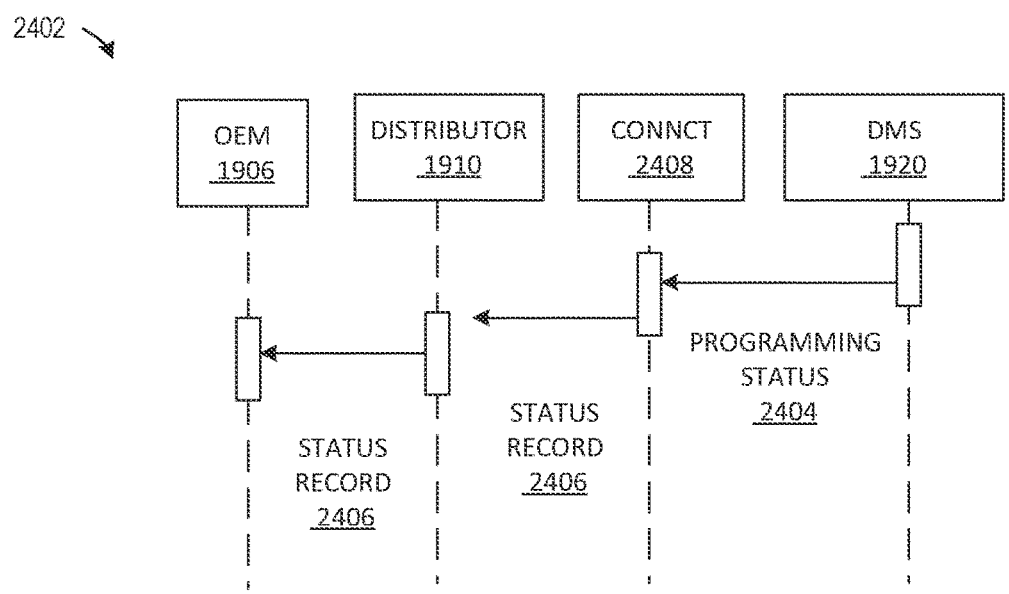
FIG. 24 is an example of an end of provisioning flow.

Referring now to FIG. 24, illustrates an example of an end of provisioning flow 2402. The end of provisioning flow 2402 updates the status records of the various components of the secure programming system 100. The information can be sent back to a factory management system, a factor information system, a manufacturing reporting system, or a similar data repository for reporting.

At the DMS system 1920, the programming status 2304 of the latest programming job can be returned to a connectivity system 2406. A status record 2404 can be transferred back to the distributor 1912 and the OEM 1416.

Figure 25:
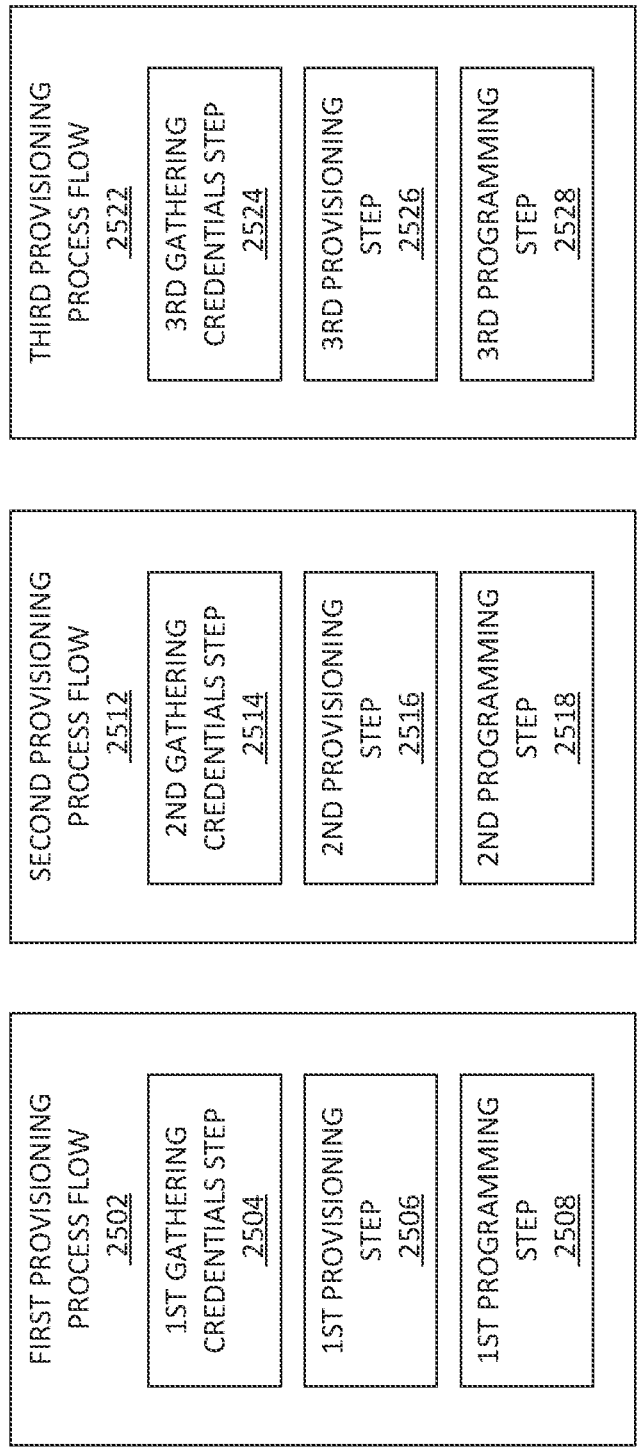
FIG. 25 is an example of provisioning process flows for the secure programming system.

Referring now to FIG. 25, illustrates an example of provisioning process flows for the secure programming system 100. The three process flows show progressively more secure provisioning processes.

A first provisioning process 2502 does not use JWT at the OEM 1416. The chain of trust elements are created by secure programming system. The secure programming system can program plaintext firmware Images into the programmable devices 128. The secure programming system 100 can program the secure boot image 1946 into the programmable devices 128.

The first provisioning process 2502 can be configured in a variety of ways. For example, the first provisioning process 2502 can include three steps: a gathering credentials step, a provisioning step, and a programming step.

The first gathering credentials step 2504 can gather and prepare the information needed for provisioning the programmable devices 128. The silicon vendor 1906 can generate the first key pair 150, which is wrapped using the wrapping tool and the HSM Public key 154. This can ensure that the wrapped first key pair 150 can only be unwrapped using the HSM private key 152 stored in the security controller 114. The first private key 152 of the key pair can be used for signing JWT commands.

The silicon vendor 1906 provides the distributor 1912 with SV_Auth element 1960 that contains the first public key 154 of the generated key pair. The security controller 114 can create the chain of trusts 2532.

The OEM 1416 can then generate four keys: the OEM_CERT_PUB_PRIV_KEYS, the OEM_ROT_PUB_PRIV_KEYS, the SIGNING_PUB_PRIV_KEYS, and the image signing keys. In general, there is one key per image. However it is understood that other configurations are possible.

The OEM 1416 does not use JWT to deliver credentials to the distributor 1912. The OEM 1416 uses the wrapping tool to wrap the four keys. The OEM 1416 can then securely deliver to the following to the distributor 1912. This can include the four wrapped keys, the certificate template for the product (aka the singing key), the certificate template for the device key, the JWT prov_req in a binary file, the secure boot image 1946 in a binary file, and the plaintext firmware images 914. Each image can be in a binary file.

The first provisioning step 2506 can configure the security controller 114 to prepare the data and content for provisioning to the programmable devices 128. The security controller 114 can create the following data elements: the rot_auth, the product certificate (chain_of_trust) using the product certificate template, the device certificate (dev_cert) using the device certificate template, the rot_auth_pkg, the rot2_auth_pkg, the rot_cmd, and the prov_cmd.

The first programming step 2508 can program the target data into the programmable devices 128. The programmer 112 can provision the Firmware-Signing Public Keys; one Key per Image, program the secure boot image in the programmable devices 128, and program the plaintext firmware images 914 into the programmable devices 128.

The second provisioning process 2512 can improve security by using the chains of trust created by the OEM 1416 and using JWT at the OEM 1416.

In the second provisioning process 2512, the second gathering credentials step 2514 can gather and prepare the information needed for provisioning the programmable devices 128. The second gathering credentials step 2514 in the second provisioning process 2512 is substantially similar to that of the first provisioning process 2502. However, in the second provisioning process 2512, the programmer does not create the chains of trust, the OEM 1416 creates the root and intermediate chain of trusts and the OEM 1416 can generate the four keys: the OEM_CERT_PUB_PRIV_KEYS, the OEM_ROT_PUB_PRIV_KEYS, the SIGNING_ PUB_PRIV_KEYS, and the image signing keys. In general, there is one key per image.

In addition, the OEM 1416 uses JWT to deliver the credentials to the distributor 1912. The OEM 1416 uses the wrapping tool 1470 to wrap two of the keys—the SIGNING_PUB_PRIV_KEYS and image signing keys 2534.

The OEM 1416 can use JWT to deliver target data to the distributor 1912. The OEM 1416 uses the wrapping tool to wrap the keys and data. The OEM 1416 can then securely deliver the wrapped data to the following to the distributor 1912. The can include the two wrapped keys, the JWT chain of trust for the product (aka the singing key), the certificate template for the device key, the JWT prov_req in a binary file, the secure boot image 1946 in a binary file, the plaintext firmware images 914, the JWT rot_auth value, and the JWT rot_auth_pkg.

The second provisioning step 2516 can configure the security controller 114 to prepare the data and content for provisioning to the programmable devices 128. The security controller 114 can create the following data elements: the device certificate (dev_cert) using the device certificate template, the rot_auth_pkg, the rot2_auth_pkg, the rot_cmd, and the prov_cmd.

The second programming step 2518 can program the target data into the programmable devices 128. The programmer 112 can provision the Firmware-Signing Public Keys; one Key per Image, program the secure boot image into the programmable devices 128, and program the plaintext firmware images 914 into the programmable devices 128.

The third provisioning process 2522 can improve security by using the chains of trust created by the OEM 1416, using JWT at the OEM 1416, and encrypting the firmware images 914.

In the third provisioning process 2522, the third gathering credentials step 2524 can gather and prepare the information needed for provisioning the programmable devices 128. The third gathering credentials step 2524 in the third provisioning process 2522 is substantially similar to that of the second provisioning process 2512. However, in the third provisioning process 2522, the OEM 1416 creates the root and intermediate chain of trusts and the OEM 1416 can generate five keys: the OEM_CERT_PUB_PRIV_KEYS, the OEM_ROT_PUB_PRIV_KEYS, the SIGNING_PUB_PRIV_KEYS, the image signing keys, and the firmware encryption keys 1446. Again, there is one key per image.

In addition, the OEM 1416 uses JWT to deliver the credentials to the distributor 1912. The OEM 1416 uses the wrapping tool 1470 to wrap three of the keys—the SIGNING_PUB_PRIV_KEYS, the image signing keys 2534, and the firmware encryption keys 1446.

The OEM 1416 can use JWT to deliver target data to the distributor 1912. The OEM 1416 uses the wrapping tool to wrap the keys and data. The OEM 1416 can then securely deliver the content to the following to the distributor 1912. The content can include the three wrapped keys, the JWT chain of trust for the product (aka the singing key), the certificate template for the device key, the JWT prov_req in a binary file, the secure boot image 1946 in a binary file, the plaintext firmware images 914, the JWT rot_auth value, and the JWT rot_auth_pkg.

The third provisioning step 2526 can configure the security controller 114 to prepare the data and content for provisioning to the programmable devices 128. The security controller 114 can create the following data elements: the device certificate (dev_cert) using the device certificate template 1454, the rot2_auth_pkg, the rot_cmd, and the prov_cmd.

The third programming step 2528 can program the target data into the programmable devices 128. The programmer 112 can provision the Firmware-Signing Public Keys; one Key per Image, program the secure boot image into the programmable devices 128, provision firmware encryption keys, and program the encrypted firmware images 914 into the programmable devices 128.

Figure 26:
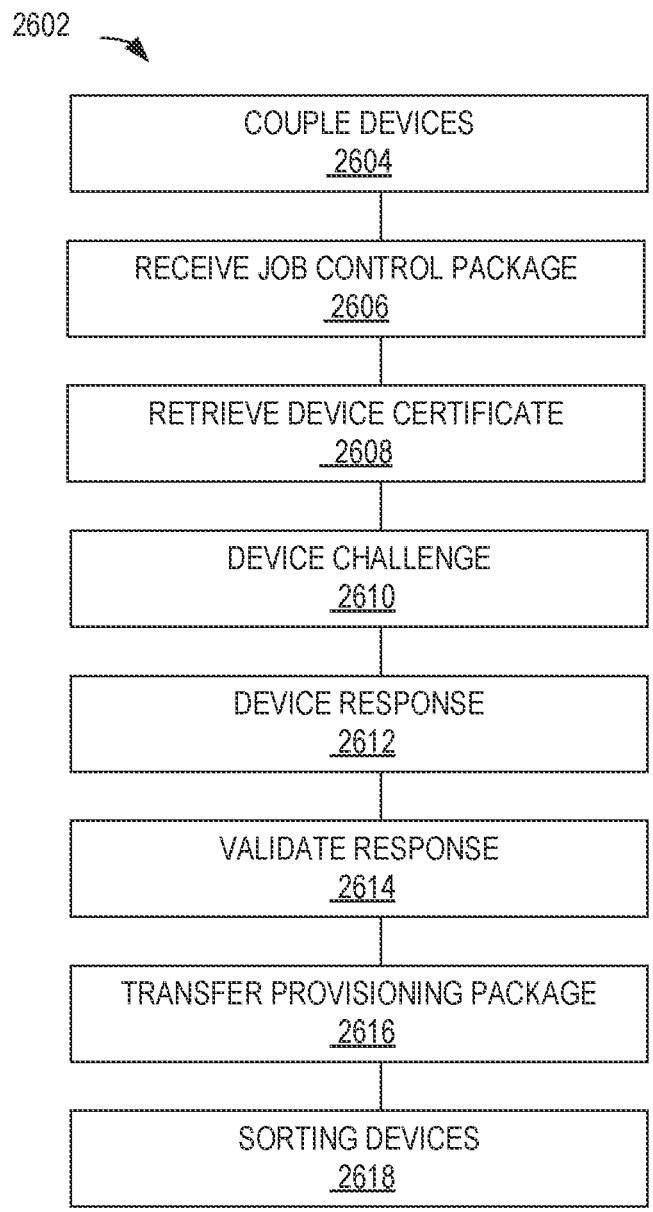
FIG. 26 is an example of the secure programming system process flow.

Referring now to FIG. 26, therein is shown an example of a secure programming system process flow 2602 for the programmable devices 128 in accordance with one or more embodiments. The various elements of the secure programming system process flow may be performed in a variety of systems, including systems such as system 100 described above.

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The secure programming system process flow 2602 can couple to the programmable devices, retrieve device certificates, receive a job control package, send a device challenge, receive a device response, validate the response, transfer the provisioning packages to the programmable devices, and sort the devices.

The secure programming system process flow 2602 can have a variety of configurations. For example, the secure programming system process flow 2602 can include a couple devices module 2604, a receive job control package module 2606, a retrieve device certificate module 2608, a device challenge module 2610, device response module 2612, a validate response module 2614, a transfer provisioning package module 2616, and a sorting devices module 2618. The control flow of the provisioning process flow 1102 can pass from module to module in sequential order.

The couple devices module 2604 can couple the programmable devices 128 to the programmer 112. This can include coupling the programmable devices directly in the destination sockets, remotely using a network link, and on circuit boards using the in-system programmer.

The receive job control package module 2606 can receive the job control package from an external factory management system. The job control package can be linked to the target payload and represent the information needed to manufacture the programmable devices.

The retrieve device certificate module 2608 can extract one or more of the device certificates from the programmable devices coupled to the programmer. The information in the devices certificate can be used to protect and configure the content and the programmable devices.

The device challenge module 2610 can generate and send a device specific challenge to the programmable device. This can include the security keys of a hardware security module, the programmer, the programmable devices, or other related security keys.

The device response module 2612 can receive and decrypt the device challenge, generate a response, and send the response back to the programmer. This can include encrypting the authorization value extracted from the challenge with a private key associated with the programmable device.

The validate response module 2614 can authenticate the programmable devices and validate the programmable device programming. If both of these factors are correct, then the programmable devices 128 are valid.

The transfer provisioning package module 2616 can send the provisioning packages to the programmable devices. The provisioning packages can be directly programmed into the programmable devices or deployed and executed on the programmable devices.

The sorting devices module 2618 can check to see that the validation status for the programmable devices is correct. If the validation status is not valid, then programmable devices can be sorted into to an output receptacle for disposal.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a secure programming system comprising:
   coupling programmable devices to a programmer, the programmable devices having at least a first device, the programmer having a programmer private key;
   receiving a job control package and a target payload at the programmer, the job control package and the target payload both encrypted with a programmer public key, the target payload having a first content;
   transferring the first content to each of the first devices in the programming devices using a security kernel on each of the first devices;
   generating provisioning statuses based on the transfer of the first content to each of the first devices; and
   sorting each of the first devices into an output receptacle of the programing unit based on the provisioning statuses of each of the first devices being authenticated or unauthenticated.

2. The method as claimed in claim 1, further comprising:
   extracting a programmer device certificate from each of the first devices;
   generating an authentication status based on authenticating the programmer device certificate using a silicon vendor public key; and
   setting the provisioning statuses of each of the first devices based on the authentication status.

3. The method as claimed in claim 2, wherein extracting the programmer device certificate includes extracting the silicon vendor device certificate from a secure storage unit of the programmable devices.

4. The method as claimed in claim 2, wherein sorting the programmable devices includes placing the programmable devices in the output receptacle using a device placement unit.

5. The method as claimed in claim 2, further comprising:
   creating a job control package having a programmer identification of the programmer; and
   configuring the programmer having the programmer identification to program a target payload of the job control package to the programmable devices.

6. The method as claimed in claim 2, wherein sorting the programmable devices includes moving unauthenticated programmable devices to a bad device output receptacle.

7. The method as claimed in claim 2, further comprising configuring the programmer to program an encrypted target payload to the programmable devices.

8. One or more non-transitory computer-readable media, storing one or more sequences of instructions, wherein execution of the one or more sequences of instructions by one or more processors causes the one or more processors to perform:
   coupling programmable devices to a programmer, the programmable devices having at least a first device, the programmer having a programmer private key;
   receiving a job control package and a target payload at the programmer, the job control package and the target payload both encrypted with a programmer public key, the target payload having a first content;
   transferring the first content to each of the first devices in the programming devices using a security kernel on each of the first devices;
   generating provisioning statuses based on the transfer of the first content to each of the first devices; and
   sorting each of the first devices into an output receptacle of the programing unit based on the provisioning statuses of each of the first devices being authenticated or unauthenticated.

9. The one or more non-transitory computer-readable media of claim 8, further comprising:
   extracting a programmer device certificate from each of the first devices;
   generating an authentication status based on authenticating the programmer device certificate using a silicon vendor public key; and
   setting the provisioning statuses of each of the first devices based on the authentication status.

10. The one or more non-transitory computer-readable media of claim 9, wherein extracting the silicon vendor device certificate includes extracting the silicon vendor device certificate from a secure storage unit of the programmable devices.

11. The one or more non-transitory computer-readable media of claim 9, wherein sorting the programmable devices includes placing the programmable devices in the output receptacle using a device placement unit.

12. The one or more non-transitory computer-readable media of claim 9, further comprising:
   creating a job control package having a programmer identification of the programmer; and
   configuring the programmer having the programmer identification to program a target payload of the job control package to the programmable devices.

13. The one or more non-transitory computer-readable media of claim 9, wherein sorting the programmable devices includes moving unauthenticated programmable devices to a bad device output receptacle.

14. The one or more non-transitory computer-readable media of claim 9, further comprising configuring the programmer to program an encrypted target payload to the programmable devices.

15. A secure programming system comprising:
   a programmer configured for coupling programmable devices to a programmer, the programmable devices having at least a first device, the programmer having a programmer private key, receiving a job control package and a target payload at the programmer, the job control package and the target payload both encrypted with a programmer public key, the target payload having a first content, transferring the first content to each of the first devices in the programmable devices using a security kernel on each of the first devices, generating a provisioning statuses based on the transfer of the first content to each of the first devices, and sorting each of the first devices into an output receptacle of the programing unit based on the provisioning statuses of each of the first devices being authenticated or unauthenticated.

16. The system as claimed in claim 15, wherein the programmer is configured for extracting a programmer device certificate from each of the first devices, generating an authentication status based on authenticating the programmer device certificate using a silicon vendor public key, and setting the provisioning statuses of each of the first devices based on the authentication status.

17. The system as claimed in claim 16, wherein the programmer is configured for extracting the silicon vendor device certificate from a secure storage unit of the programmable devices.

18. The system as claimed in claim 16, wherein the programmer is configured for sorting the programmable devices in the output receptacle using a device placement unit.

19. The system as claimed in claim 16, further comprising a factory security system configured for creating a job control package having a programmer identification of the programmer and for configuring the programmer having the programmer identification to program a target payload of the job control package to the programmable devices.

20. The system as claimed in claim 16, wherein the programmer is configured to program an encrypted target payload to the programmable devices.

* * * * *